US012724677B2

(12) United States Patent
Gopalan et al.

(10) Patent No.: US 12,724,677 B2
(45) Date of Patent: Sep. 1, 2026

(54) RECOVERING A VIRTUAL MACHINE AFTER FAILURE OF Post-Copy LIVE MIGRATION

(71) Applicant: The Research Foundation for The State University of New York, Binghamton, NY (US)

(72) Inventors: Kartik Gopalan, Vestal, NY (US); Ping Yang, Vestal, NY (US); Dinuni K. Fernando, Hapugoda (LK); Jonathan Terner, Beacon, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 18/661,599

(22) Filed: May 11, 2024

(65) Prior Publication Data

US 2025/0077362 A1 Mar. 6, 2025

Related U.S. Application Data

(63) Continuation of application No. 17/818,234, filed on Aug. 8, 2022, now Pat. No. 11,983,079, which is a (Continued)

(51) Int. Cl.
*G06F 11/1482* (2026.01)
*G06F 9/455* (2018.01)
(Continued)

(52) U.S. Cl.
CPC ...... *G06F 11/1484* (2013.01); *G06F 9/45558* (2013.01); *G06F 11/0772* (2013.01);
(Continued)

(58) Field of Classification Search
CPC ............ G06F 11/0772; G06F 11/0793; G06F 11/1471; G06F 11/1484; G06F 11/301
See application file for complete search history.

(56) References Cited

U.S. PATENT DOCUMENTS 6,671,707 B1 12/2003 Hudson et al.
7,484,208 B1 1/2009 Nelson
(Continued)

OTHER PUBLICATIONS

Lee et al., “Hypervisor-Assisted Application Checkpointing in Virtualized Environments”, 2011, 2011 IEEE/IFIP 41st International Conference on Dependable Systems & Networks (DSN), Hong Kong, China, pp. 371-382 (Year: 2011).*
(Continued)

*Primary Examiner* — Michael Maskulinski
(74) *Attorney, Agent, or Firm* — Hoffberg & Associates; Steven M. Hoffberg

(57) ABSTRACT

Post-copy is one of the two key techniques (besides pre-copy) for live migration of virtual machines in data centers. Post-copy provides deterministic total migration time and low downtime for write-intensive VMs. However, if post-copy migration fails for any reason, the migrating VM is lost because the VM's latest consistent state is split between the source and destination nodes during migration. PostCopyFT provides a new approach to recover a VM after a destination or network failure during post-copy live migration using an efficient reverse incremental checkpointing mechanism. PostCopyFT was implemented and evaluated in the KVM/QEMU platform. Experimental results show that the total migration time of post-copy remains unchanged while maintaining low failover time, downtime, and application performance overhead.

18 Claims, 17 Drawing Sheets

Timeline of PostCopyFT Migrations.

Related U.S. Application Data continuation of application No. 17/242,508, filed on Apr. 28, 2021, now Pat. No. 11,409,619.

(60) Provisional application No. 63/017,320, filed on Apr. 29, 2020.

(51) Int. Cl.
*G06F 11/07* (2006.01)
*G06F 11/1446* (2026.01)
*G06F 11/1471* (2026.01)
*G06F 11/30* (2006.01)

(52) U.S. Cl.
CPC ...... *G06F 11/0793* (2013.01); *G06F 11/1451* (2013.01); *G06F 11/1471* (2013.01); *G06F 11/301* (2013.01); *G06F 2009/4557* (2013.01); *G06F 2009/45583* (2013.01); *G06F 2201/84* (2013.01)

(56) References Cited

U.S. PATENT DOCUMENTS 7,673,113 B2 3/2010 Sugumar et al.
7,680,919 B2 3/2010 Nelson
7,849,286 B2 12/2010 Sugumar et al.
7,900,005 B2 3/2011 Kotsovinos et al.
8,004,998 B2 8/2011 Levy et al.
8,010,495 B1 8/2011 Kuznetzov et al.
8,078,824 B2 12/2011 Sugumar et al.
8,196,138 B2 6/2012 Allwell et al.
8,219,653 B1 7/2012 Keagy et al.
8,260,904 B2 9/2012 Nelson
8,302,094 B2 10/2012 Rogel et al.
8,312,453 B2 11/2012 Shah
8,332,848 B2 12/2012 Azulay et al.
8,364,638 B2 1/2013 Nickolov et al.
8,386,428 B2 2/2013 Kuznetzov et al.
8,386,731 B2 2/2013 Mashtizadeh et al.
8,407,518 B2 3/2013 Nelson et al.
8,418,176 B1 4/2013 Keagy et al.
8,429,630 B2 4/2013 Nickolov et al.
8,453,144 B1 5/2013 Keagy et al.
8,458,284 B2 6/2013 Huang et al.
8,473,557 B2 6/2013 Ramakrishnan et al.
8,489,699 B2 7/2013 Goggin et al.
8,490,088 B2 7/2013 Tang
8,504,686 B2 8/2013 Phaal
8,505,003 B2 8/2013 Bowen
8,521,912 B2 8/2013 Aloni et al.
8,533,305 B1 9/2013 Keagy et al.
8,533,713 B2 9/2013 Dong
8,554,900 B2 10/2013 Nelson
8,560,791 B2 10/2013 Mashitizadeh et al.
8,583,709 B2 11/2013 Joukov et al.
8,627,310 B2 1/2014 Ashok et al.
8,627,456 B2 1/2014 McKenzie et al.
8,646,028 B2 2/2014 McKenzie et al.
8,650,565 B2 2/2014 Narasimhan
8,661,436 B2 2/2014 McKenzie et al.
8,671,238 B2 3/2014 Mashtizadeh et al.
8,689,213 B2 4/2014 Philipson et al.
8,694,644 B2 4/2014 Chen et al.
8,694,828 B2 4/2014 Nelson et al.
8,700,867 B2 4/2014 Chen
8,761,187 B2 6/2014 Barde
8,775,590 B2 7/2014 Devarakonda et al.
8,806,480 B2 8/2014 Araujo, Jr. et al.
8,832,688 B2 9/2014 Tang et al.
8,856,255 B2 10/2014 Ramakrishnan et al.
8,856,339 B2 10/2014 Mestery et al.
8,862,744 B2 10/2014 Garg et al.
8,869,144 B2 10/2014 Pratt et al.
8,903,705 B2 12/2014 Douceur et al.
8,904,384 B2 12/2014 Low et al.
8,924,571 B2 12/2014 Pratt et al.
8,935,506 B1 1/2015 Gopalan
8,943,296 B2 1/2015 Serebrin et al.
8,973,098 B2 3/2015 Raghunath et al.
8,977,736 B2 3/2015 Nelson
8,984,507 B2 3/2015 Knowles et al.
8,990,531 B2 3/2015 Ahmad
8,990,800 B2 3/2015 Cherian et al.
8,990,808 B2 3/2015 Nakagawa
9,015,709 B2 4/2015 Voccio
9,027,024 B2 5/2015 Mick et al.
9,032,398 B2 5/2015 Ahmad et al.
9,043,493 B2 5/2015 Bacher et al.
9,043,790 B2 5/2015 Castillo et al.
9,047,110 B2 6/2015 Takeda
9,052,949 B2 6/2015 Tarasuk-Levin et al.
9,053,068 B2 6/2015 Tsirkin et al.
9,055,119 B2 6/2015 Zhou et al.
9,058,199 B2 6/2015 Tsirkin
9,063,866 B1 6/2015 Tati et al.
9,071,550 B2 6/2015 Tang et al.
9,081,599 B2 7/2015 Tsirkin et al.
9,086,904 B2 7/2015 Goggin et al.
9,086,981 B1 7/2015 Tati et al.
9,087,076 B2 7/2015 Nickolov et al.
9,092,318 B2 7/2015 Ahmad et al.
9,110,700 B2 8/2015 McKenzie et al.
9,110,704 B2 8/2015 Tsirkin
9,141,578 B2 9/2015 Mashtizadeh et al.
9,152,448 B2 10/2015 Wang et al.
9,164,795 B1 10/2015 Vincent
9,172,587 B2 10/2015 Kalyanaraman et al.
9,172,588 B2 10/2015 Kalyanaraman et al.
9,183,060 B2 11/2015 Wakamiya
9,183,157 B2 11/2015 Qiu et al.
9,197,489 B1 11/2015 Vincent
9,201,676 B2 12/2015 Tsirkin et al.
9,201,704 B2 12/2015 Chang et al.
9,229,516 B2 1/2016 Hiltunen et al.
9,244,710 B2 1/2016 Bacher et al.
9,244,731 B2 1/2016 Siu et al.
9,250,959 B2 2/2016 Nakagawa
9,262,199 B2 2/2016 Castillo et al.
9,262,211 B2 2/2016 Mo et al.
9,262,227 B2 2/2016 Doi
9,268,586 B2 2/2016 Voccio et al.
9,280,378 B2 3/2016 Shah
9,286,100 B2 3/2016 Salmela et al.
9,292,275 B2 3/2016 Bowen
9,304,878 B2 4/2016 Antony et al.
9,317,326 B2 4/2016 Ramanathan et al.
9,323,921 B2 4/2016 Hunt et al.
9,342,346 B2 5/2016 Maislos et al.
9,342,360 B2 5/2016 Bacher et al.
9,348,526 B2 5/2016 White et al.
9,348,655 B1 5/2016 Tsirkin et al.
9,354,905 B2 5/2016 Nakagawa
9,354,921 B2 5/2016 Nelson
9,361,145 B1 6/2016 Wilson et al.
9,361,218 B2 6/2016 Ahmad et al.
9,372,726 B2 6/2016 Gopalan
9,372,727 B2 6/2016 Knowles et al.
9,384,024 B2 7/2016 Ramakrishnan Nair
9,384,062 B2 7/2016 Tan
9,389,933 B2 7/2016 Baumann et al.
9,396,004 B1 7/2016 Bester et al.
9,405,642 B2 8/2016 Tsirkin
9,411,620 B2 8/2016 Wang et al.
9,413,538 B2 8/2016 Baumann et al.
9,417,754 B2 8/2016 Smith
9,425,965 B2 8/2016 Baumann et al.
9,436,386 B2 9/2016 White
9,436,751 B1 9/2016 Serebrin
9,442,753 B2 9/2016 Zheng
9,448,831 B2 9/2016 Dong et al.
9,454,400 B2 9/2016 Tsirkin et al.
9,454,489 B2 9/2016 Tati et al.
9,459,900 B2 10/2016 Tsirkin
9,459,902 B2 10/2016 Noel et al.

(56) References Cited

U.S. PATENT DOCUMENTS 9,473,598 B2 10/2016 Kashyap
9,495,183 B2 11/2016 Bond et al.
9,501,305 B2 11/2016 Groth
9,507,615 B2 11/2016 McKenzie et al.
9,507,672 B2 11/2016 Ye
9,509,868 B2 11/2016 Honma
9,519,512 B2 12/2016 Kami
9,519,548 B2 12/2016 Serebrin et al.
9,529,616 B2 12/2016 Borntraeger et al.
9,529,618 B2 12/2016 Borntraeger et al.
9,529,620 B1 12/2016 Dow et al.
9,531,799 B2 12/2016 Chandrasekaran et al.
9,542,108 B2 1/2017 White
9,552,215 B2 1/2017 Voccio et al.
9,552,217 B2 1/2017 Tarasuk-Levin et al.
9,558,005 B2 1/2017 Sathyanarayana
9,558,028 B2 1/2017 Joshi et al.
9,575,789 B1 2/2017 Rangari et al.
9,578,088 B2 2/2017 Nickolov et al.
9,588,796 B2 3/2017 Tarasuk-Levin et al.
9,588,803 B2 3/2017 Howell et al.
9,588,836 B2 3/2017 Shetty et al.
9,588,844 B2 3/2017 Bissett et al.
9,594,583 B2 3/2017 Bonzini
9,594,598 B1 3/2017 Brouwer et al.
9,619,297 B2 4/2017 Jain et al.
9,626,212 B2 4/2017 Beveridge et al.
9,639,388 B2 5/2017 Tsirkin et al.
9,648,134 B2 5/2017 Frank
9,652,296 B1 5/2017 Tsirkin et al.
9,671,966 B2 6/2017 Miwa et al.
9,672,120 B2 6/2017 Tarasuk-Levin et al.
9,703,655 B1 7/2017 Hardt et al.
9,720,722 B2 8/2017 Tsirkin
9,720,728 B2 8/2017 Yu et al.
9,740,627 B2 8/2017 White et al.
9,760,443 B2 9/2017 Tarasuk-Levin et al.
9,766,930 B2 9/2017 Tarasuk-Levin et al.
9,767,039 B2 9/2017 Serebrin et al.
9,778,997 B2 10/2017 Tsao et al.
9,792,138 B2 10/2017 Kaplan et al.
9,798,560 B1 10/2017 Keagy et al.
9,798,567 B2 10/2017 Hu et al.
9,804,866 B2 10/2017 Halls et al.
9,811,376 B2 11/2017 Brouwer et al.
9,823,842 B2 11/2017 Gopalan et al.
9,830,090 B1 11/2017 Hardt et al.
9,830,176 B2 11/2017 Andrus et al.
9,836,327 B1 12/2017 Brouwer et al.
9,842,032 B2 12/2017 Blake
9,852,137 B2 12/2017 Mann et al.
9,852,198 B1 12/2017 Kuznetzov et al.
9,854,036 B2 12/2017 Yang et al.
9,870,246 B2 1/2018 Koladi et al.
9,880,868 B2 1/2018 Shah
9,880,870 B1 1/2018 Danilov et al.
9,880,872 B2 1/2018 Srinivas
9,898,320 B2 2/2018 Tarasuk-Levin et al.
9,898,430 B2 2/2018 Davda et al.
9,904,570 B2 2/2018 Ramanathan et al.
9,928,091 B2 3/2018 Lotlikar et al.
9,928,107 B1 3/2018 Vincent
9,928,260 B2 3/2018 Sitsky et al.
9,934,056 B2 4/2018 Noel et al.
9,934,157 B2 4/2018 Tsirkin et al.
9,934,407 B2 4/2018 Sikka
9,936,019 B2 4/2018 Sanderson
9,965,311 B2 5/2018 Tsirkin et al.
9,971,616 B2 5/2018 Kaul
9,996,396 B2 6/2018 Knowles et al.
11,409,619 B2 * 8/2022 Gopalan ............. G06F 11/0772
11,983,079 B2 * 5/2024 Gopalan ............... G06F 11/301
2002/0078057 A1 6/2002 Wang et al.
2007/0294676 A1 12/2007 Mellor et al.
2008/0163239 A1 7/2008 Sugumar et al.
2008/0172492 A1 7/2008 Raghunath et al.
2008/0222375 A1 9/2008 Kotsovinos et al.
2008/0263258 A1 10/2008 Allwell et al.
2009/0007106 A1 1/2009 Araujo, Jr. et al.
2009/0113109 A1 4/2009 Nelson et al.
2009/0125904 A1 5/2009 Nelson
2009/0157882 A1 6/2009 Kashyap
2009/0271786 A1 10/2009 Groth
2009/0276771 A1 11/2009 Nickolov et al.
2009/0290501 A1 11/2009 Levy et al.
2010/0125845 A1 5/2010 Sugumar et al.
2010/0169253 A1 7/2010 Tan
2010/0169537 A1 7/2010 Nelson
2010/0180274 A1 7/2010 Cherian et al.
2010/0235825 A1 9/2010 Azulay et al.
2010/0318608 A1 12/2010 Huang et al.
2011/0066819 A1 3/2011 Mashtizadeh et al.
2011/0113136 A1 5/2011 Phaal
2011/0119670 A1 5/2011 Sugumar et al.
2011/0134931 A1 6/2011 Merwe et al.
2011/0141124 A1 6/2011 Halls et al.
2011/0145418 A1 6/2011 Pratt et al.
2011/0145458 A1 6/2011 Narasimhan
2011/0145819 A1 6/2011 McKenzie et al.
2011/0145820 A1 6/2011 Pratt et al.
2011/0145821 A1 6/2011 Philipson et al.
2011/0145886 A1 6/2011 Mckenzie et al.
2011/0145916 A1 6/2011 Mckenzie et al.
2011/0153697 A1 6/2011 Nickolov et al.
2011/0231455 A1 9/2011 Joukov et al.
2011/0238820 A1 9/2011 Matsuoka
2011/0271062 A1 11/2011 Chen
2011/0271270 A1 11/2011 Bowen
2011/0296411 A1 12/2011 Tang et al.
2012/0011504 A1 1/2012 Ahmad et al.
2012/0011508 A1 1/2012 Ahmad
2012/0017031 A1 1/2012 Mashtizadeh et al.
2012/0042034 A1 2/2012 Goggin et al.
2012/0054367 A1 3/2012 Ramakrishnan et al.
2012/0066375 A1 3/2012 Phaal
2012/0066677 A1 3/2012 Tang
2012/0102084 A1 4/2012 Hiltunen et al.
2012/0137098 A1 5/2012 Wang et al.
2012/0198440 A1 8/2012 Shah
2012/0233282 A1 9/2012 Voccio et al.
2012/0233331 A1 9/2012 Voccio et al.
2012/0233611 A1 9/2012 Voccio
2012/0254862 A1 10/2012 Dong
2012/0278525 A1 11/2012 Serebrin et al.
2012/0278807 A1 11/2012 Nakagawa
2012/0284234 A1 11/2012 Mashtizadeh et al.
2012/0304176 A1 11/2012 Takeda
2012/0310888 A1 12/2012 Kuznetzov et al.
2012/0324442 A1 12/2012 Barde
2013/0024598 A1 1/2013 Serebrin et al.
2013/0041977 A1 2/2013 Wakamiya
2013/0060947 A1 3/2013 Nelson
2013/0061225 A1 3/2013 Nakagawa
2013/0086272 A1 4/2013 Chen et al.
2013/0124675 A1 5/2013 Mo et al.
2013/0139154 A1 5/2013 Shah
2013/0139155 A1 5/2013 Shah
2013/0179655 A1 7/2013 Mashitizadeh et al.
2013/0205106 A1 8/2013 Tati et al.
2013/0205113 A1 8/2013 Ahmad et al.
2013/0246355 A1 9/2013 Nelson et al.
2013/0268643 A1 10/2013 Chang et al.
2013/0268799 A1 10/2013 Mestery et al.
2013/0275375 A1 10/2013 Nickolov et al.
2013/0290468 A1 10/2013 Ramakrishnan et al.
2013/0298126 A1 11/2013 Nakagawa
2013/0304903 A1 11/2013 Mick et al.
2013/0305242 A1 11/2013 Wang et al.
2013/0305246 A1 11/2013 Goggin et al.
2013/0318515 A1 11/2013 Bowen
2013/0326173 A1 12/2013 Tsirkin
2013/0326174 A1 12/2013 Tsirkin
2013/0326175 A1 12/2013 Tsirkin
2013/0346613 A1 12/2013 Tarasuk-Levin et al.

(56) References Cited

U.S. PATENT DOCUMENTS

2014/0019974 A1 1/2014 Siu et al.
2014/0032767 A1 1/2014 Nelson
2014/0040343 A1 2/2014 Nickolov et al.
2014/0068703 A1 3/2014 Balus et al.
2014/0081984 A1 3/2014 Sitsky et al.
2014/0101657 A1 4/2014 Bacher et al.
2014/0101754 A1 4/2014 McKenzie et al.
2014/0108854 A1 4/2014 Antony et al.
2014/0109180 A1 4/2014 McKenzie et al.
2014/0115162 A1 4/2014 Kalyanaraman et al.
2014/0115164 A1 4/2014 Kalyanaraman et al.
2014/0139869 A1 5/2014 Honma
2014/0149635 A1 5/2014 Bacher et al.
2014/0149984 A1 5/2014 Takahashi et al.
2014/0173600 A1 6/2014 Ramakrishnan Nair
2014/0173628 A1 6/2014 Ramakrishnan Nair
2014/0189041 A1 7/2014 Mashtizadeh et al.
2014/0189690 A1 7/2014 Ramakrishnan Nair
2014/0196037 A1 7/2014 Gopalan
2014/0201357 A1 7/2014 Tang et al.
2014/0215172 A1 7/2014 Tsirkin
2014/0245294 A1 8/2014 Kaul
2014/0297780 A1 10/2014 Zhou et al.
2014/0298338 A1 10/2014 Doi
2014/0325515 A1 10/2014 Salmela et al.
2014/0359607 A1 12/2014 Tsirkin et al.
2014/0372717 A1 12/2014 Ciu et al.
2015/0052282 A1 2/2015 Dong
2015/0063166 A1 3/2015 Sif et al.
2015/0066859 A1 3/2015 Blake
2015/0149999 A1 5/2015 Ramanathan et al.
2015/0160962 A1 6/2015 Borntraeger et al.
2015/0160963 A1 6/2015 Borntraeger et al.
2015/0160964 A1 6/2015 Nelson
2015/0163270 A1 6/2015 Lyons
2015/0186220 A1 7/2015 Serebrin et al.
2015/0193248 A1 7/2015 Noel et al.
2015/0205673 A1 7/2015 Bissett et al.
2015/0234684 A1 8/2015 Bacher et al.
2015/0235308 A1 8/2015 Mick et al.
2015/0242228 A1 8/2015 Voccio
2015/0277789 A1 10/2015 White et al.
2015/0277962 A1 10/2015 Tsirkin et al.
2015/0301931 A1 10/2015 Ahmad et al.
2015/0309839 A1 10/2015 Lu
2015/0324236 A1 11/2015 Gopalan et al.
2015/0324297 A1 11/2015 Tati et al.
2015/0331715 A1 11/2015 Sathyanarayana
2015/0339148 A1 11/2015 Zheng
2015/0370596 A1 12/2015 Fahs et al.
2015/0372862 A1 12/2015 Namihira
2015/0373096 A1 12/2015 Chandrasekaran et al.
2015/0378623 A1 12/2015 White
2015/0378766 A1 12/2015 Beveridge et al.
2015/0378767 A1 12/2015 Tarasuk-Levin et al.
2015/0378771 A1 12/2015 Tarasuk-Levin et al.
2015/0378783 A1 12/2015 Tarasuk-Levin et al.
2015/0378785 A1 12/2015 Tarasuk-Levin et al.
2015/0378831 A1 12/2015 Tarasuk-Levin et al.
2015/0378847 A1 12/2015 Tarasuk-Levin et al.
2015/0378931 A1 12/2015 White
2015/0381589 A1 12/2015 Tarasuk-Levin et al.
2016/0026489 A1 1/2016 Maislos et al.
2016/0028761 A1 1/2016 Sitsky et al.
2016/0034702 A1 2/2016 Sikka
2016/0098302 A1 4/2016 Ben-Yehuda et al.
2016/0103728 A1 4/2016 Shetty et al.
2016/0117122 A1 4/2016 Miwa et al.
2016/0132443 A1 5/2016 Davda et al.
2016/0139962 A1 5/2016 Tsirkin et al.
2016/0147556 A1 5/2016 Hu et al.
2016/0196449 A1 7/2016 Sikka
2016/0203015 A1 7/2016 Joshi et al.
2016/0224371 A1 8/2016 Ramanathan et al.
2016/0232023 A1 8/2016 Koladi et al.
2016/0239328 A1 8/2016 Kaplan et al.
2016/0239428 A1 8/2016 White et al.
2016/0246639 A1 8/2016 Voccio et al.
2016/0266940 A1 9/2016 Tsirkin et al.
2016/0274896 A1 9/2016 Bowen
2016/0274934 A1 9/2016 Nelson
2016/0283421 A1 9/2016 Wilson et al.
2016/0306862 A1 10/2016 Sitsky et al.
2016/0381125 A1 12/2016 Jagadeeshwaran et al.
2017/0005813 A1 1/2017 Sobh et al.
2017/0024246 A1 1/2017 Gopalan
2017/0075706 A1 3/2017 Apfelbaum et al.
2017/0090964 A1 3/2017 Tsirkin
2017/0090968 A1 3/2017 Tsirkin et al.
2017/0132062 A1 5/2017 Shetty et al.
2017/0132430 A1 5/2017 Sikka
2017/0139755 A1 5/2017 Tsirkin et al.
2017/0147501 A1 5/2017 Tsirkin et al.
2017/0199755 A1 7/2017 Voccio et al.
2017/0201574 A1 7/2017 Luo
2017/0220374 A1 8/2017 Beveridge et al.
2017/0270012 A1 9/2017 Tarasuk-Levin et al.
2017/0272515 A1 9/2017 Sanderson
2017/0288971 A1 10/2017 Jayaraman et al.
2017/0322815 A1 11/2017 Buswell
2017/0322828 A1 11/2017 Panicker
2017/0357527 A1 12/2017 Srinivas
2017/0371696 A1 12/2017 Prziborowski et al.
2018/0004679 A1 1/2018 Serebrin et al.
2018/0018135 A1 1/2018 Shen
2018/0024854 A1 1/2018 Wang et al.
2018/0041477 A1 2/2018 Shaposhnik
2018/0052701 A1 2/2018 Kaplan et al.
2018/0060107 A1 3/2018 Hu et al.
2018/0074842 A1 3/2018 Fu et al.
2018/0074908 A1 3/2018 Tarasuk-Levin et al.
2018/0074909 A1 3/2018 Bishop et al.
2018/0088975 A1 3/2018 Kaul
2018/0101452 A1 4/2018 Blake
2018/0113610 A1 4/2018 Gopalan et al.
2018/0121247 A1 5/2018 Kaul
2018/0129523 A1 5/2018 Bryant et al.
2018/0136838 A1 5/2018 White et al.
2018/0136963 A1 5/2018 Srinivas
2018/0173547 A1 6/2018 Stokes et al.
2018/0183869 A1 6/2018 Sanderson
2018/0203721 A1 7/2018 Fahs et al.
2018/0225221 A1 8/2018 Tsirkin et al.
2018/0232254 A1 8/2018 Mohan
2018/0276025 A1 9/2018 Kaul
2018/0329737 A1 11/2018 Dong et al.
2018/0349421 A1 12/2018 Sitsky et al.
2018/0357098 A1 12/2018 Dube et al.
2018/0373557 A1 12/2018 Dong
2019/0005576 A1 1/2019 Mick et al.
2019/0020732 A1 1/2019 Mosko
2019/0034112 A1 1/2019 Tsirkin et al.
2019/0050235 A1 2/2019 Buswell
2019/0087220 A1 3/2019 Turner
2019/0087244 A1 3/2019 Turner
2019/0095232 A1 3/2019 Okuno et al.
2019/0114197 A1 4/2019 Gong
2019/0129740 A1 5/2019 Hadas et al.
2019/0129814 A1 5/2019 Tati et al.
2019/0146853 A1 5/2019 Xu et al.
2019/0158588 A1 5/2019 Sanderson
2019/0179659 A1 6/2019 Herbert
2019/0182207 A1* 6/2019 Tsirkin ................ G06F 9/45558
2019/0205220 A1 7/2019 Zhang
2019/0207764 A1 7/2019 Maximov et al.
2019/0220364 A1 7/2019 Yu et al.
2019/0222522 A1 7/2019 Shih et al.
2019/0228557 A1 7/2019 Ma et al.
2019/0258503 A1 8/2019 Manco et al.
2019/0265904 A1 8/2019 Nakamura et al.
2019/0278624 A1 9/2019 Bade et al.
2019/0278632 A1 9/2019 Sakai
2019/0319896 A1 10/2019 Guo et al.
2019/0334909 A1 10/2019 Schmitt et al.

(56) References Cited

U.S. PATENT DOCUMENTS

2019/0354378 A1 11/2019 Battaiola Kreling et al.
2019/0370049 A1 12/2019 Gopalan
2019/0384495 A1 12/2019 Balcha
2019/0384673 A1 12/2019 Bishop et al.
2019/0391835 A1 12/2019 Gowda et al.
2019/0391843 A1 12/2019 Franciosi et al.
2020/0019429 A1 1/2020 Kaplan et al.
2020/0019512 A1 1/2020 Serebrin et al.
2020/0026547 A1 1/2020 Bryant et al.
2020/0034176 A1 1/2020 Calciu et al.
2020/0034182 A1 1/2020 Kaul
2020/0034211 A1 1/2020 Kumar et al.
2020/0073674 A1 3/2020 Tsirkin et al.
2020/0110629 A1 4/2020 Hu et al.
2020/0150997 A1 5/2020 Chang et al.
2020/0174817 A1 6/2020 Ding et al.
2020/0183729 A1 6/2020 Lu et al.
2020/0293697 A1 9/2020 Sion
2020/0319897 A1 10/2020 Turner
2020/0319904 A1 10/2020 Turner
2020/0334067 A1 10/2020 Liu et al.
2020/0387392 A1 12/2020 Sajjad et al.
2020/0389469 A1 12/2020 Litichever et al.
2020/0403940 A1 12/2020 Daly et al.
2021/0049079 A1 2/2021 Kumar et al.
2021/0055946 A1 2/2021 Golan et al.
2021/0058425 A1 2/2021 Sitsky et al.

OTHER PUBLICATIONS

U.S. Appl. No. 10/013,276, filed Jul. 3, 2018, Fahs et al.
U.S. Appl. No. 10/031,607, filed Jul. 24, 2018, Smith.
U.S. Appl. No. 10/033,595, filed Jul. 24, 2018, Sif et al.
U.S. Appl. No. 10/037,334, filed Jul. 31, 2018, Lunev et al.
U.S. Appl. No. 10/044,558, filed Aug. 7, 2018, Namihira.
U.S. Appl. No. 10/049,064, filed Aug. 14, 2018, Bonzini et al.
U.S. Appl. No. 10/061,622, filed Aug. 28, 2018, Tsirkin et al.
U.S. Appl. No. 10/073,713, filed Sep. 11, 2018, Nelson.
U.S. Appl. No. 10/078,529, filed Sep. 18, 2018, Voccio et al.
U.S. Appl. No. 10/083,053, filed Sep. 25, 2018, Dong.
U.S. Appl. No. 10/089,011, filed Oct. 2, 2018, McVey et al.
U.S. Appl. No. 10/114,662, filed Oct. 30, 2018, Tsirkin et al.
U.S. Appl. No. 10/120,480, filed Nov. 6, 2018, Smith.
U.S. Appl. No. 10/120,594, filed Nov. 6, 2018, Hardt et al.
U.S. Appl. No. 10/127,049, filed Nov. 13, 2018, Buswell.
U.S. Appl. No. 10/129,331, filed Nov. 13, 2018, Jagadeeshwaran et al.
U.S. Appl. No. 10/135,948, filed Nov. 20, 2018, Mosko.
U.S. Appl. No. 10/140,112, filed Nov. 27, 2018, Takano et al.
U.S. Appl. No. 10/146,353, filed Dec. 4, 2018, Smith.
U.S. Appl. No. 10/156,921, filed Dec. 18, 2018, Smith.
U.S. Appl. No. 10/156,986, filed Dec. 18, 2018, Gopalan et al..
U.S. Appl. No. 10/157,077, filed Dec. 18, 2018, Voccio et al.
U.S. Appl. No. 10/162,448, filed Dec. 25, 2018, Smith.
U.S. Appl. No. 10/169,068, filed Jan. 1, 2019, Brouwer et al.
U.S. Appl. No. 10/178,073, filed Jan. 8, 2019, Shaposhnik.
U.S. Appl. No. 10/187,466, filed Jan. 22, 2019, Sanderson.
U.S. Appl. No. 10/191,756, filed Jan. 29, 2019, Voccio.
U.S. Appl. No. 10/198,299, filed Feb. 5, 2019, Xu et al.
U.S. Appl. No. 10/198,377, filed Feb. 5, 2019, Wilson et al.
U.S. Appl. No. 10/203,794, filed Feb. 12, 2019, Smith.
U.S. Appl. No. 10/209,806, filed Feb. 19, 2019, Smith.
U.S. Appl. No. 10/209,807, filed Feb. 19, 2019, Smith.
U.S. Appl. No. 10/209,808, filed Feb. 19, 2019, Smith.
U.S. Appl. No. 10/209,809, filed Feb. 19, 2019, Smith.
U.S. Appl. No. 10/210,567, filed Feb. 19, 2019, Mick et al.
U.S. Appl. No. 10/222,891, filed Mar. 5, 2019, Smith.
U.S. Appl. No. 10/222,892, filed Mar. 5, 2019, Smith.
U.S. Appl. No. 10/222,893, filed Mar. 5, 2019, Smith.
U.S. Appl. No. 10/222,894, filed Mar. 5, 2019, Smith.
U.S. Appl. No. 10/222,895, filed Mar. 5, 2019, Smith.
U.S. Appl. No. 10/223,276, filed Mar. 5, 2019, Tsirkin.
U.S. Appl. No. 10/235,235, filed Mar. 19, 2019, Shetty et al.
U.S. Appl. No. 10/241,814, filed Mar. 26, 2019, Tsirkin.
U.S. Appl. No. 10/268,595, filed Apr. 23, 2019, Bonzini et al.
U.S. Appl. No. 10/275,086, filed Apr. 30, 2019, Smith.
U.S. Appl. No. 10/275,087, filed Apr. 30, 2019, Smith.
U.S. Appl. No. 10/289,435, filed May 14, 2019, Bond et al.
U.S. Appl. No. 10/289,436, filed May 14, 2019, Keagy et al.
U.S. Appl. No. 10/289,684, filed May 14, 2019, Mashtizadeh et al.
U.S. Appl. No. 10/310,977, filed Jun. 4, 2019, Mola.
U.S. Appl. No. 10/318,329, filed Jun. 11, 2019, Tsirkin et al.
U.S. Appl. No. 10/324,851, filed Jun. 18, 2019, Mola.
U.S. Appl. No. 10/338,736, filed Jul. 2, 2019, Smith.
U.S. Appl. No. 10/345,961, filed Jul. 9, 2019, Smith.
U.S. Appl. No. 10/365,758, filed Jul. 30, 2019, Smith.
U.S. Appl. No. 10/386,960, filed Aug. 20, 2019, Smith.
U.S. Appl. No. 10/394,656, filed Aug. 27, 2019, Tarasuk-Levin et al.
U.S. Appl. No. 10/394,668, filed Aug. 27, 2019, Tarasuk-Levin et al.
U.S. Appl. No. 10/423,437, filed Sep. 24, 2019, Kaplan et al.
U.S. Appl. No. 10/430,221, filed Oct. 1, 2019, Tsirkin.
U.S. Appl. No. 10/430,249, filed Oct. 1, 2019, Kaul.
U.S. Appl. No. 10/430,991, filed Oct. 1, 2019, Ma et al.
U.S. Appl. No. 10/437,627, filed Oct. 8, 2019, Hu et al.
U.S. Appl. No. 10/452,559, filed Oct. 22, 2019, Serebrin et al.
U.S. Appl. No. 10/466,999, filed Nov. 5, 2019, Fu et al.
U.S. Appl. No. 10/467,106, filed Nov. 5, 2019, Tsao et al.
U.S. Appl. No. 10/474,369, filed Nov. 12, 2019, Tati et al.
U.S. Appl. No. 10/474,489, filed Nov. 12, 2019, Dong et al.
U.S. Appl. No. 10/481,940, filed Nov. 19, 2019, Srinivas.
U.S. Appl. No. 10/481,942, filed Nov. 19, 2019, Kaul.
U.S. Appl. No. 10/503,551, filed Dec. 10, 2019, Dube et al.
U.S. Appl. No. 10/503,659, filed Dec. 10, 2019, Tsirkin et al.
U.S. Appl. No. 10/509,662, filed Dec. 17, 2019, Hardt et al.
U.S. Appl. No. 10/509,687, filed Dec. 17, 2019, Jain et al.
U.S. Appl. No. 10/514,938, filed Dec. 24, 2019, Ramakrishnan Nair.
U.S. Appl. No. 10/521,047, filed Dec. 31, 2019, Smith.
U.S. Appl. No. 10/530,822, filed Jan. 7, 2020, Lyons.
U.S. Appl. No. 10/534,474, filed Jan. 14, 2020, Smith.
U.S. Appl. No. 10/540,039, filed Jan. 21, 2020, Smith.
U.S. Appl. No. 10/541,928, filed Jan. 21, 2020, Shih et al.
U.S. Appl. No. 10/545,777, filed Jan. 28, 2020, Bryant et al.
U.S. Appl. No. 10/551,966, filed Feb. 4, 2020, Smith.
U.S. Appl. No. 10/552,080, filed Feb. 4, 2020, Tsirkin et al.
U.S. Appl. No. 10/552,230, filed Feb. 4, 2020, Tsirkin et al.
U.S. Appl. No. 10/552,267, filed Feb. 4, 2020, Bishop et al.
U.S. Appl. No. 10/572,271, filed Feb. 25, 2020, Tsirkin et al.
U.S. Appl. No. 10/579,409, filed Mar. 3, 2020, Beveridge et al.
U.S. Appl. No. 10/579,412, filed Mar. 3, 2020, Manco et al.
U.S. Appl. No. 10/592,039, filed Mar. 17, 2020, Smith.
U.S. Appl. No. 10/592,273, filed Mar. 17, 2020, Fahs et al.
U.S. Appl. No. 10/592,428, filed Mar. 17, 2020, Saidi.
U.S. Appl. No. 10/606,396, filed Mar. 31, 2020, Smith.
U.S. Appl. No. 10/628,200, filed Apr. 21, 2020, Hadas et al.
U.S. Appl. No. 10/635,474, filed Apr. 28, 2020, Panicker.
U.S. Appl. No. 10/635,477, filed Apr. 28, 2020, Kaul.
U.S. Appl. No. 10/642,413, filed May 5, 2020, Smith.
U.S. Appl. No. 10/642,539, filed May 5, 2020, Shen.
U.S. Appl. No. 10/649,571, filed May 12, 2020, Smith.
U.S. Appl. No. 10/649,578, filed May 12, 2020, Smith.
U.S. Appl. No. 10/649,579, filed May 12, 2020, Smith.
U.S. Appl. No. 10/649,580, filed May 12, 2020, Smith.
U.S. Appl. No. 10/649,581, filed May 12, 2020, Smith.
U.S. Appl. No. 10/656,752, filed May 19, 2020, Smith.
U.S. Appl. No. 10/656,753, filed May 19, 2020, Smith.
U.S. Appl. No. 10/656,754, filed May 19, 2020, Smith.
U.S. Appl. No. 10/656,755, filed May 19, 2020, Smith.
U.S. Appl. No. 10/656,756, filed May 19, 2020, Smith.
U.S. Appl. No. 10/656,757, filed May 19, 2020, Smith.
U.S. Appl. No. 10/656,758, filed May 19, 2020, Smith.
U.S. Appl. No. 10/656,759, filed May 19, 2020, Smith.
U.S. Appl. No. 10/664,097, filed May 26, 2020, Smith.
U.S. Appl. No. 10/666,516, filed May 26, 2020, Jayaraman et al.
U.S. Appl. No. 10/671,212, filed Jun. 2, 2020, Smith.

(56) References Cited

OTHER PUBLICATIONS

U.S. Appl. No. 10/671,213, filed Jun. 2, 2020, Smith.
U.S. Appl. No. 10/684,874, filed Jun. 16, 2020, Keagy et al.
U.S. Appl. No. 10/698,711, filed Jun. 30, 2020, Sobh et al.
U.S. Appl. No. 10/713,123, filed Jul. 14, 2020, Yu et al.
U.S. Appl. No. 10/725,581, filed Jul. 28, 2020, Smith.
U.S. Appl. No. 10/725,823, filed Jul. 28, 2020, Turull et al.
U.S. Appl. No. 10/740,016, filed Aug. 11, 2020, White et al.
U.S. Appl. No. 10/782,819, filed Sep. 22, 2020, Smith.
U.S. Appl. No. 10/788,931, filed Sep. 29, 2020, Smith.
U.S. Appl. No. 10/796,035, filed Oct. 6, 2020, Xia et al.
U.S. Appl. No. 10/810,037, filed Oct. 20, 2020, Liu et al.
U.S. Appl. No. 10/824,716, filed Nov. 3, 2020, Howell et al.
U.S. Appl. No. 10/826,930, filed Nov. 3, 2020, Sitsky et al.
U.S. Appl. No. 10/838,542, filed Nov. 17, 2020, Smith.
U.S. Appl. No. 10/853,119, filed Dec. 1, 2020, Ding et al.
U.S. Appl. No. 10/936,114, filed Mar. 2, 2021, Smith.
U.S. Appl. No. 10/936,330, filed Mar. 2, 2021, Battaiola Kreling et al.
U.S. Appl. No. 10/956,197, filed Mar. 23, 2021, Herbert.
U.S. Appl. No. 10/963,367, filed Mar. 30, 2021, Mola.
A. Barak and R. Wheeler. Mosix: An integrated multiprocessor UNIX. In Mobility, pp. 41-53. ACM Press/Addison-Wesley Publishing Co., New York, NY, USA, 1999.
P. Barham, B. Dragovic, K. Fraser, S. Hand, T. Harris, A. Ho, R. Neugebauer, I. Pratt, and A. Warfield. Xen and the art of virtualization. SIGOPS Oper. Syst. Rev., 37(5):164-177, Oct. 2003.
F. Bellard. Qemu, a fast and portable dynamic translator. In Proc. of USENIX Annual Technical Conference, Apr. 2005.
J. Bonwick and J. Adams. Magazines and vmem: Extending the slab allocator to many cpus and arbitrary resources. In USENIX Annual Technical Conference, pp. 15-33, 2001.
T. C. Bressoud and F. B. Schneider. Hypervisor-based fault tolerance. In Proceedings of the Fifteenth ACM Symposium on Operating Systems Principles, SOSP '95, pp. 1-11, New York, NY, USA, 1995. ACM.
C. Clark, K. Fraser, S. Hand, J. Hansen, E. Jul, C. Limpach, I. Pratt, and A. Warfield. Live Migration of Virtual Machines. In USENIX Symposium on Networked Systems Design and Implementation (NSDI), pp. 273-286, 2005.
B. Cully, G. Lefebvre, D. Meyer, M. Feeley, N. Hutchinson, and A. Warfield. Remus: High availability via asynchronous virtual machine replication. In USENIX Symposium on Networked Systems Design and Implementation (NSDI), pp. 161-174, 2008.
U. Deshpande, D. Chan, S. Chan, K. Gopalan, and N. Bila. Scattergather live migration of virtual machines. IEEE Transactions on Cloud Computing, pp. (99):1-1, 2015.
U. Deshpande, Y. You, D. Chan, N. Bila, and K. Gopalan. Fast server deprovisioning through scatter-gather live migration of virtual machines. In 2014 IEEE 7th International Conference on Cloud Computing, pp. 376-383, Jun. 2014.
Y. Dong, W. Ye, Y. Jiang, I. Pratt, S. Ma, J. Li, and H. Guan. Colo: Coarse-grained lock-stepping virtual machines for non-stop service. In the 4th Annual Symposium on Cloud Computing, pp. 1-16, 2013.
G. W. Dunlap, S. T. King, S. Cinar, M. A. Basrai, and P. M. Chen. Revirt: Enabling intrusion analysis through virtual-machine logging and replay. SIGOPS Oper. Syst. Rev., 36:211-224, Dec. 2002.
G. W. Dunlap, III. Execution Replay for Intrusion Analysis. PhD thesis, Ann Arbor, MI, USA, 2006.
C. Engelmann, G. R. Vallee, T. Naughton, and S. L. Scott. Proactive fault tolerance using preemptive migration. In 17th Euromicro International Conference on Parallel, Distributed and Network-based Processing, pp. 252-257, 2009.
D. Fernando, Hardik Bagdi, Yaohui Hu, Ping Yang, Kartik Gopalan, Charles Kamhoua, and Kevin Kwiat. "Quick eviction of virtual machines through proactive live snapshots." In 2016 IEEE/ACM 9th International Conference on Utility and Cloud Computing (UCC), pp. 99-107. IEEE, 2016.
D. Fernando, H. Bagdi, Y. Hu, P. Yang, K. Gopalan, C. Kamhoua, and K. Kwiat. Quick eviction of virtual machines through proactive snapshots. In 2016 IEEE International Conference on Cluster Computing (CLUSTER), pp. 156-157, Sep. 2016.
M. Hines, U. Deshpande, and K. Gopalan. Post-copy live migration of virtual machines. In ACM SIGOPS Operating Systems Review, 43, No. 3: Jul. 14-26, 2009.
M. R. Hines and Kartik Gopalan. "Post-copy based live virtual machine migration using adaptive pre-paging and dynamic self-ballooning." In Proceedings of the 2009 ACM SIGPLAN/SIGOPS international conference on Virtual execution environments (VEE), pp. 51-60. 2009.
Iperf. The TCP/UDP Bandwidth Measurement Tool, dast.nlanr.net/Projects/Iperf/.
R. Jhawar, V. Piuri, and M. Santambrogio. Fault tolerance management in cloud computing: A system-level perspective. IEEE Systems Journal, 7(2):288-297, Jun. 2013.
A. Kangarlou, P. Eugster, and D. Xu. Vnsnap: Taking snapshots of virtual networked infrastructures in the cloud. IEEE Transactions on Services Computing, 5(4):484-496, 2012.
S. T. King, G. W. Dunlap, and P. M. Chen. Debugging operating systems with time-traveling virtual machines. In Annual Conference on USENIX Annual Technical Conference, pp. 1-1, 2005.
A. Kivity, Y. Kamay, D. Laor, U. Lublin, and A. Liguori. Kvm: The linux virtual machine monitor. In Proc. of Linux Symposium, Jun. 2007.
Y. Kwon, M. Balazinska, and A. Greenberg. Fault-tolerant stream processing using a distributed, replicated file system. Proc. VLDB Endow., 1(1), Aug. 2008.
M. Lu and T. c. Chiueh. Fast memory state synchronization for virtualization-based fault tolerance. In 2009 IEEE/IFIP International Conference on Dependable Systems Networks, 2009.
D. Marques, G. Bronevetsky, R. Fernandes, K. Pingali, and P. Stodghil. Optimizing checkpoint sizes in the c3 system. In the 19th IEEE International Parallel and Distributed Processing Symposium, 2005.
R. McDougall and J. Maura. Solaris internals. In Rachael Borden, 2001. Micro Checkpointing. wiki.qemu.org/features/microcheckpointing. S. J. Mullender, G. van Rossum, A. S. Tananbaum, R. van Renesse, and H. van Staveren. Amoeba: a distributed operating system for the 1990s. Computer, 23(5):44-53, May 1990.
A. B. Nagarajan, F. Mueller, C. Engelmann, and S. L. Scott. Proactive fault tolerance for hpc with xen virtualization. In the 21st Annual International Conference on Supercomputing, pp. 23-32, 2007.
M. Nelson, B. H. Lim, and G. Hutchins. Fast transparent migration for virtual machines. In Proc. of USENIX Annual Technical Conference, Apr. 2005.
J. K. Ousterhout, A. R. Cherenson, F. Douglis, M. N. Nelson, and B. B. Welch. The sprite network operating system. Computer, 21(2):23-36, Feb. 1988.
E. Park, B. Egger, and J. Lee. Fast and space-efficient virtual machine checkpointing. In the 7th ACM SIGPLAN/SIGOPS International Conference on Virtual Execution Environments, pp. 75-86, 2011.
R. F. Rashid and G. G. Robertson. Accent: A communication oriented network operating system kernel. In the Eighth ACM Symposium on Operating Systems Principles, pp. 64-75, 1981.
Redis. In-memory data structure store , redis.io/.
A. Ruprecht, D. Jones, D. Shiraev, G. Harmon, M. Spivak, M. Krebs, M. Baker-Harvey, and T. Sanderson. Vm live migration at scale. In the 14th ACM SIGPLAN/SIGOPS International Conference on Virtual Execution Environments, pp. 45-56.
Y. Tamura, K. Sato, S. Kihara, and S. Moriai. Kemari: Virtual machine synchronization for fault tolerance using domt, ntt cyber space labs. Technical report, Proc. USENIX Annual Technical Conference, 2008.
VMWare Inc. VMWare IncArchitecture of VMware ESXi, www.vmware.com/files/pdf/esxiarchitecture.pdf.
VMWare Inc. VMWare vMotion www.vmware.com/pdf/vmotion datasheet.pdf.
VMWare Inc. VMWare vSphere 6 Fault Tolerance www.vmware.com/files/pdf/techpaper/vmware-vsphere6-ft-arch-perf.pdf. C. Wang, X. Chen, Z. Wang, Y. Zhu, and H. Cui. A fast, general storage replication protocol for active-active virtual machine fault toler-

(56) References Cited

OTHER PUBLICATIONS ance. In 2017 IEEE 23rd International Conference on Parallel and Distributed Systems (ICPADS), pp. 151-160, Dec. 2017.

C. Wang, F. Mueller, C. Engelmann, and S. L. Scott. Proactive processlevel live migration in hpc environments. In International Conference for High Performance Computing, Networking, Storage and Analysis, 2008.

M. Xu, R. Bodik, and M. D. Hill. A "flight data recorder" for enabling full-system multiprocessor deterministic replay. In the 30th International Symposium on Computer Architecture, pp. 122-135, 2003.

Abe, Yoshihisa, Roxana Geambasu, Kaustubh Joshi, and Mahadev Satyanarayanan. "Urgent virtual machine eviction with enlightened post-copy." ACM SIGPLAN Notices 51, No. 7 (2016): 51-64.

Asai, Hirochika. "P2V Migration with Post-Copy Hot Cloning for Service Downtime Reduction." In 2013 International Conference on Cloud and Green Computing, pp. 1-8. IEEE, 2013.

Ben-Yehuda, Muli, Rom Frieman, Abel Gordon, Benoit Hudzia, and Maor Vanmak. "Resilient post-copy live migration using eviction to shared storage in a global memory architecture." U.S. Appl. No. 14/588,424, filed Apr. 7, 2016.

Chen, Xiao, Jian-Hui Jiang, and Qu Jiang. "A Method of Self-Adaptive Pre-Copy Container Checkpoint." In 2015 IEEE 21st Pacific Rim International Symposium on Dependable Computing (PRDC), pp. 290-300. IEEE, 2015.

Chou, Chih, Yuan Chen, Dejan Milojicic, Narasimha Reddy, and Paul Gratz. "Optimizing Post-Copy Live Migration with System-Level Checkpoint Using Fabric-Attached Memory." In 2019 IEEE/ACM Workshop on Memory Centric High Performance Computing (MCHPC), pp. 16-24. IEEE, 2019.

Dadrwal, Ashu, Suryaprakash Nehra, Ali Ahmad Khan, and Mohit Dua. "Checkpoint Based Live Migration of Virtual Machine." In 2018 International Conference on Communication and Signal Processing (ICCSP), pp. 1083-1086. IEEE, 2018.

Deshpande, Umesh, Danny Chan, Steven Chan, Kartik Gopalan, and Nilton Bila. "Scatter-gather live migration of virtual machines." IEEE Transactions on Cloud Computing 6, No. 1 (2015):196-208.

Dhuria, Ritika, and Kiranbir Kaur. "A Hybrid Approach For Reducing Downtime, Migration Time And Energy Consumption of Live VM Migration." International Journal of Advanced Research in Computer Science 8, No. 8 (2017).

Fernando, Dinuni, Jonathan Terner, Kartik Gopalan, and Ping Yang. "Live Migration Ate My VM: Recovering a Virtual Machine after Failure of Post-Copy Live Migration." In IEEE Infocom 2019-IEEE Conference on Computer Communications, pp. 343-351. IEEE, 2019.

Gad, Ramy, Simon Pickartz, Tim Süß, Lars Nagel, Stefan Lankes, Antonello Monti, and André Brinkmann. "Zeroing memory deallocator to reduce checkpoint sizes in virtualized HPC environments." The Journal of Supercomputing 74, No. 11 (2018): 6236-6257.

Gao, Xing, Jidong Xiao, Haining Wang, and Angelos Stavrou. "Understanding the Security Implication of Aborting Live Migration." IEEE Transactions on Cloud Computing (2020).

Hines, Michael R., G. Kartik, and D. Umesh. "Post-Copy Live Migration Of VM." In Proc. of ACM International Conference on Virtual Execution Environments. 2009.

Hirofuchi, Takahiro, Hidemoto Nakada, Satoshi Itoh, and Satoshi Sekiguchi. "Reactive consolidation of virtual machines enabled by postcopy live migration." In Proceedings of the 5th international workshop on Virtualization technologies in distributed computing, pp. 11-18. 2011.

Hirofuchi, Takahiro, Hidemoto Nakada, Satoshi Itoh, and Satoshi Sekiguchi. "Making vm consolidation more energy-efficient by postcopy live migration." In Cloud Computing 2011, The Second International Conference on Cloud Computing, GRIDs, and Virtualization, pp. 195-204. 2011.

Hirofuchi, Takahiro, Hidemoto Nakada, Satoshi Itoh, and Satoshi Sekiguchi. "Reactive cloud: Consolidating virtual machines with postcopy live migration." Information and Media Technologies 7, No. 2 (2012): 614-626.

Hirofuchi, Takahiro, Isaku Yamahata, and Satoshi Itoh. "Postcopy live migration with guest-cooperative page faults." IEICE Transactions on Information and Systems 98, No. 12 (2015): 2159-2167.

Hursey, Joshua. "A Transparent Process Migration Framework for Open MPI." (2012).

Lu, Peng, Antonio Barbalace, and Binoy Ravindran. "HSG-LM: hybrid-copy speculative guest OS live migration without hypervisor." In Proceedings of the 6th International Systems and Storage Conference, pp. 1-11. 2013.

Mabe, Dusty. "The State of Virtual Machine Checkpointing, Live Migration and Replication." (2013).

Mosko, Marc. "Process Migration over CCNx." arXiv preprint arXiv:1707.04835 (2017).

Olivier, Pierre, AKM Fazla Mehrab, Stefan Lankes, Mohamed Lamine Karaoui, Robert Lyerly, and Binoy Ravindran. "HEXO: Offloading HPC Compute-Intensive Workloads on Low-Cost, Low-Power Embedded Systems." In Proceedings of the 28th International Symposium on High-Performance Parallel and Distributed Computing, pp. 85-96. 2019.

Rapoport, Mike, and Joel Nider. "User space memory management for post-copy migration." In Proceedings of the 10th ACM International Systems and Storage Conference, pp. 1-1. 2017.

Rathi, Rakesh. "VM Migration Techniques in Cloud: A Review." International Journal of Computer Applications 975: 8887. 2019.

Sahni, Shashank, and Vasudeva Varma. "A hybrid approach to live migration of virtual machines." In 2012 IEEE International Conference on Cloud Computing in Emerging Markets (CCEM), pp. 1-5. IEEE, 2012.

Shah, Syed Asif Raza, Amol Hindurao Jaikar, and Seo-Young Noh. "A performance analysis of precopy, postcopy and hybrid live VM migration algorithms in scientific cloud computing environment." In 2015 International Conference on High Performance Computing & Simulation (HPCS), pp. 229-236. IEEE, 2015.

Shamsinezhad, Elham, Asadollah Shahbahrami, Alireza Hedayati, Ahmad Khadem Zadeh, and Hamid Banirostam. "Presentation methods for task migration in cloud computing by combination of yu router and post-copy." International Journal of Computer Science Issues (IJCSI) 10, No. 4 (2013): 98.

Shan, Zhongyuan, Jianzhong Qiao, and Shukuan Lin. "Fix page fault in post-copy live migration with RemotePF page table assistant." In 2018 17th International Symposium on Distributed Computing and Applications for Business Engineering and Science (DCABES), pp. 40-43. IEEE, 2018.

Shribman, Aidan, and Benoit Hudzia. "Pre-copy and post-copy vm live migration for memory intensive applications." In European Conference on Parallel Processing, pp. 539-547. Springer, Berlin, Heidelberg, 2012.

Sivagami, V. M. "Efficient Data Transmission during Virtual Machine Failures Using Hybrid Copy Live Migration." Proceedings of National Conference on Communication and Informatics-2016, Organized by Department of Information Technology, Sri Venkateswara College of Engineering, Sriperumbudur.

Soni, Sushil Kumar, and Ravi Kant Kapoor. "Enhanced live migration of virtual machine using comparison of modified and unmodified pages." IJCSMC 3, No. 2 (2014): 779-787.

Stoyanov, Radostin, and Martin J. Kollingbaum. "Efficient live migration of Linux containers." In International Conference on High Performance Computing, pp. 184-193. Springer, Cham, 2018.

Su, Kui, Wenzhi Chen, Guoxi Li, and Zonghui Wang. "Rpff: A remote p. fault filter for post-copy live migration." In 2015 IEEE International Conference on Smart City/SocialCom/SustainCom (SmartCity), pp. 938-943. IEEE, 2015.

Sun, Michael H., and Douglas M. Blough. Fast, lightweight virtual machine checkpointing. Georgia Institute of Technology, 2010.

Svärd, Petter, B. Hudzia, S. Walsh, Johan Tordsson, and Erik Elmroth. "The Noble Art of Live VM Migration-Principles and performance of pre copy, post copy and hybrid migration of demanding workloads." Technical Report, UMINF-12.11 (2014).

(56) References Cited

OTHER PUBLICATIONS

Takano, Ryousei, Hidemoto Nakada, Takahiro Hirofuchi, Yoshio Tanaka, and Tomohiro Kudoh. "Cooperative VM migration for a virtualized HPC cluster with VMM-bypass I/O devices." In 2012 IEEE 8th International Conference on E-Science, pp. 1-8. IEEE, 2012.

Fernando, Denuni, "Fast And Robust Live Virtual Machine Migration", Ph.D. Dissertation, Binghamton University (2019).

M. Nelson, B. Lim, and G. Hutchins. Fast transparent migration for virtual machines. In Proceedings of the annual conference on USENIX Annual Technical Conference, pp. 25-25, 2005.

M. Nelson, B. H Lim, and G. Hutchins. Fast Transparent Migration for Virtual Machines. In USENIX Annual Technical Conference, 2005.

John K. Ousterhout, Andrew R. Cherenson, Frederick Douglis, Michael N. Nelson, and Brent B. Welch. The sprite network operating system. Computer, 21(2):23-36, Feb. 1988.

Eunbyung Park, Bernhard Egger, and Jaejin Lee. Fast and space-efficient virtual machine checkpointing. In the 7th ACM SIGPLAN/SIGOPS International Conference on Virtual Execution Environments, pp. 75-86, 2011.

Richard F. Rashid and George G. Robertson. Accent: A communication oriented network operating system kernel. In the Eighth ACM Symposium on Operating Systems Principles, pp. 64-75, 1981.

Redis. Key-value Cache and Store, redis.io.

Michael Richmond and Michael Hitchens. A new process migration algorithm. SIGOPS Oper. Syst. Rev., 31(1):31-42, 1997.

P. Riteau, C. Morin, and T. Priol. Shrinker: Improving live migration of virtual clusters over wans with distributed data deduplication and content-based addressing. In Proc. of EURO-PAR, Sep. 2011.

Adam Ruprecht, Danny Jones, Dmitry Shiraev, Greg Harmon, Maya Spivak, Michael Krebs, Miche Baker-Harvey, and Tyler Sanderson. Vm live migration at scale. In the 14th ACM SIGPLAN/SIGOPS International Conference on Virtual Execution Environments, pp. 45-56.

Jonathan M. Smith. A survey of process migration mechanisms. SIGOPS Oper. Syst. Rev., 22(3):28-40, Jul. 1988.

Gang Sun, Dan Liao, Vishal Anand, Dongcheng Zhao, and Hongfang Yu. A new technique for efficient live migration of multiple virtual machines. Future Gener. Comput. Syst., 55:74-86, Feb. 2016.

P. Svard, B. Hudzia, J. Tordsson, and E. Elmroth. Evaluation of delta compression techniques for efficient live migration of large virtual machines. In VEE, 2011.

T. Hirofuchi and I. Yamahata. Postcopy live migration for qemu/kvm. grivon.apgrid.org/quick-kvm-migration.

Yoshiaki Tamura, Koji Sato, Seiji Kihara, and Satoshi Moriai. Kemari: Virtual machine synchronization for fault tolerance using domt, ntt cyber space labs. Technical report, Proc. USENIX Annual Technical Conference, 2008.

VMWare Inc. VMware DRS: Dynamic Scheduling of System Resources, www.vmware.com/files/pdf/drs datasheet.pdf.

VMWare Inc. VMWare vSphere 6 Fault Tolerance www.vmware.com/files/pdf/techpaper/vmware-vsphere6-ft-arch-perf.pdf.

VMWare Inc. VMware vSphere vMotion Architecture, Performance and Best Practices in VMware vSphere 5, www.vmware.com/files/pdf/vmotion-perf-vsphere5.pdf.

VMWare Inc. Protecting Mission-Critical Workloads with VMware Fault Tolerance. White Paper, Revision: May 7, 2009 Item: WP-084-PRD-01-02, 2009.

VMWare Knowledge Base. Virtual machine performance degrades while a vMotion is being performed, kb.vmware.com/kb/2007595.

C. A. Waldspurger. Memory resource management in VMware ESX server. In Operating Systems Design and Implementation, Dec. 2002.

H. Wang, Y. Li, Y. Zhang, and D. Jin. Virtual machine migration planning in software-defined networks. IEEE Transactions on Cloud Computing, pp. 1-1, 2017.

Jian Wang, Kwame-Lante Wright, and Kartik Gopalan. Xenloop: A transparent high performance inter-vm network loopback. In Proceedings of the 17th International Symposium on High Performance Distributed Computing, HPDC '08, pp. 109-118, 2008.

D. Williams, H. Jamjoom, Y.-H. Liu, and H. Weatherspoon. Overdriver: Handling memory overload in an oversubscribed cloud. In ACM SIGPLAN/SIGOPS International Conference on Virtual Execution Environments (VEE), 2011.

T. Wood, K. K. Ramakrishnan, P. Shenoy, and J. van der Merwe. Cloudnet: Dynamic pooling of cloud resources by live WAN migration of virtual machines. In Acm Sig-Plan/Sigops International Conference on Virtual Execution Environments (VEE), 2011.

T. Wood, P. Shenoy, A. Venkataramani, and M. Yousif. Sandpiper: Black-box and gray-box resource management for virtual machines. Intl. Journal of Computer and Telecommunications Networking, 53(17), 2009.

Timothy Wood, Prashant Shenoy, Arun Venkataramani, and Mazin Yousif. Blackbox and gray-box strategies for virtual machine migration. In Proceedings of the 4th USENIX Conference on Networked Systems Design & Implementation, NSDI'07, pp. 17-17, 2007.

N. Bila, E. de Lara, K. Joshi, H. A. Lagar-Cavilla, M. Hiltunen, and M. Satyanarayanan. Jettison: Efficient Idle Desktop Consolidation with Partial VM Migration. In Eurosys, Apr. 2012.

I. Zhang, A. Garthwaite, Y. Baskakov, and K. C. Barr. Fast restore of checkpointed memory using working set estimation. In Acm Sigplan/Sigops International Conference on Virtual Execution Environments (VEE), 2011.

M. F. Zhani, Q. Zhang, G. Simona, and R. Boutaba. Vdc planner: Dynamic migration-aware virtual data center embedding for clouds. In 2013 IFIP/IEEE International Symposium on Integrated Network Management (IM 2013), pp. 18-25, 2013.

M. Zhao and R. J. Figueiredo. Experimental study of virtual machine migration in support of reservation of cluster resources. In Virtualization Technology in Distributed Computing (VTDC), 2007 Second International Workshop on, pp. 1-8, 2007.

Jeff Bonwick and Jonathan Adams. Magazines and vmem: Extending the slab allocator to many cpus and arbitrary resources. In USENIX Annual Technical Conference, pp. 15-33, 2001.

Martin Casado, Michael J. Freedman, Justin Pettit, Jianying Luo, Nick Mckeown, and Scott Shenker. Ethane: Taking control of the enterprise. In Proceedings of the 2007 Conference on Applications, Technologies, Architectures, and Protocols for Computer Communications, SIGCOMM '07, pp. 1-12, New York, NY, USA, 2007. ACM.

J. Chiang, H. Li, and T. Chiueh. Working Set-based Physical Memory Ballooning. In The International Conference on Autonomic Computing (ICAC), Jun. 2013.

C. Clark, K. Fraser, S. Hand, J. Hansen, E. Jul, C. Limpach, I. Pratt, and A. Warfield. Live migration of virtual machines. In Symposium on Networked Systems Design & Implementation, pp. 273-286, 2005.

C. Clark, K. Fraser, S. Hand, J.G. Hansen, E. Jul, C. Limpach, I. Pratt, and Warfield. Live Migration of Virtual Machines. In USENIX Symposium on Networked Systems Design and Implementation (NSDI), pp. 273-286, 2005.

C. Clark, K. Fraser, S. Hand, J.G. Hansen, E. Jul, C. Limpach, I. Pratt, and A. Warfield. Live Migration of Virtual Machines. In USENIX Symposium on Networked Systems Design and Implementation (NSDI), 2005.

C. Clark, K. Fraser, S. Hand, J.G. Hansen, E. Jul, C. Limpach, I. Pratt, and A. Warfield. Live migration of virtual machines. In Network System Design and Implementation, 2005.

Brian F. Cooper, Adam Silberstein, Erwin Tam, Raghu Ramakrishnan, and Russell Sears. Benchmarking cloud serving systems with ycsb. In Proceedings of the 1st ACM Symposium on Cloud Computing, SoCC '10, pp. 143-154. ACM, 2010.

Brendan Cully, Geoffrey Lefebvre, Dutch Meyer, Mike Feeley, Norm Hutchinson, and Andrew Warfield. Remus: High availability via asynchronous virtual machine replication. In Proceedings of the 5th USENIX Symposium on Networked Systems Design and Implementation, NSDI'08, pp. 161-174, 2008.

Tathagata Das, Pradeep Padala, Venkata N. Padmanabhan, Ramachandran Ramjee, and Kang Shin. Litegreen: Saving energy in

(56) References Cited

OTHER PUBLICATIONS networked desktops using virtualization. In Proceedings of the 2010 USENIX Conference on USENIX Annual Technical Conference, USENIXATC'10, pp. 3-3, 2010.
U. Deshpande, D. Chan, T. Y. Guh, J. Edouard, K. Gopalan, and N. Bila. Agile live migration of virtual machines. In 2016 IEEE International Parallel and Distributed Processing Symposium (IPDPS), 2016.
U. Deshpande, B. Schlinker, E. Adler, and K. Gopalan. Gang migration of virtual machines using cluster-wide deduplication. In IEEE/ACM International Symposium on Cluster, Cloud and Grid Computing, May 2013.
U. Deshpande, B. Wang, S. Haque, M. Hines, and K. Gopalan. Memx: Virtualization of cluster-wide memory. In Proc. of International Conference on Parallel Processing, Sep. 2010.
U. Deshpande, X. Wang, and K. Gopalan. Live gang migration of virtual machines. In Proc. of High Performance Distributed Computing, Jun. 2010.
U. Deshpande, X. Wang, and K. Gopalan. Live gang migration of virtual machines. In ACM Symposium on High-Performance Parallel and Distributed Computing (HPDC), 2011.
Umesh Deshpande, Danny Chan, Steven Chan, Kartik Gopalan, and Nilton Bila. Scatter-gather live migration of virtual machines. IEEE Transactions on Cloud Computing, pp. (99):1-1, 2015.
Umesh Deshpande, Danny Chan, Steven Chan, Kartik Gopalan, and Nilton Bila. Scatter-gather live migration of virtual machines. IEEE Transactions on Cloud Computing, 2015.
Umesh Deshpande, Danny Chan, Ten-Young Guh, James Edouard, Kartik Gopalan, and Nilton Bila. Agile live migration of virtual machines. In IEEE International Parallel and Distributed Processing Symposium, Chicago, IL, USA, May 2016.
YaoZu Dong, Wei Ye, YunHong Jiang, Ian Pratt, ShiQing Ma, Jian Li, and HaiBing Guan. Colo: Coarse-grained lock-stepping virtual machines for non-stop service. In the 4th Annual Symposium on Cloud Computing, pp. 1-16, 2013.
George W. Dunlap, Samuel T. King, Sukru Cinar, Murtaza A. Basrai, and Peter M. Chen. Revirt: Enabling intrusion analysis through virtual-machine logging and replay. SIGOPS Oper. Syst. Rev., 36:211-224, Dec. 2002.
George Washington Dunlap, III. Execution Replay for Intrusion Analysis. PhD thesis, Ann Arbor, MI, USA, 2006.
Dinuni Fernando, Hardik Bagdi, Yaohui Hu, Ping Yang, Kartik Gopalan, Charles Kamhoua, and Kevin Kwiat. Quick eviction of virtual machines through proactive live snapshots. In Proceedings of the 9th International Conference on Utility and Cloud Computing, UCC '16, pp. 99-107, 2016.
Dinuni Fernando, Jonathan Terner, Ping Yang, and Kartik Gopalan. Live migration ate my vm: Recovering a virtual machine after failure of live migration. In Proceedings of IEEE International Conference on Computer Communications, INFOCOM, 2019.
Google Cloud Platform for Data Center Professionals. cloud. google. com/docs/compare/data-centers/, 2017.
Soudeh Ghorbani and Matthew Caesar. Walk the line: Consistent network updates with bandwidth guarantees. In Proceedings of the First Workshop on Hot Topics in Software Defined Networks, HotSDN '12, pp. 67-72, New York, NY, USA, 2012. ACM.
Edward L. Haletky. VMware ESX Server in the Enterprise: Planning and Securing Virtualization Servers. 1 edition.
F. Hermenier, J. Lawall, and G. Muller. Btrplace: A flexible consolidation manager for highly available applications. IEEE Transactions on Dependable and Secure Computing, 10(5):273-286, 2013.
Fabien Hermenier, Xavier Lorca, Jean-Marc Menaud, Gilles Muller, and Julia Lawall. Entropy: A consolidation manager for clusters. In Proceedings of the 2009 ACM SIGPLAN/SIGOPS International Conference on Virtual Execution Environments, VEE '09, pp. 41-50, 2009.
M. R. Hines, U. Deshpande, and K. Gopalan. Post-copy live migration of virtual machines. SIGOPS Operating System Review, 43(3):14-26, 2009.
Michael R. Hines, Umesh Deshpande, and Kartik Gopalan. Post-copy live migration of virtual machines. SIGOPS Operating System Review, 43(3):14-26, 2009.
Michael R. Hines and Kartik Gopalan. Post-copy based live virtual machine migration using adaptive pre-paging and dynamic self-ballooning. In VEE, pp. 51-60, 2009.
T. Hirofuchi, H. Nakada, S. Itoh, and S. Sekiguchi. Reactive cloud: Consolidating virtual machines with postcopy live migration. IPSJ Transactions on Advanced Computing Systems, pp. 86-98, Mar. 2012.
H. Jin, L. Deng, S. Wu, X. Shi, and X. Pan. Live virtual machine migration with adaptive, memory compression. In Proc. of Cluster Computing and Workshops, Aug. 2009.
C. Jo, E. Gustafsson, J. Son, and B. Egger. Efficient live migration of virtual machines using shared storage. In Acm Sigplan/Sigops International Conference on Virtual Execution Environments (VEE), 2013.
S. M. Kerner. Why facebook does sdn. www.enterprisenetworkingplanet. com/datacenter/why-facebook-does-sdn. html, 2014.
Samuel T. King, George W. Dunlap, and Peter M. Chen. Debugging operating systems with time-traveling virtual machines. In Annual Conference on USENIX Annual Technical Conference, pp. 1-1, 2005.
Avi Kivity, Yaniv Kamay, Dor Laor, Uri Lublin, and Anthony Liguori. Kvm: The linux virtual machine monitor. In Linux Symposium, Jun. 2007.
Thomas Knauth and Christof Fetzer. Vecycle: Recycling VM checkpoints for faster migrations. In Proceedings of the 16th Annual Middleware Conference, pp. 210-221, 2015.
C. Kolivas. Kernbench. ck.kolivas.org/apps/kernbench/ kernbench-0.50/.
YongChul Kwon, Magdalena Balazinska, and Albert Greenberg. Fault-tolerant stream processing using a distributed, replicated file system. Proc. VLDB Endow., 1(1), Aug. 2008.
Linux Foundation. openvswitch.org/.
H. Liu and B. He. Vmbuddies: Coordinating live migration of multi-tier applications in cloud environments. IEEE Transactions on Parallel and Distributed Systems, 26(4):1192-1205, 2015.
H. Lu, C. Xu, C. Cheng, R. Kompella, and D. Xu. vhaul: Towards optimal scheduling of live multi-vm migration for multi-tier applications. In 2015 IEEE 8th International Conference on Cloud Computing, pp. 453-460, Jun. 2015.
V. Mann, A. Vishnoi, A. Iyer, and P. Bhattacharya. Vmpatrol: Dynamic and automated qos for virtual machine migrations. In 2012 8th international conference on network and service management (cnsm) and 2012 workshop on systems virtualiztion management (svm), pp. 174-178, Oct. 2012.
Vijay Mann, Akanksha Gupta, Partha Dutta, Anilkumar Vishnoi, Parantapa Bhattacharya, Rishabh Poddar, and Aakash Iyer. Remedy: Network-aware steady state vm management for data centers. In Proceedings of the 11th International IFIP TC 6 Conference on Networking, vol. Part I, IFIP '12, pp. 190-204. Springer Verlag, 2012.
Daniel Marques, Greg Bronevetsky, Rohit Fernandes, Keshav Pingali, and Paul Stodghil. Optimizing checkpoint sizes in the c3 system. In the 19th IEEE International Parallel and Distributed Processing Symposium, 2005.
Ali Mashtizadeh, Emre Celebi, Tal Garfinkel, and Min Cai. The design and evolution of live storage migration in vmware esx. In Proceedings of the 2011 USENIX Conference on USENIX Annual Technical Conference, USENIXATC'11, pp. 14-14, 2011.
John D. McCalpin. Memory bandwidth and machine balance in current high performance computers. IEEE Computer Society Technical Committee on Computer Architecture (TCCA) Newsletter, pp. 19-25, Dec. 1995.
Richard McDougall and Jim Maura. Solaris internals. In Rachael Borden, 2001.
Nick McKeown, Tom Anderson, Hari Balakrishnan, Guru Parulkar, Larry Peterson, Jennifer Rexford, Scott Shenker, and Jonathan Turner. Openflow: Enabling innovation in campus networks. SIGCOMM Comput. Commun. Rev., 38(2):69-74, Mar. 2008.
Micro Checkpointing. wiki.qemu.org/features/microcheckpointing.

(56) References Cited

OTHER PUBLICATIONS

Microsoft Corp. Hyper-v server 2008 r2. www.microsoft.com/hyper-v-server/en/us/overview.aspx.
R. Miller. Failure rates in google data centers www.datacenterknowledge.com/archives/2008/05/30/failure-rates-in-google-data-centers, 2008.
Dejan S. Miloicic, Fred Douglis, Yves Paindaveine, Richard Wheeler, and Songnian Zhou. Process migration. ACM Comput. Surv., 32(3):241-299, Sep. 2000.
David Mosberger and Tai Jin. Httperfa tool for measuring web server performance. SIGMETRICS Perform. Eval. Rev., 26(3):31-37, Dec. 1998.
MOSIX. www.mosix.org.
S. J. Mullender, G. van Rossum, A. S. Tananbaum, R. van Renesse, and H. van Staveren. Amoeba: a distributed operating system for the 1990s. Computer, 23(5):44-53, May 1990.
Arun Babu Nagarajan, Frank Mueller, Christian Engelmann, and Stephen L. Scott. Proactive Fault Tolerance for HPC with Xen Virtualization. In Proceedings of the 21st Annual International Conference on Supercomputing, pp. 23-32, 2007.
Arun Babu Nagarajan, Frank Mueller, Christian Engelmann, and Stephen L. Scott. Proactive fault tolerance for hpc with xen virtualization. In the 21st Annual International Conference on Supercomputing, pp. 23-32, 2007.
S. Al-Haj and E. Al-Shaer. A formal approach for virtual machine migration planning. In Proceedings of the 9th International Conference on Network and Service Management (CNSM 2013), pp. 51-58, 2013.
Samer Al-Kiswany, Dinesh Subhraveti, Prasenjit Sarkar, and Matei Ripeanu. Vm-flock: Virtual machine co-migration for the cloud. In Proceedings of the 20th International Symposium on High Performance Distributed Computing, HPDC '11, pp. 159-170, 2011.
Amazon Corporation. Amazon Elastic Compute Cloud (EC2), aws.amazon.com/ec2.
Amazon Inc. AWS Server Migration Service. docs.aws.amazon.com/server-migration-service/latest/userguide/server-migration-ug.pdf.
I. Banerjee, P. Moltmann, K. Tati, and R. Venkatasubramanian. VMware ESX Memory Resource Management: Swap. In VMWare Technical Journal, 2014.
P. Barham, B. Dragovic, K. Fraser, S. Hand, T. Harris, A. Ho, R. Neugebauer, I. Pratt, and A. Warfield. Xen and the art of virtualization. SIGOPS Operating Systems Review, 37(5):164-177, 2003.
Paul Barham, Boris Dragovic, Keir Fraser, Steven Hand, Tim Harris, Alex Ho, Rolf Neugebauer, Ian Pratt, and Andrew Warfield. Xen and the art of virtualization. In Proceedings of the Nineteenth ACM Symposium on Operating Systems Principles, SOSP '03, 2003.
M. F. Bari, M. F. Zhani, Q. Zhang, R. Ahmed, and R. Boutaba. Cqncr: Optimal vm migration planning in cloud data centers. In 2014 IFIP Networking Conference, pp. 1-9, Jun. 2014.
F. Bellard. Qemu, a fast and portable dynamic translator. In In ATEC 05: Proceedings of the annual conference on USENIX Annual Technical Conference, 2005.
SPEC CPU 2017 benchmark suite. www.spec.org/cpu2017/.

* cited by examiner

Fig. 1A. The architecture of PostCopyFT.

Fig. 1B. Timeline of PostCopyFT Migrations.

Fig. 2. The total migration time of PostCopyFT and Post-copy for migrating

Fig. 3. The downtime and replication time for migrating idle VMs with different sizes.

Fig. 4. The total migration time of migrating memory write-intensive VMs using post-copy and PostCopyFT.

Fig. 5. The downtime and replication time for migrating memory-write intensive VMs using PostCopyFT.

Fig. 6. The impact of checkpointing interval on the total migration time (idle VM).

Fig. 7. The impact of checkpointing interval on the migration downtime and the replication time (idle VM).

Fig. 8. The impact of checkpointing interval on the total migration time when migrating a 5*GB* memory-write intensive VM.

Fig. 9. The impact of checkpointing interval on downtime and replication time when migrating a 5*GB* memory-write intensive VM.

Fig. 10. The performance impact of post-copy and PostCopyFT on a CPU-intensive QuickSort benchmark.

Fig. 11. Outgoing network bandwidth of post-copy, PostCopyFT with periodic checkpointing, and PostCopyFT with event-based checkpointing, when the migrating VM generates outgoing TCP traffic.

Fig. 12. Outgoing network bandwidth of post-copy, PostCopyFT with periodic checkpointing, and PostCopyFT with event-based checkpointing, when the migrating VM generates outgoing UDP traffic.

Fig. 13. Incoming network bandwidth of post-copy, PostCopyFT with periodic checkpointing, and PostCopyFT with event-based checkpointing, when the migrating VM receives incoming TCP traffic.

Fig. 14. Incoming network bandwidth of post-copy, PostCopyFT with periodic checkpointing, and PostCopyFT with event-based checkpointing, when the migrating VM receives incoming UDP traffic.

Fig. 15. The time taken for recovering a memory write-intensive VM from checkpoints with different sizes.

RECOVERING A VIRTUAL MACHINE AFTER FAILURE OF Post-Copy LIVE MIGRATION

CROSS REFERENCE TO RELATED APPLICATIONS

The present application is a Continuation of U.S. patent application Ser. No. 17/818,234, filed Aug. 8, 2022, now U.S. Pat. No. 11,983,079, issued May 14, 2024, which is a Continuation of U.S. patent application Ser. No. 17/242,508, filed Apr. 28, 2021, now U.S. Pat. No. 11,409,619, issued Aug. 9, 2022, which is a Non-provisional of, and claims benefit of priority from, U.S. Provisional Patent Application No. 63/017,320, filed Apr. 29, 2020, the entirety of which is expressly incorporated herein by reference.

STATEMENT OF GOVERNMENT INTEREST

This invention was made with government support under CNS 1320689 and CNS 1527338 awarded by the National Science Foundation. The government has certain rights in the invention.

FIELD OF THE INVENTION

The present invention relates to the field of live migration of virtual machines.

INCORPORATION BY REFERENCE AND INTERPRETATION OF LANGUAGE

Citation or identification of any reference herein, in any section of this application, shall not be construed as an admission that such reference is necessarily available as prior art to the present application. The disclosures of each reference disclosed herein, whether U.S. or foreign patent literature, or non-patent literature, are hereby incorporated by reference in their entirety in this application, and shall be treated as if the entirety thereof forms a part of this application.

Such cited or identified references are provided for their disclosure of technologies to enable practice of the present invention, to provide basis for claim language, and to make clear applicant's possession of the invention with respect to the various aggregates, combinations, and subcombinations of the respective disclosures or portions thereof (within a particular reference or across multiple references). The citation of references is intended to be part of the disclosure of the invention, and not merely supplementary background information. The incorporation by reference does not extend to teachings which are inconsistent with the invention as expressly described herein (which may be treated as counter examples), and is evidence of a proper interpretation by persons of ordinary skill in the art of the terms, phrase and concepts discussed herein, without being limiting as the sole interpretation available.

The present specification is not to be interpreted by recourse to lay dictionaries in preference to field-specific dictionaries or usage. Where a conflict of interpretation exists, the hierarchy of resolution shall be the express specification, references cited for propositions, incorporated references, the inventors' prior publications, the scrivener's prior publications relating to the field, academic literature in the field, commercial literature in the field, field-specific dictionaries, lay literature in the field, general purpose dictionaries, and common understanding. Where the issue of interpretation of claim amendments arises, the hierarchy is modified to include arguments made during the prosecution and accepted without retained recourse.

BACKGROUND OF THE INVENTION

Live migration of a virtual machine (VM) refers to the transfer of an active VM's execution state from one physical machine to another. Live migration is a key feature and selling point for virtualization technologies. Users and service providers of a virtualized infrastructure have many reasons to perform live VM migration such as routine maintenance, load balancing, scaling to meet performance demands, and consolidation to save energy. For instance, vMotion {38} is a popular features of VMWare's ESX server product. Live migration is also extensively used in Google's production infrastructure to perform over a million migrations {35} per month.

Existing live migration mechanisms aim to move VMs as quickly as possible and with minimal impact on the applications and the cluster infrastructure, and indeed these goals have been extensively studied by both academia and industry. Two dominant live migration mechanisms underlie all migration techniques: pre-copy {6}, {30} and post-copy {16}, {17}. The two techniques differ in whether a VM's CPU execution state is transferred before or after the transfer of its memory pages. In pre-copy, the VM continues executing at the source while its memory contents are transferred to the destination over multiple iterations, at the end of which the CPU execution state is transferred and the VM is resumed at the destination. In contrast, post-copy first transfers the VM's CPU execution state to the destination, where the VM immediately resumes execution while, in the background, the memory pages are actively pushed from source and also retrieved upon page-faults at the destination. Pre-copy works well for applications that mostly read from memory whereas post-copy works well for write-intensive applications that would otherwise prevent pre-copy iterations from converging. Google's data centers {35} use both techniques depending upon the nature of a VM's workload.

An important consideration in live VM migration is the robustness of the migration mechanism itself. Specifically, the source, the destination, or the network itself can fail during live migration. Since a VM encapsulates a cloud customer's critical workload, it is essential that the VM's state is preserved accurately and not lost due to failures during migration. Let's consider a VM's recoverability after a failure during live migration. In both pre-copy and post-copy, the failure of the source node during migration results in a permanent loss of the VM because some or all of the latest state of the VM resides at the source during migration.

However, the two approaches differ in their response to failure of the destination node or the network. For pre-copy, either of these failures is not catastrophic because the source node still holds an up-to-date copy of the VM's execution state from which the VM can be resumed after migration failure. However, for post-copy, a destination or network failure has a more severe implication because the latest state of the VM is split across the source and destination. The destination node has a more up-to-date copy of the VM's execution state and a subset of its memory pages, whereas the source node has pages that have not yet been sent to the destination.

Thus, a failure of the destination or the network during post-copy migration also results in a complete loss of the VM. This failure scenario during post-copy live migration and the resulting loss of VM has not been addressed in existing literature. The problem is important because a VM is particularly vulnerable during migration. VM migration may last anywhere from a few seconds to several minutes, depending on factors such as the VM's memory size and load on the cluster. Thus, the window of vulnerability can be large. Additionally, since the VM is live, it is executing code that might communicate over the network with remote entities, altering the external world's view of the VM's state.

Pre-copy: In pre-copy live migration {6}, {30}, the VM's memory pages are transferred to the destination host over multiple iterations. In the first iteration, the entire memory state of the VM is transferred and the subsequent iterations transfer only the modified memory pages. When the estimated downtime (the duration when the VM is suspended during migration) is less than a threshold, the VM on the source host is paused and the remaining dirty pages, the device state, and the CPU state are transferred to the destination. The VM is then resumed on the destination.

Post-copy: In post-copy live migration {16}, {17}, the VM is first suspended on the source host and the CPU state is transferred to the destination host where the VM is resumed immediately. The source then actively sends the memory pages to the destination. This stage is known as the active push phase, with the expectation that most pages would be received by the destination before they are accessed by the VM. If the VM accesses a page that has not yet received by the destination, then a page fault is triggered and the source sends the faulted page to the destination (called demand paging). During post-copy, after the VM resumes on the destination, the guest OS and all applications inside the VM continue execution on the destination machine.

VM Replication: High availability solutions, such as Remus {7}, maintain a consistent replica of a VM during its normal execution. A checkpoint cycle in Remus consists of four stages: VM execution, VM replication, checkpoint transfer, and buffer release. In the first stage, the VM executes, the outgoing network packets of the VM are buffered, and the incoming network requests are served. The outgoing network packets are buffered to ensure that the state of the backup VM will be consistent with the external world during the restoration, if the primary VM crashes in the middle of a checkpoint. The buffer cannot hold the packets for too long as it increases the response latency of the network packets. When the epoch time, defined by the user, is reached, the VM is checkpointed (the second stage), which creates a replica of the primary VM. In this stage, the VM is paused in order to capture the entire system state accurately. The checkpoint is then transferred to the backup node (the third stage). Once the checkpoint is committed to the backup node, the buffered outputs are released.

Checkpointing based fault-tolerance: Almost all virtualization platforms {2}, {22}, {37} support VM checkpointing and restoration. In checkpointing, the memory state of a VM is captured and preserved locally or remotely. During a failure situation, the VM is rolled back/restored to the previously checkpointed state. However, after the restoration, the VM states between the last checkpoint and the time when the failure occurs are lost. Checkpointing can be done at either the application level {25}, {41} or the whole system level {7}, {10}, {13}, {19}, {20}, {23}, {24}, {27}, {29}, {32}. Several operating systems {1}, {28}, {31}, {33} were developed to support process-level migration. The main challenge in process level migration for fault tolerance is that the migrated process leaves residual dependencies in the source machine and the solutions for high availability process level checkpoint/restoration have to deal with such dependencies. Compared to the application specific checkpointing schemes, whole system checkpoints provide more reliability and higher availability with significantly higher cost.

The traditional way of achieving fault tolerance via check-pointing is an active-passive approach {7}, {27}, {39} where the backup node gets the control once the primary VM failed. However, the active-passive approaches suffer from extra network latency due to outgoing network packet buffering, large memory state transfer, and high checkpointing frequency. To provide seamless failover restoration, active-active replications {10}, {40} are introduced in which the primary and backup VMs execute in parallel. These systems compare the responses to client requests to decide when the checkpoint should be triggered. If the output of both primary and backup VMs diverges, committing of network responses is withheld until the primary VM's memory state is synchronized with the backup VM. Network buffering latency is common for both active-passive and active-active approaches. Instead of buffering external events (i.e., network packets), Kemari {36} initiates the checkpoint of the primary VM when the hypervisor starts duplicating the external events to the backup VM. None of the above approaches applied periodic or event-based replication fault tolerance solutions to handle destination failure during live migration.

Logging and replay based fault-tolerance: Logging mechanisms can replay events at runtime to ensure the identical backup of the primary VM. Bressoud et al. {5} proposed a hypervisor-based fault tolerance approach in which the hypervisor logs each instruction level operation on the primary VM and replayed the logged state on the secondary VM. Although logging can be done in the virtual machine monitor (VMM) {5}, {11}, {21}, {29}, deterministic replay relies on the architecture of the VMM and cannot be easily viable to multicore CPUs. Approaches such as Flight Data Recorder {42} sniff cache traffic to infer how shared memory is accessed. Dunlap {12} used CREW (concurrent read, exclusive write) protocol on shared memory to capture the access order. However, deterministic replay mechanisms work with high overhead.

Live migration as a VM fault-tolerance technique: Techniques have also been developed to quickly evict VMs from the source to the destination machine upon imminent failure of the source machine {8}, {9}, {14}, {15}. However, none of them protect the VM against the failure of the live migration itself.

SUMMARY OF THE INVENTION

A solution for VM migration is provided, called PostCopyFT, to recover a VM after the failure of destination node or network during post-copy live migration. During post-copy, once a VM resumes execution at the destination, the destination concurrently transmits reverse incremental checkpoints of the VM back to the source node. This reverse checkpointing proceeds concurrently, and in coordination with, forward post-copy migration from source to destination. If the destination or the network fails during migration then the source node recovers the VM from the last consistent checkpoint that it received from the destination.

PostcopyFT provides an approach to recover a VM when the source, the destination or the network fail during the post-copy live migration. To handle the source failure during the migration, prior to the migration, the source host periodically transfers the incremental memory checkpoints of the VM to the checkpoint cache store. Once the migration starts, the latest memory state of the VM is captured and transferred to the checkpoint cache store. To handle the destination and network failure during the migration, the destination host transmits the reverse incremental checkpoints of the VM back to the checkpoint cache store as soon as a VM resumes execution at the destination. Reverse checkpointing proceeds concurrently, and in coordination with, the forward post-copy migration from source to destination. If the source, the destination, or the network fails during the migration, then the destination or the source node recovers the VM from the last consistent checkpoint that it received from the checkpoint cache store.

PostCopyFT supports either periodic or event-based reverse incremental checkpointing, with different benefits. The reverse checkpoints are much smaller than full-VM checkpoints because they consist only of the VM's modified memory pages since the last checkpoint, and its CPU and I/O state. For checkpoint consistency, PostCopyFT buffers packet transmissions to external world between successive reverse checkpoints.

PostCopyFT is developed to recover the VM when the source, the destination, or the network fails during the post-copy migration of the VM. FIG. 1B gives the architecture of PostCopyFT. PostCopyFT consists of two main components: a forward checkpointing component (called PostCopyFT-forward) that handles the failure of the source host and a backward checkpointing component (called PostCopyFT-reverse) that handles the failure of the destination host and the network. The timeline of PostCopyFT is shown in FIG. 1B.

A PostCopyFT prototype was implemented and evaluated in the KVM/QEMU virtualization platform. The results show that, when using PostCopyFT, the total migration time of post-copy remains unchanged. There is a small increase in the cumulative downtime experienced by the VM when using periodic reverse incremental checkpoints, while event-based checkpoints further reduce this overhead.

Design

During the post-copy migration, the VM's state is split between the source and the destination nodes. As a result, a failure of the destination node or in the network during the migration may lead to the complete loss of the VM. PostCopyFT is developed to recover the VM in this failure scenario. FIG. 1A shows the architecture of PostCopyFT. FIG. 1B shows a timeline for operation of PostCopyFT.

A. Reverse Incremental Checkpointing

The first step of post-copy migration is to transfer the execution state of the VM, along with a minimal non-pageable memory state, to the destination. The VM is resumes at the destination while concurrently receiving the VM's pages from the source. PostCopyFT superimposes a reverse incremental checkpointing mechanism over this forward transfer of VM state. Specifically, once the migrating VM is resumed at the destination, PostCopyFT captures the VM's initial execution state and memory at the destination and transfers them to a checkpoint store. This checkpoint store is an in-memory key-value store located at either the source node or a third staging node. Then onwards, PostCopyFT captures any incremental changes in the VM's state, including the execution state and any modified memory pages, either periodically or upon an I/O activity of the VM, and forwards these to the checkpoint store. This checkpointing mechanism stops once post-copy migration successful completes the VM's migration to the destination.

B. Failure Recovery

When the network or the destination node fails due to a hardware or software failure, the source node triggers a restoration process. The source node uses heartbeat messages to monitor the liveness and reachability of the destination node. When successive heartbeat messages are not acknowledged by the destination, the migration is considered to have failed. The source then recovers the VM by restoring the last consistent copy of each memory page from the checkpoint store on the VM's memory address space. Pages not modified by the destination do not need to be overwritten. Finally, the VM is resumed at the source from the latest checkpointed CPU execution state to complete the VM's recovery.

C. Network Buffering

To ensure the consistency of VM checkpoints, PostCopyFT buffers packet transmissions to external world between successive incremental checkpoints. The incoming network packets of the migrating VM are delivered to the VM immediately, but the outgoing network packets are buffered until the current reverse checkpoint is committed. The packets in the network buffer are then transmitted and the VM is resumed. This ensures that no network packets are transmitted before the corresponding checkpoint is committed to the checkpoint store. Thus, if the destination or network fails during the migration, PostCopyFT guarantees that the latest committed checkpoint reflects a consistent state of the VM to the external world.

D. Checkpointing Overhead Reduction

One of the requirements in PostCopyFT design is that the reverse incremental checkpointing mechanism should not significantly increase the total migration time if the migration succeeds. To satisfy this requirement, reverse checkpointing is implemented as a separate thread that runs concurrently with the VM. The only time this thread affects the VM's execution is when suspending the vCPUs briefly to capture their execution state. The active-push phase from the source to destination runs concurrently with the reverse checkpointing mechanism even when the vCPUs are paused. This helps PostCopyFT to achieve similar total migration time as postcopy live migration.

A second design requirement is that PostCopyFT's reverse checkpointing mechanism should not significantly increase the VM downtime. PostCopyFT introduces the following two optimizations for this purpose.

Performing incremental VM checkpointing in two stages: Periodic VM checkpointing may increase the downtime of migrating memory-write intensive VMs whose memory pages are dirtied rapidly. To reduce the downtime, PostCopyFT performs VM checkpointing in two stages. In Stage I, PostCopyFT checkpoints only the modified memory pages of the VM, but not its execution state, which includes the VM's CPU and device states. The modified memory pages are checkpointed without pausing the VM and hence Stage I does not increase VM downtime. In Stage II, the VM is paused briefly to capture the VM's execution state. Once Stage II is completed, the VM resumes its execution. The committed checkpoint contains the memory pages checkpointed in both stages. If a memory page is checkpointed in both stages, then the page checkpointed in Stage I is overwritten by that checkpointed in Stage II to ensure that the checkpoint contains the most up-to-date page. The experimental results show that performing checkpointing in two stages significantly reduces the migration downtime, compared to if the VM was paused during memory capture.

Storing checkpoints locally: In Stage I, the VM's memory states are first copied to a local in-memory storage without waiting for the checkpoints to be transferred or synchronized with the staging node storing the checkpoints. After State II, the VM is resumed and the checkpointed memory and execution states are transferred to the staging node.

In contrast to existing techniques which aim to recover a VM after failure during normal execution, PostCopyFT is the first approach to address the problem of VM recovery after failure during live migration.

Forward Checkpointing

When a VM starts executing on a physical machine, PostCopyFT-forward checkpoints the VM's memory state and transfers the checkpoint to a checkpoint cache store. The checkpoint cache store is an in-memory key-value store located at a staging node (neither the source nor the destination host). PostCopyFT-forward then captures the VM's modified memory pages periodically. Note that each individual snapshot captured in the forward checkpointing stage does not need to be complete or fully consistent; instead, all memory snapshots together represent the progress towards the complete VM memory state. The above process is similar to pre-copy except that the snapshots are transferred during the normal execution of the VM (instead of during the migration), and are sent periodically. When the migration starts, the VM is suspended, the modified memory pages are checkpointed, and the execution state of the VM is transferred to the destination. As these live incremental memory checkpoints are captured without pausing the VM, the VM's down-time is unchanged due to forward checkpoints.

If the source machine fails during the migration, PostCopyFT detects the absence of the source and triggers the VM restoration at destination by retrieving the checkpointed state from the checkpoint cache that stores incremental memory checkpoints.

To reduce the checkpointing overhead, PostCopyFT-forward may be implemented as a separate thread that runs in parallel to VM's normal execution. The VM's memory state is captured without suspending the VM's vCPUs. Once the migration process starts, PostCopyFT-forward checkpoints only the incremental changes of the VM's memory state. As the VM's snapshot size linearly grows with the VM's size. The time taken to restore VM upon failover relies on the checkpoint size. In addition, the checkpoints can be loaded ahead of time to reduce the VM recovery time upon failure.

Reverse Incremental Checkpointing

The first step of post-copy migration is to transfer the execution state of the VM, along with a minimal non-pageable memory state, to the destination. The VM is resumed at the destination while concurrently receiving the VM's pages from the source. PostCopyFT-reverse superimposes a reverse incremental checkpointing mechanism over this forward transfer of VM state. Specifically, once the migrating VM is resumed at the destination, PostCopyFT-reverse captures the VM's initial execution state and memory at the destination and transfers them to a checkpoint store. From then onwards, PostCopyFT-reverse captures any incremental changes in the VM's state, including the execution state and any modified memory pages, either periodically or upon an I/O activity of the VM, and forwards these to the checkpoint store. This checkpointing mechanism stops once post-copy migration successful completes the VM's migration to the destination.

Network Buffering

To ensure the consistency of VM checkpoints, PostCopyFT-reverse buffers packet transmissions to external world between successive incremental checkpoints. The incoming network packets of the migrating VM are delivered to the VM immediately, but the outgoing network packets are buffered until the current reverse checkpoint is committed. The packets in the network buffer are then transmitted and the VM is resumed. This ensures that no network packets are transmitted before the corresponding checkpoint is committed to the checkpoint store. Thus, if the destination or network fails during the migration, PostCopyFT-reverse guarantees that the latest committed checkpoint reflects a consistent state of the VM to the external world.

PostCopyFT-Reverse Checkpointing Overhead Reduction

One of the requirements in PostCopyFT-reverse design is that the reverse incremental checkpointing mechanism should not significantly increase the total migration time if the migration succeeds. To satisfy this requirement, reverse checkpointing is preferably implemented as a separate thread that runs concurrently with the VM. The only time this thread affects the VM's execution is when suspending the vCPUs briefly to capture their execution state. The active-push phase from the source to destination runs concurrently with the reverse checkpointing mechanism even when the vCPUs are paused. This helps PostCopyFT-reverse to achieve similar total migration time as post-copy live migration.

A second design requirement is that PostCopyFT-reverse's reverse checkpointing mechanism should not significantly increase the VM downtime. PostCopyFT-reverse introduces the following two optimizations for this purpose.

Performing incremental VM checkpointing in two stages: Periodic VM checkpointing may increase the downtime of migrating memory-write intensive VMs whose memory pages are dirtied rapidly. Algorithm 1 gives the pseudo code for periodic checkpointing while algorithm 2 gives pseudo code for event based checkpointing. To reduce the downtime, PostCopyFT-reverse performs VM checkpointing in two stages. In Stage I, PostCopyFT-reverse checkpoints only the modified memory pages of the VM, but not its execution state, which includes the VM's CPU and device states. The modified memory pages are checkpointed without pausing the VM and hence Stage I does not increase VM downtime.

In Stage II, the VM is paused briefly to capture the VM's execution state. Once Stage II is completed, the VM resumes its execution. The committed checkpoint contains the memory pages checkpointed in both stages. If a memory page is checkpointed in both stages, then the page checkpointed in Stage I is overwritten by that checkpointed in Stage II to ensure that the checkpoint contains the most up-to-date page. Experimental results show that performing checkpointing in two stages significantly reduces the migration downtime, compared to if the VM was paused during memory capture.

Storing checkpoints locally: In Stage I, the VM's memory states are first copied to a local in-memory storage without waiting for the checkpoints to be transferred or synchronized with the staging node storing the checkpoints. After State II, the VM is resumed and the checkpointed memory and execution states are transferred to the staging node.

Failure Recovery

When the network or the destination node fails due to a hardware or software failure, the source node triggers a restoration process. Upon failure of the source node during migration, the destination triggers a restoration process. The source and destination nodes use heartbeat messages to monitor the liveness and reachability of each other. When successive heartbeat messages are not acknowledged by the source or the destination, the migration is considered to have failed. Upon failure of the destination, the source then recovers the VM by restoring the last consistent copy of each memory page from the checkpoint store on the VM's memory address space. Pages not modified by the destination do not need to be overwritten. Finally, the VM is resumed at the source from the latest checkpointed CPU execution state to complete the VM's recovery. Restoration process for the source node failure is live. The restoration manager at the destination loads missing pages from the checkpoint cache pages that have not yet received by destination during migration. Recovery of VM during source failure is live because destination already contains latest execution state where VM is continuously running during restoration process.

Algorithm 1 PostCopyFT Periodic Checkpointing Algorithm

```
1:  ▷ Initial preparation
2:     Perform initial ft bitmap declaration, memory allocation;
3:     Set all bits in ft bitmap to zero
4:  ▷ Snapshot Phase
5:     Start global dirty log
6:     do
7:     Set Network barrier to Buffer network packets
8:     sleep(snapshot interval) _
9:     sync bitmap(ft bitmap)
10:       Capture dirty pages and store in in-memory local data structure
          ▷ Memory Snapshot I
11:    Pause the VM
12:    Capture CPU and I/O state and store in in-memory local data
       structure
13:    sync bitmap(ft bitmap)
14:       Capture dirty pages and store in in-memory local data structure
          ▷ Memory Snapshot II
15:    Resume the VM
16:    Transfer in-memory locally stored entire checkpoint to cache store
17:       Commit the completed checkpoint iteration to cache store
18:       Release Network barrier to deliver buffered network packets
19:    while (Incoming migration is active)
20:    Stop global dirty log
```

ALGORITHM 2

PostCopyFT Event-based Checkpointing Algorithm

```
1:  ▷ Initial preparation
2:     Perform initial ft bitmap declaration, memory allocation
3:     Set all bits in ft bitmap to zero
4:  ▷ Snapshot Phase
5:     Start global dirty log
6:     do
7:     if(external event triggered)
8:     Set network barrier to Buffer network packets
9:     Pause the VM
10:    Capture CPU and I/O state and store in in-memory local data
       structure;
11:    sync bitmap(ft bitmap)
12:    Capture dirty pages and store in in-memory local data structure
13:    Resume the VM
14:    Transfer in-memory locally stored entire checkpoint to cache store
15:    Commit the completed checkpoint iteration to cache store
16:    Release network buffer and Deliver buffered network packets
17:    end if
18:    while (Incoming migration is active)
19:    Stop global dirty log
```

Implementation

PostCopyFT was implemented on the KVM/QEMU virtualization platform version 2.8.1.1. The guest OS and applications running inside the VM is unmodified. Each VM in KVM/QEMU is associated with a userspace management process, called QEMU, which performs I/O device emulation and various management functions, including migration and checkpointing. The userspace QEMU process communicates with a kernel-space hypervisor, called KVM, which uses hardware virtualization features to execute the VM in guest mode (or non-root mode).

In the implementation, a heartbeat mechanism is used as a simple detector to detect source, destination and network failure. The heartbeat module was implemented as a separate thread on the source and destination host to continuously monitor the availability of the destination/source node accordingly by periodically sending ping requests to the destination/source and wait for response. If the heartbeat module cannot reach the destination/source host for a time interval, then destination/source node is considered to be in a crashed or failure state and the source/destination host immediately triggers a failover. This will result the source/destination to start restoring VM from the latest available state.

PostCopyFT-Forward: Forward Checkpointing

PostCopyFT-forward was implemented based on the pre-copy implementation in KVM/QEMU. During the normal execution of VMs, PostCopyFT-forward periodically captures the memory state of a running VM incrementally transfers checkpoint state to in-memory checkpoint cache store. The first checkpoint round in PostCopyFT-forward captures the entire VM's memory footprint and the successive rounds capture the modified memory pages in the previous rounds. When VM is suspended at source during post-copy migration, PostCopyFT-forward captures the final checkpoint to reflect the latest VM state and commit to the in-memory checkpoint cache. This final checkpoint state capture runs in parallel to the migration process.

PostCopyFT-forward also utilizes the dirty page tracking mechanism in KVM/QEMU to identify the modified memory pages of the VM in userspace as part of the checkpointing processes. The dirty page tracking mechanism represents the VM's memory content as a bitmap, in which each bit specifies whether a guest page is modified or not. PostCopyFT-forward utilizes separate bitmap that is different to migration bitmap to identify VM's incremental memory state updates. These bitmaps are synchronized with the physical memory to reflect the latest modified pages on the userspace bitmaps. In PostCopyFT-forward, memory checkpoints are incremental and memory footprint of the VM is scattered over all captured checkpoints.

Live Restoration in PostCopyFT-Forward

During the migration, PostCopyFT-forward restoration manager is implemented as a separate thread that starts loading pre-captured memory checkpoints as a safeguard step to minimize failover time upon a failure. Further, a separate thread starts accounting successfully loaded memory during migration. Upon source failure, the restoration process on the destination machine tries to restore the VM from the forward snapshots. To reform the latest complete memory footprint of the VM, all memory checkpoints are merged to avoid duplicates and to showcase the latest VM state. Then restoration manger compares already loaded memory pages from the migration to find the missing memory pages from the destination VM. Then pages that have not yet been sent to the destination (i.e., delta difference) is loaded by the restoration manager. During this live restoration VM continues to execute.

PostCopyFT-reverse: Reverse Checkpointing

In parallel to the post-copy migration, PostCopyFT-reverse was implemented as a simultaneous thread to keep track of the modified memory and execution states of the VM running on the destination node, and transfer them to the checkpoint cache store on an external node. This parallel execution helps to rapidly offload the memory and execution state of the migrating VM to the checkpoint cache store upon the destination failure.

Checkpoint Cache Store

Several key factors are considered when selecting a checkpoint cache for PostCopyFT. In order to store both forward and reverse incremental snapshots, the checkpoint cache store should be an in-memory cache, provide duplicate filtering, and allow for checkpoint versioning. Upon a failure situation, the checkpoint cache store may contain several captured checkpoints in different checkpoint iterations. The checkpoint cache needs to maintain each VM checkpoint iteration separately along with version that represents the most recently committed checkpoint. That way, there is no ambiguity as to if a checkpoint is complete or not, and partially incomplete checkpoints can be discarded if a failure occurs in the middle of a checkpoint. To implement PostCopyFT checkpoint cache, Redis{85} in-memory distributed key-value store was used. The redis clients reside on the source and destination hosts, while the Redis server resides on the backup staging node which excludes source or destination nodes. The checkpointed memory state is stored in a map data structure in Redis. Each completed state in checkpoint cycle is separated with a version number to denote the checkpoint iteration and each memory page is stored as key-value pair. Once the checkpoint is transferred to the checkpoint cache store, a version number is updated to uniquely identify each completed checkpointed state.

To improve the resiliency of checkpoint cache, existing fault-tolerant techniques may be used, such as running multiple masters as backups or use continuous health monitoring techniques such as Redis Sentinel to detect failure of checkpoint cache beforehand.

Capturing Memory and Execution State

To begin with PostCopyFT-reverse at the destination node, a network barrier is inserted to buffer outgoing network packets from the VM. The checkpointing thread then periodically sends the memory state of the VM to the staging node. In the KVM/QEMU post-copy migration, dirty page tracking is performed only at the source node to capture the modified memory state of the migrated VM. In PostCopyFT-reverse, dirty page tracking also needs to be performed at the destination in order to send the reverse incremental snapshots of the VM to the checkpoint cache store. As to result, traditional post-copy implementation was modified to enable dirty page tracking on the destination. Once the VM resumes on the destination, the reverse checkpoint thread on QEMU makes an ioctl call to inform KVM to start dirty page tracking. During each checkpointing cycle, to capture the modified VM states, PostCopyFT-reverse uses another ioctl call to synchronize the QEMU bitmap with the KVM physical bitmap. PostCopyFT-reverse then captures the modified memory state by reading the destination QEMU bitmap and transfers the snapshot to the checkpoint cache store.

The execution state of a VM consists of the vCPU state and the I/O device state, which keeps changing during the execution of the VM. PostCopyFT-reverse captures the execution state of the VM and writes it to a channel buffer. The channel buffer is an in-memory buffer that provides facility to perform I/O operations to and from memory buffers. The channel buffer then transfers the entire device/CPU state (as a blob of all devices state) to the checkpoint cache store.

An event-based reverse checkpointing algorithm was implemented to reduce the network packet buffering latency. The event-based approach checkpoints system states only when an external event (e.g., outgoing network packets) is triggered. As a result, the event-based approach captures the system state less frequently and hence reduces the migration downtime. In addition, because the network-intensive workload usually does not dirty significant amount of memory pages, the event-based approach synchronizes the memory state only once during the checkpoint cycle (i.e., when the VM is paused), which reduces the overhead of delaying network packets.

Reducing Migration Downtime in PostCopyFT-Reverse

Traversing the bitmap for modified pages and transferring each modified page to the checkpoint cache increases the migration downtime due to the synchronization overhead of each write request. As the VM memory size grows, the time taken to transfer each memory page also increases. To address this issue, instead of sending the checkpoint directly to the checkpoint cache store on the source host, the entire memory state (i.e., memory, vCPU and I/O state) is first transferred to an in-memory, dynamically sized local data structure checkpoint stage at the destination and then to the checkpoint store. The checkpoint stage is similar to the implementation of Linux Kernel cache-slab. It consists of a vector of pointers that point to contiguous memory chunks. Each memory chunk contains a series of page data and page keys. Once all chunks are filled, the list is doubled, and new chunks are allocated. Storing checkpointed state locally reduces the VM downtime caused by the synchronous writes and provides the assurance of completeness in checkpoint. As this extra memory layer contains the complete VM state, the VM can resume and transfer the checkpointed state to the checkpoint cache store and release buffered network packets.

Restoration in PostCopyFT-Reverse

Once PostCopyFT-reverse detects the destination or network failure in post-copy, the restoration process on the source machine tries to restore the VM from the reverse snapshots. The restoration process was implemented as a non-live process. To build up the entire memory state, PostCopyFT restoration process loads the memory checkpoints into a hash table. The hash table provides the capability to update the memory page with the most recently modified the page and merge duplicate pages. Restoration thread then loads the memory pages and places the page content on the allocated and mapped host memory address space using mmap( ). Next, the restoration process loads the most recent execution state of the VM received from the destination and resumes the VM.

It is therefore an object to provide a method for migration of a virtual machine from a source to a destination, comprising: communicating an execution state of the virtual machine at the source to the destination; initiating execution of the tasks by the virtual machine on the destination, based on the communicated state of the central processing unit of the virtual machine; transferring a respective memory page from the source to the destination, during a migration of the virtual machine, in response to a page fault occurring at the destination due to unavailability of the respective memory page; communicating an incremental checkpoint from the virtual machine executing on the destination; and recovering the virtual machine at the source based on at least the communicated incremental checkpoint from the virtual machine executing on the destination.

The incremental checkpoint may comprise memory pages modified by the virtual machine since a prior incremental checkpoint, a central processing unit state of the virtual machine, and an input/output state of the virtual machine.

The incremental checkpoint may be communicated from the virtual machine executing on the destination is a consistent checkpoint.

The method may further comprise determining if the virtual machine on the destination fails successful migration, recovering the virtual machine at the source in event of migration failure.

The virtual machine at the source may be recovered in a state subsequent to the initiation of execution of the tasks by the virtual machine on the destination.

The method may further comprise proactively transferring memory pages from the source to the destination independent of occurrence of a page fault.

The method may further comprise ceasing execution of tasks by the virtual machine on the source before initiating execution of the tasks by the virtual machine on the destination.

The method may comprise defining an execution state of the virtual machine at the source before communicating the execution state of the virtual machine.

The method may further comprise communicating the incremental checkpoint from the virtual machine executing on the destination, while the migration of the virtual machine to the destination is in progress.

The method may further comprise providing a checkpoint manager, configured to: store a checkpoint of the source comprising the execution state of the virtual machine at the source; and store the incremental checkpoint from the virtual machine executing on the destination.

The method may further comprise communicating the incremental checkpoint from the virtual machine executing on the destination to a checkpoint manager.

The method may further comprise concurrently transferring the respective memory page from the source to the destination in response to the page fault occurring at the destination and communicating the incremental checkpoint from the virtual machine executing on the destination.

The method may further comprise, prior to initiating execution of the tasks by the virtual machine on the destination, obtaining a series of incremental checkpoints of the source.

The series of incremental checkpoints of the source may be stored in a checkpoint cache store.

The communicated incremental checkpoint from the virtual machine executing on the destination may comprise a virtual CPU state, an input/output state, and a memory state of the virtual machine executing on the destination prior to persistently changing a state outside of the virtual machine since a prior communicated incremental checkpoint.

The incremental checkpoint may be committed before external environment changes are made by the virtual machine.

The incremental checkpoint from the virtual machine executing on the destination may be communicated periodically.

The method may further comprise remapping input/output in a communication device between the source and the destination.

The method may further comprise, upon initiation of migration of the virtual machine, informing a system resource which manages input/output operations of migration between the source and the destination.

The method may further comprise, upon initiation of migration of the virtual machine, informing a system resource which manages memory pages of migration between the source and the destination.

The incremental checkpoint from the virtual machine executing on the destination may consist essentially of memory pages modified since a prior incremental checkpoint, a CPU state of the virtual machine and an input/output state of the virtual machine.

The method may further comprise buffering communications from the virtual machine at the destination before committing changes to an external environment until an incremental checkpoint is communicated reflecting the prospective changes to the external environment.

The communicated incremental checkpoint may be stored in a checkpoint store as an in-memory key-value.

The incremental checkpoint may be communicated is response to uncommitted input/output requests of the virtual machine at the destination.

The method may further comprise ceasing communicating the incremental checkpoint from the virtual machine executing on the destination when migration of the virtual machine to the destination is complete.

Contingent upon a failure of the virtual machine at the destination, or communications with the virtual machine at the destination, the source may initiate recovery of the virtual machine.

The method may further comprise communicating heartbeat messages from the destination to the source, and in event of failure of the heartbeat messages, triggering recovery of the virtual machine at the source.

The method may further comprise communicating acknowledgement of memory page receipt from the destination to the source, and in event of failure of the acknowledgement of memory page receipt, triggering recovery of the virtual machine at the source.

The virtual machine may execute under a hypervisor, and heartbeat messages may be communicated from the destination to the source, and in event of failure of the heartbeat messages, trigger recovery of the virtual machine by the hypervisor at the source.

The virtual machine executes under a hypervisor, and acknowledgement of memory page receipt from the destination to the source communicated, and in event of failure of the acknowledgement of memory page receipt, trigger recovery of the virtual machine by the hypervisor at the source.

The virtual machine may execute under a hypervisor, and the incremental checkpoint may be generated by the hypervisor.

A liveness of the destination may be determined based on a series of heartbeat messages, a failure of the migration determined dependent on loss of a plurality of heartbeat messages.

The method may further comprise recovering the virtual machine at the source selectively dependent on the loss of the plurality of heartbeat messages.

The method may further comprise recovering the virtual machine at the source from a last consistent copy of each memory page from a series of incremental checkpoints from the destination.

The method may further comprise resuming execution of the virtual machine at the source.

The method may further comprise buffering outgoing packet transmissions to external resources between successive incremental checkpoints.

The method may further comprise immediately delivering incoming network from external resources between successive incremental checkpoints.

The method may further comprise pausing execution of the virtual machine at the destination during generation of an incremental checkpoint.

The method may further comprise transmitting the buffered outgoing packets after resumption of execution of the virtual machine.

The incremental checkpoint may be generated within a hypervisor that supports the virtual machine as a separate thread or process from the virtual machine.

The source may proactively communicate memory pages to the destination absent a memory fault with respect to the memory pages, concurrently with receipt of the incremental checkpoint.

The source may communicate memory pages to the destination, concurrently with receipt of the incremental checkpoint, while execution of the virtual machine is paused.

The method may further comprise determining memory pages modified by the virtual machine at the destination, generating a first partial checkpoint of the modified memory pages without pausing execution of the virtual machine, pausing execution of the virtual machine, generating a second partial checkpoint of an execution state of a CPU of the virtual machine, an input/output state of the virtual machine, and modified memory pages, combining the first and second partial checkpoints to generate the incremental checkpoint with subsequent modified memory pages preempting preceding modified memory pages, and resuming execution of the virtual machine.

The method may further comprise storing the first and second partial checkpoints locally at the destination.

The incremental checkpoint may be stored in a checkpoint store separate from the source.

The source may load a plurality of incremental checkpoints from the destination to build a virtual machine image concurrent with execution of the virtual machine at the destination.

It is also an object to provide a virtual machine, comprising: a communication port configured to receive an initial execution state of the virtual machine and to transmit incremental checkpoints; and an automated processor configured to: execute the virtual machine initiated based on the initial execution state, request memory pages through the communication port in response to page faults during execution of the virtual machine, and transmit incremental checkpoints through the communication port.

The incremental checkpoint may comprise memory pages modified by the virtual machine since a prior incremental checkpoint, a central processing unit state of the virtual machine, and an input/output state of the virtual machine.

The incremental checkpoint may be a consistent checkpoint.

The communicated incremental checkpoint may comprise a virtual CPU state, an input/output state, and a memory state of the virtual machine prior to persistently changing a state outside of the virtual machine since a prior communicated incremental checkpoint.

The system may further comprise a buffer, configured to store requests for persistent change of an external environment, wherein the automated processor is configured to generate the incremental checkpoint and then communicate the buffered requests for persistent change of the external environment reflected in the incremental checkpoint.

The incremental checkpoint may consist essentially of memory pages modified since a prior incremental checkpoint, a CPU state of the virtual machine and an input/output state of the virtual machine.

The automated processor may be configured to communicate the incremental checkpoint is response to uncommitted input/output requests of the virtual machine.

The automated processor may be further configured to communicate acknowledgement of memory page receipt.

The virtual machine may execute under a hypervisor, wherein the incremental checkpoint is generated by the hypervisor.

The virtual machine may execute under a hypervisor, wherein the incremental checkpoint is generated by the hypervisor and wherein a portion of the incremental checkpoint is defined without pausing the virtual machine.

The system may further comprise a hypervisor which executes the virtual machine as a first thread or process, wherein the incremental checkpoint is generated within the hypervisor in a second thread or process distinct from the first thread or process.

The automated processor may be configured to generate the incremental checkpoint in two phases, a first phase comprising determining memory pages modified by the virtual machine during which the virtual machine is operational; and a second phase comprising execution state of a CPU of the virtual machine, an input/output state of the virtual machine, and modified memory pages, during which the virtual machine is paused.

It is another object to provide a system for migration of a virtual machine from a source to a destination, comprising: a memory configured to store an execution state of the virtual machine; a communication port configured to communicate the stored execution state to a destination; an automated processor at the destination configured to: execute the virtual machine at the destination, based on the communicated execution state, request memory pages in response to page faults due to incomplete migration, during execution of the virtual machine, and communicate incremental checkpoints to a checkpoint manager, while the migration of the virtual machine to the destination is in progress; and an automated processor configured to recover the virtual machine in event of failure of migration based on at least a preceding checkpoint communicated from the destination to the checkpoint manager.

It is a still further object to provide a virtual machine system, comprising: a memory configured to store an execution state of the virtual machine; a communication port configured to communicate the stored execution state; and an automated processor configured to: execute the virtual machine, request memory pages in response to page faults due to incomplete migration during execution of the virtual machine, and communicate incremental checkpoints through the communication port.

DETAILED DESCRIPTION OF THE PREFERRED EMBODIMENTS

Figure 1:
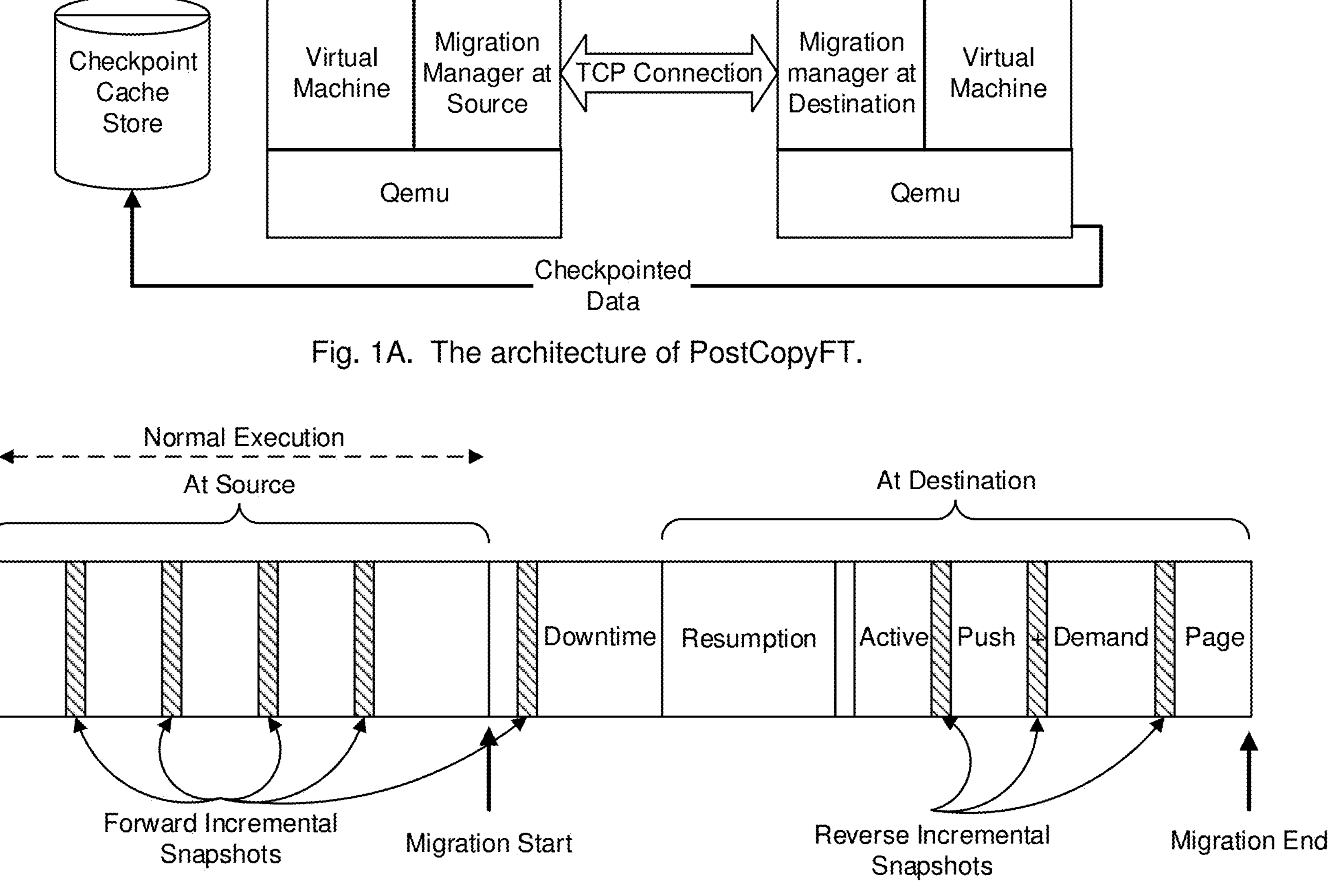
FIG. 1A shows the architecture of PostCopyFT.
FIG. 1B shows a timeline of PostCopyFT Migrations.

PostCopyFT was implemented on the KVM/QEMU {3}, {22} virtualization platform version 2.8.1.1. The guest OS and applications running inside the migrating VM are unmodified. Each VM in KVM/QEMU is associated with a userspace management process, called QEMU, which performs I/O device emulation and various management functions such as VM migration and checkpointing. The userspace QEMU process communicates with a kernel-space hypervisor called KVM, which uses hardware virtualization features to execute the VM in guest mode (or non-root mode).

A. Capturing VM's Memory and Execution State

In parallel to forward post-copy migration, the reverse incremental checkpointing mechanism is implemented as a concurrent QEMU thread to capture consistent incremental checkpoints. To track modified memory pages for successive incremental checkpoints, PostCopyFT performs dirty page tracking on the VM executing at the destination node. The dirty page tracking mechanism represents the VM's memory content as a bitmap, in which each bit specifies whether a page is modified or not. KVM uses this bitmap to identify pages dirtied by the VM at a given instant. When the VM resumes on the destination host during post-copy migration, the reverse checkpointing thread informs KVM to mark all memory pages as read-only using an ioctl call. When the VM attempts to write to any of its resident memory pages, a write fault is triggered, upon which KVM marks the page as read-write and turns on the corresponding bit in the dirty bitmap. Successive writes to the same page do not trigger any bitmap updates until the bitmap is reset for the next checkpointing round. In each checkpointing iteration, the reverse checkpointing thread in QEMU retrieves the current dirty bitmap from KVM to userspace for better manageability. Once QEMU transfers dirty pages to the checkpoint store, the corresponding dirty bits are cleared.

The execution state of a VM consists of the CPU and the I/O device states, which keeps changing during the execution of the VM. PostCopyFT modifies QEMU's default method of capturing the VM's execution state to include the corresponding checkpoint version number (used to uniquely identify a checkpoint cycle) in an in-memory QEMUFile data structure. The QEMUFile structure is then transferred to the checkpoint store.

Between successive checkpointing rounds, a network barrier is inserted to buffer outgoing network packets of the migrating VM. An event-based VM checkpointing algorithm was implemented to reduce the network packet buffering latency. In the event-based approach, VM checkpointing is triggered only when an external event occurs, such as when the VM sends an outgoing network packet. As a result, the event-based approach captures the system state less frequently and hence reduces the migration downtime.

B. Reducing the Migration Downtime

Traversing the bitmap for modified pages and transferring each modified page to the checkpoint store increases the VM migration downtime due to the synchronization overhead of each write request. To address this issue, instead of sending the checkpoint directly to the checkpoint store on the source host, the incremental memory changes are first captured in an in-memory dynamically sized local data structure checkpoint stage. The checkpoint stage is similar to the implementation of Linux Kernel cache-slab {4}, {26}. It consists of a vector of pointers that point to contiguous memory chunks. Each memory chunk contains a series of page data and page keys. Once all chunks are filled, the list is doubled, and new chunks are allocated. Storing memory states locally reduces the VM downtime caused by the synchronous writes and provides the assurance of completeness in checkpoints.

C. Checkpoint Store

Once the VM's memory states are captured in a checkpointing cycle, memory states stored in checkpoint stage are transferred to the checkpoint store at the source node. Several key factors were considered when selecting a checkpoint store. In order to store incremental checkpoints, the checkpoint store should be an in-memory cache that provides duplicate filtering and allows for checkpoint versioning. During a failure situation, the checkpoint store may contain several checkpoints captured in different checkpoint iterations. The checkpoint store needs to maintain each VM checkpoint iteration separately along with a version number that represents the most recently committed checkpoint. That way, there is no ambiguity as to if a checkpoint is complete or not, and incomplete checkpoints discarded if a failure occurs in the middle of a checkpoint. Redis {34}, an in-memory distributed key-value store, was used to implement PostCopyFT's checkpoint store. The Redis client resides on the destination host while the Redis server resides on the source or the staging node. The checkpointed memory state is stored in a map data structure in Redis. Each memory page is stored as a key-value pair using function HMSET, where the key is a unique page address consisting of page block ID and page offset, and the value is the page content. Once the checkpoint is transferred to the checkpoint store, the checkpoint is marked as complete.

D. Detection of Destination/Network Failure

PostCopyFT uses the heartbeat mechanism as a simple detector to detect the destination/network failure. The heartbeat module was implemented as a separate thread on the source host that continuously monitors the availability of the destination node by periodically sending ping requests to the destination. If the heartbeat module cannot reach the destination host for a time interval, then the destination node is considered be in a failure state and the source host immediately triggers a failover.

E. VM Recovery after Failure

After detecting the migration failure, the restoration process on the source machine tries to restore the VM from the checkpoints previously received from the destination. Restoration was implemented as a non-live process. To build up the entire memory state, the restoration process loads the memory pages for each checkpoint version up to the latest committed complete checkpoint version number at once into a hashtable using the HGETALL function provided in Redis. The hashtable provides the capability to update memory pages with the most recently modified pages and merge duplicate pages. The restoration thread then places the page content on the allocated and mapped host memory address space using mmap( ). Next, the restoration process loads the most recent execution state of the VM using the GET function and loads the execution state into a in-memory QEMUFile structure. This file is then passed to the modified qemu loadvm section start full( ) function, which proceeds to unpack and load the execution state. Finally, the VM is resumed.

Evaluation

The performance results of PostCopyFT are evaluated using the following metrics:

Total migration time: Time taken to transfer a VM's state entirely from the source to the destination host.

Downtime: Duration that a VM is suspended during the migration.

Replication time: Time taken to transfer the checkpoint to the checkpoint cache store.

Application performance degradation: The performance impact on applications running inside the VM during migration and checkpointing.

Network Bandwidth degradation: Reduction in network bandwidth during migration and checkpointing.

Failover time: Time taken to restore the VM from the last committed checkpointing during a failure situation.

The test environment consists of dual six-core 2.1 GHz Intel Xeon machines with 128 GB memory connected through a Gigabit Ethernet switch with 1 Gbps full-duplex ports.

To avoid network interference and contention between the migration traffic and the application-specific traffic, separate NIC interfaces are used for the migration and the application traffic. VMs in each experiment are configured with 1 vCPU and 8 GB of memory with 4 KB page size unless specified otherwise. Virtual disks are accessed over the network from an NFS server, which enables each VM to access its storage from both the source and the destination machines over local area network.

B. Baseline Comparison of PostCopyFT and Post-Copy

To measure the total migration time and the downtime of PostCopyFT, the checkpointing thread ran continuously on the destination host without triggering a failure in the migration in order to evaluate the overhead of VM checkpointing.

Figure 2:
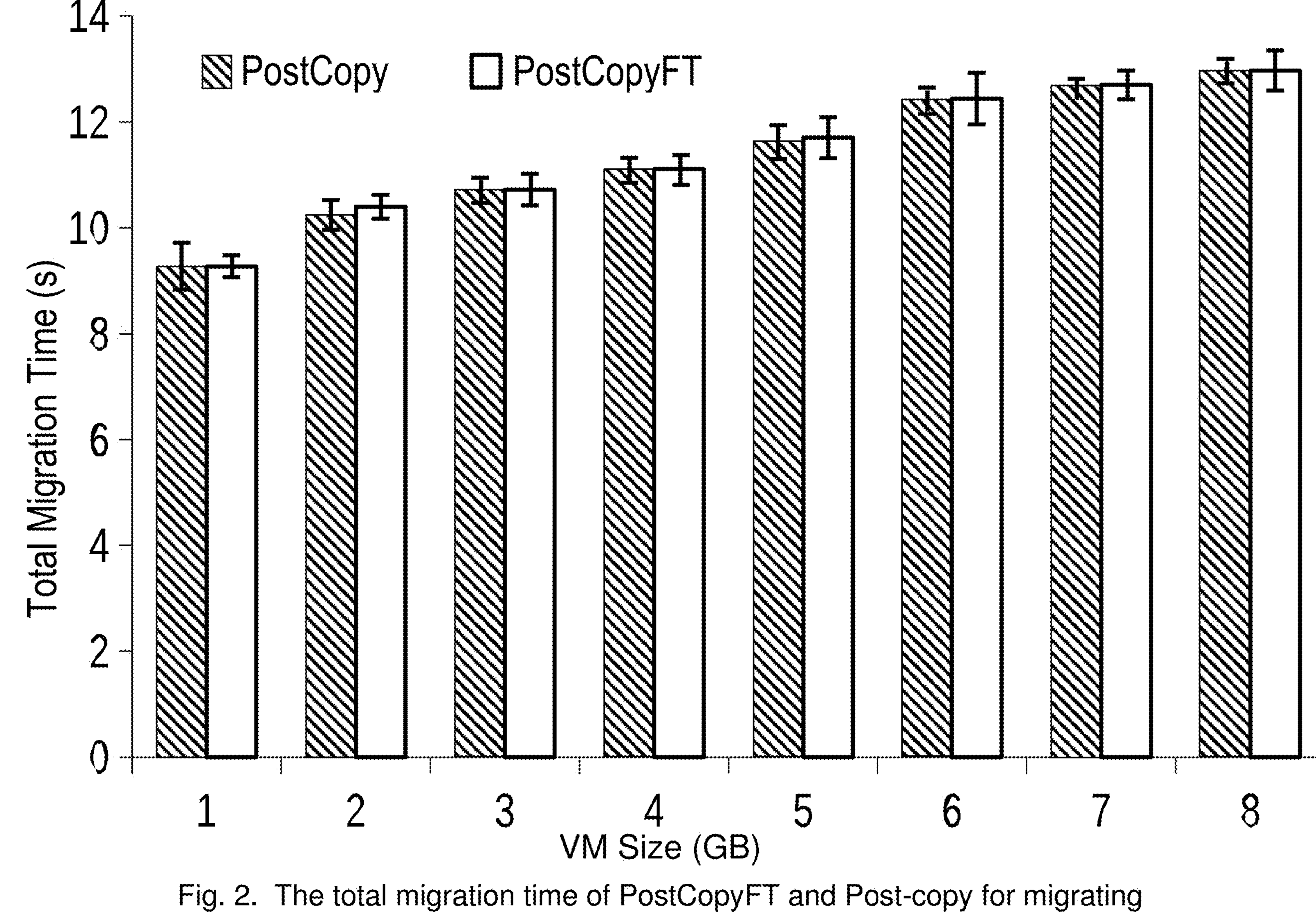
FIG. 2 shows the total migration time of PostCopyFT and Post-copy for migrating 1 GB-8 GB idle VMs.

FIG. 2 compares the time taken to migrate an idle VM using PostCopyFT and the KVM/QEMU vanilla post-copy implementation {16}, {17}. The size of the VM ranges from 1 GB to 8 GB. As shown in FIG. 2, the total migration time of PostCopyFT and post-copy is almost the same for idle VMs with different sizes.

Figure 3:
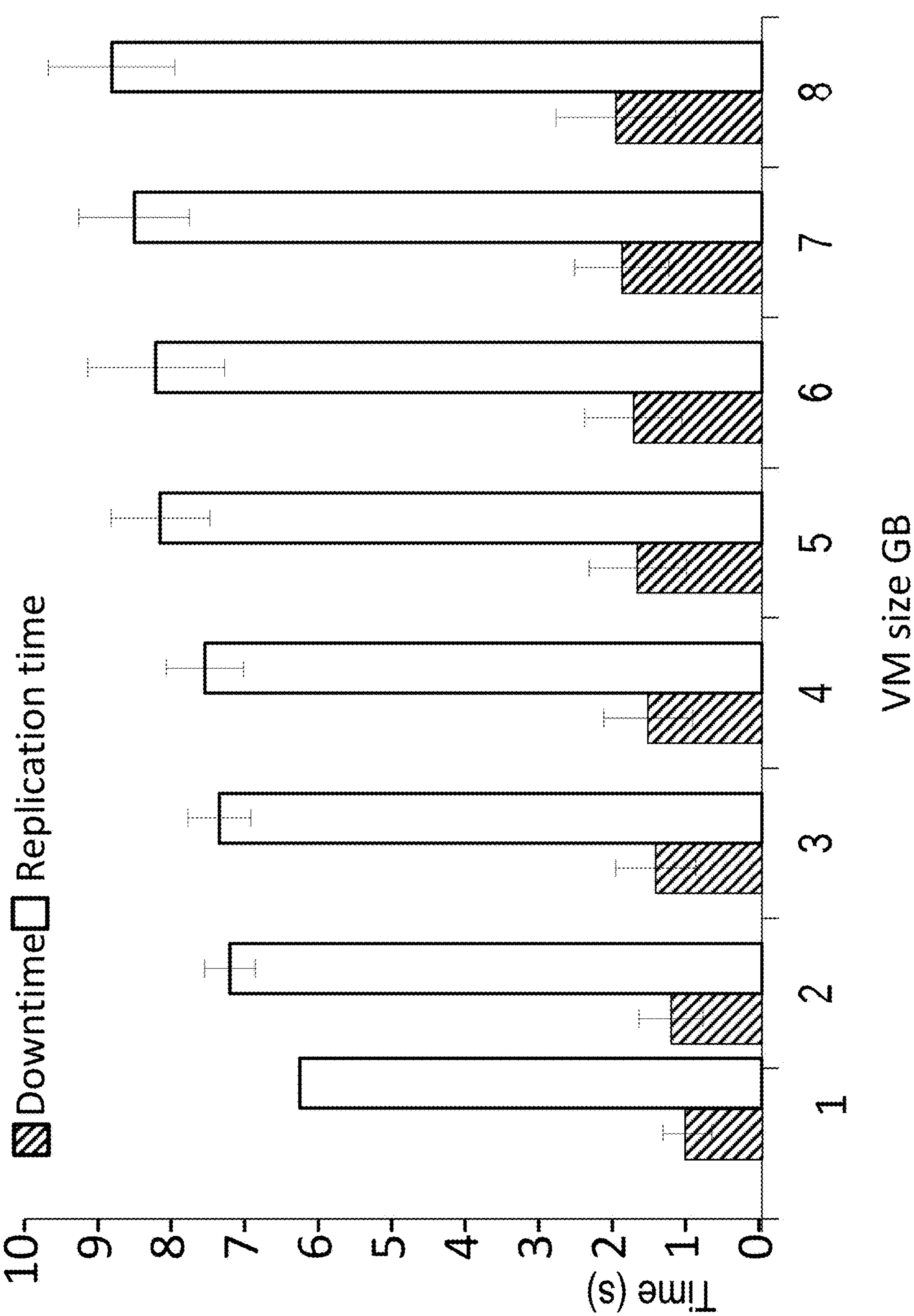
FIG. 3 shows the downtime and replication time for migrating idle VMs with different sizes.

FIG. 3 shows the downtime and the replication time of migrating an idle VM using PostCopyFT. The downtime of PostCopyFT for migrating an idle VM ranges between 1.1 seconds and 1.9 seconds, which is higher than that of post-copy (9 ms-11.6 ms). This is because the VM pauses continuously for every checkpointing interval (100 μs) to checkpoint memory states. The figure also shows that the replication time is much higher than the downtime. This is because VM checkpointing is performed in two stages and only stage II pauses the VM.

Figure 4:
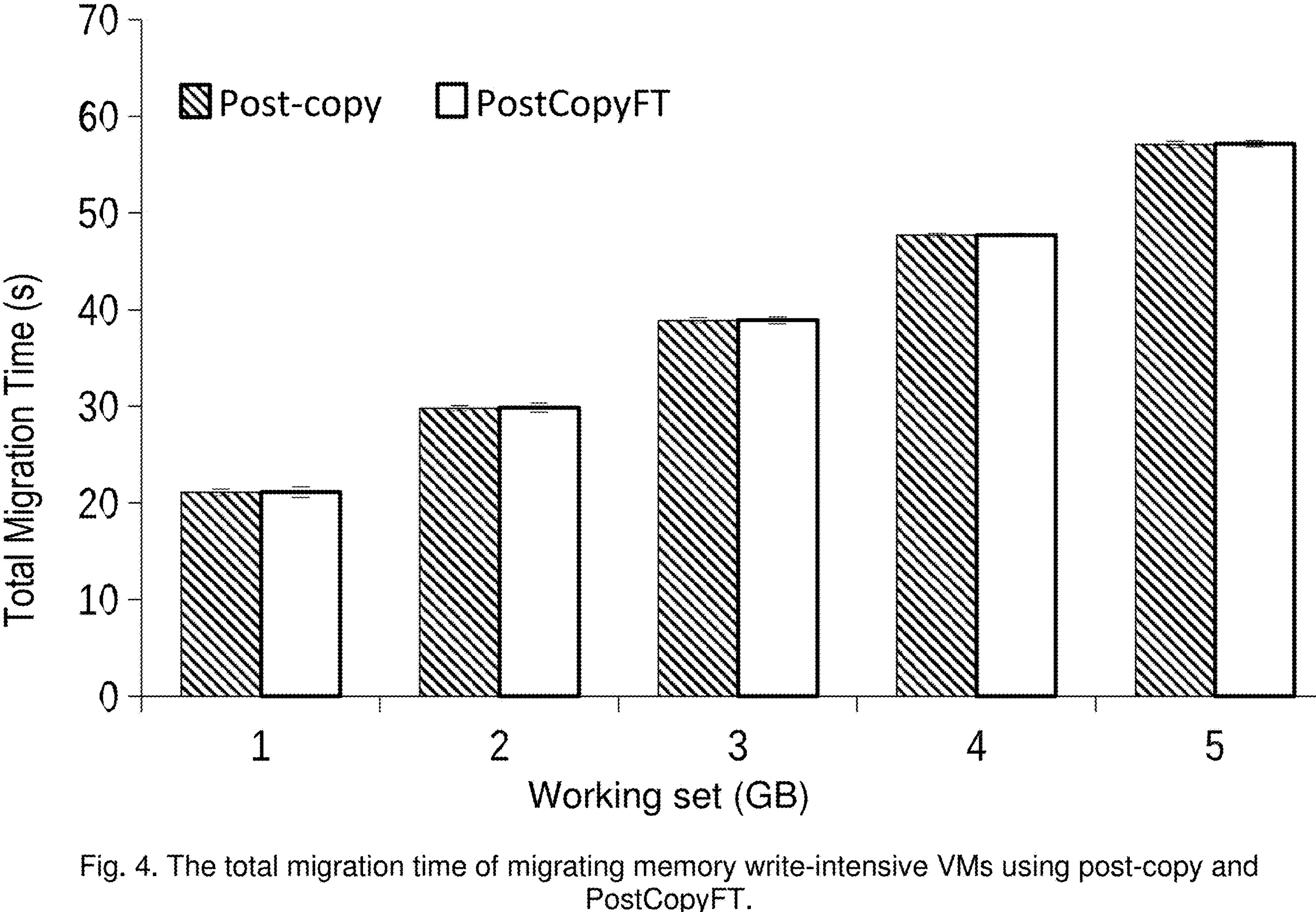
FIG. 4 shows the total migration time of migrating memory write-intensive VMs using post-copy and PostCopyFT.

FIG. 4 shows the total migration time for migrating a memory-write intensive VM using PostCopyFT and post-copy. The memory-write intensive application running inside the VM is a C program that continuously writes random numbers to a large region of main memory. The size of the working set (i.e., the size of the memory written) ranges from 1 GB to 5 GB. FIG. 4 shows that the total migration time of PostCopyFT is almost the same as post-copy. This is because, even when the VM is paused for checkpointing, the destination is actively gathering pages from the source host.

Figure 5:
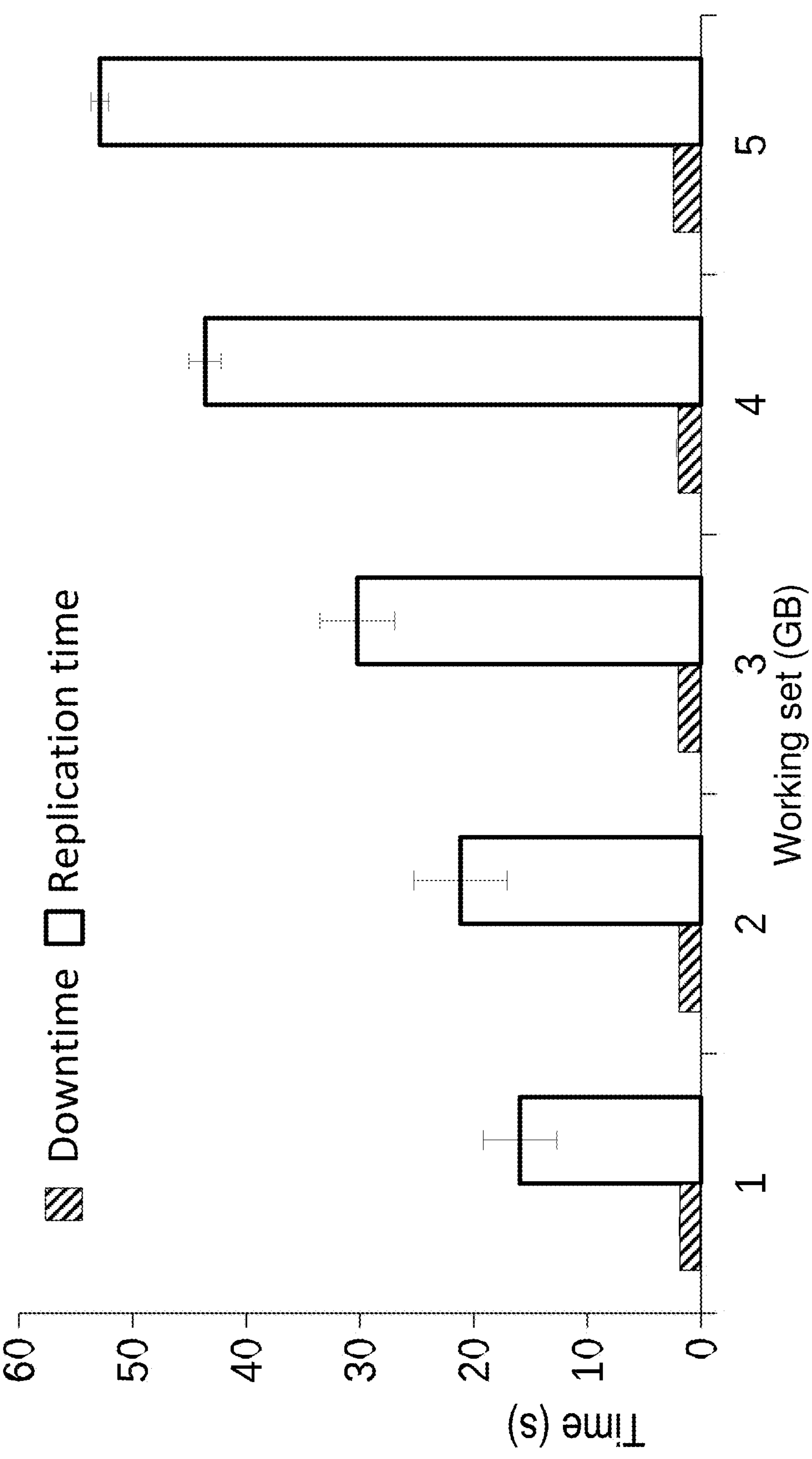
FIG. 5 shows the downtime and replication time for migrating memory-write intensive VMs using PostCopyFT.

FIG. 5 shows the downtime and the replication time of PostCopyFT for migrating a memory-write intensive VM. The downtime of PostCopyFT ranges between 1.8 s and 2.2 s, which is higher than that of post-copy (7 ms-9 ms). The downtime respect to migration thread is almost constant for PostCopyFT and post-copy as the migration process is not interrupted by PostCopyFT during its checkpointing phase. But with the added overhead due to frequent checkpointing, the migration downtime of PostCopyFT increases. FIG. 5 also shows that the replication time increases when the size of the working set increases. This is because when the size of the working set increases, the number of dirty pages also increases.

B. Impact of Checkpointing Interval

The impact of the checkpointing interval on VM migration and the overhead incurred due to checkpointing is evaluated.

Figure 6:
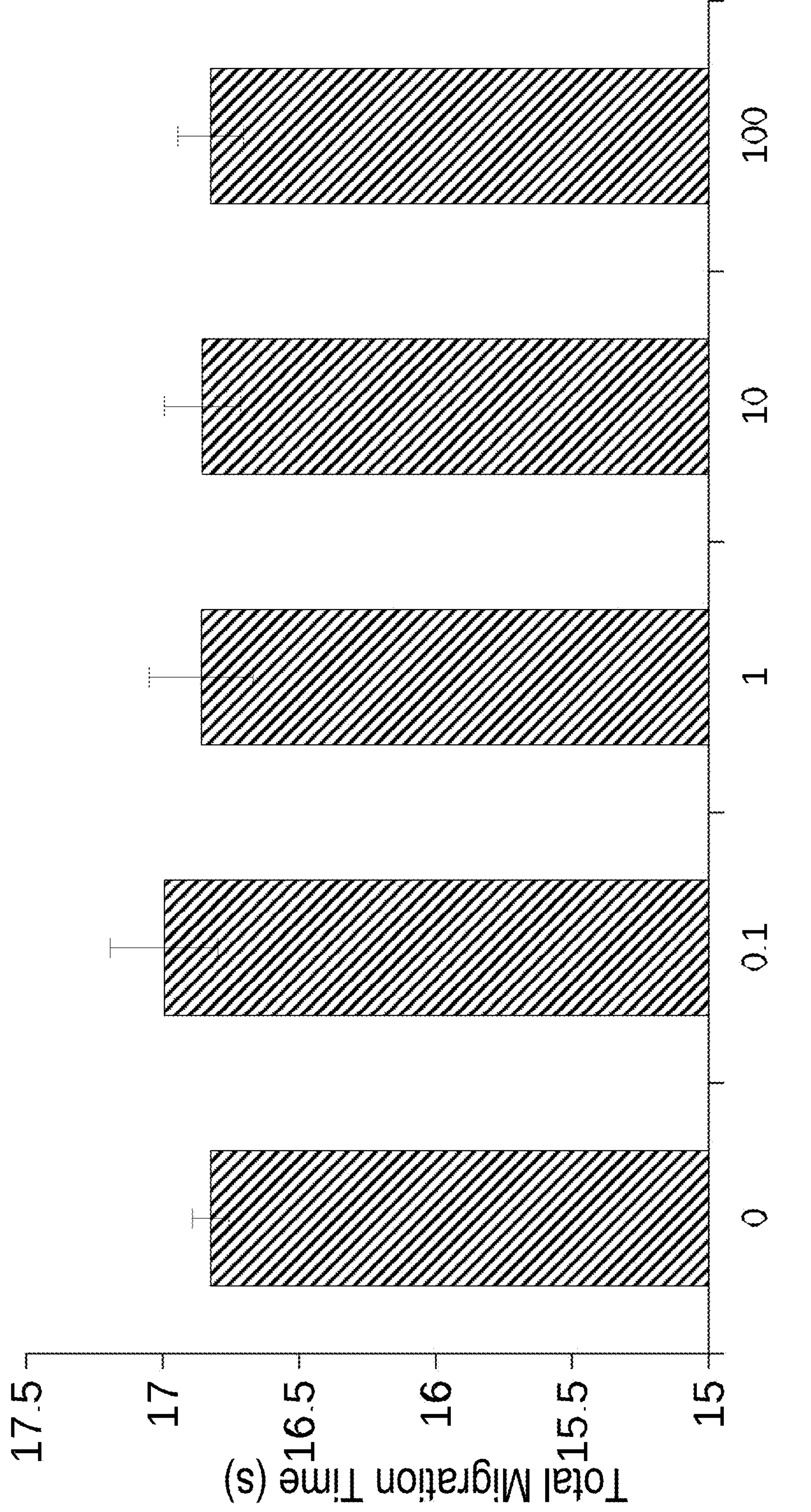
FIG. 6 shows the impact of checkpointing interval on the total migration time (idle VM).

FIG. 6 shows the total migration time of migrating an idle VM when the checkpointing interval varies between 0.1 ms and 100 ms. Checkpointing interval 0 refers to the vanilla post-copy migration. PostCopyFT imposes 0.2%-0.9% overhead compared to the post-copy migration and the overhead decreases linearly when the checkpointing interval increases.

Figure 7:
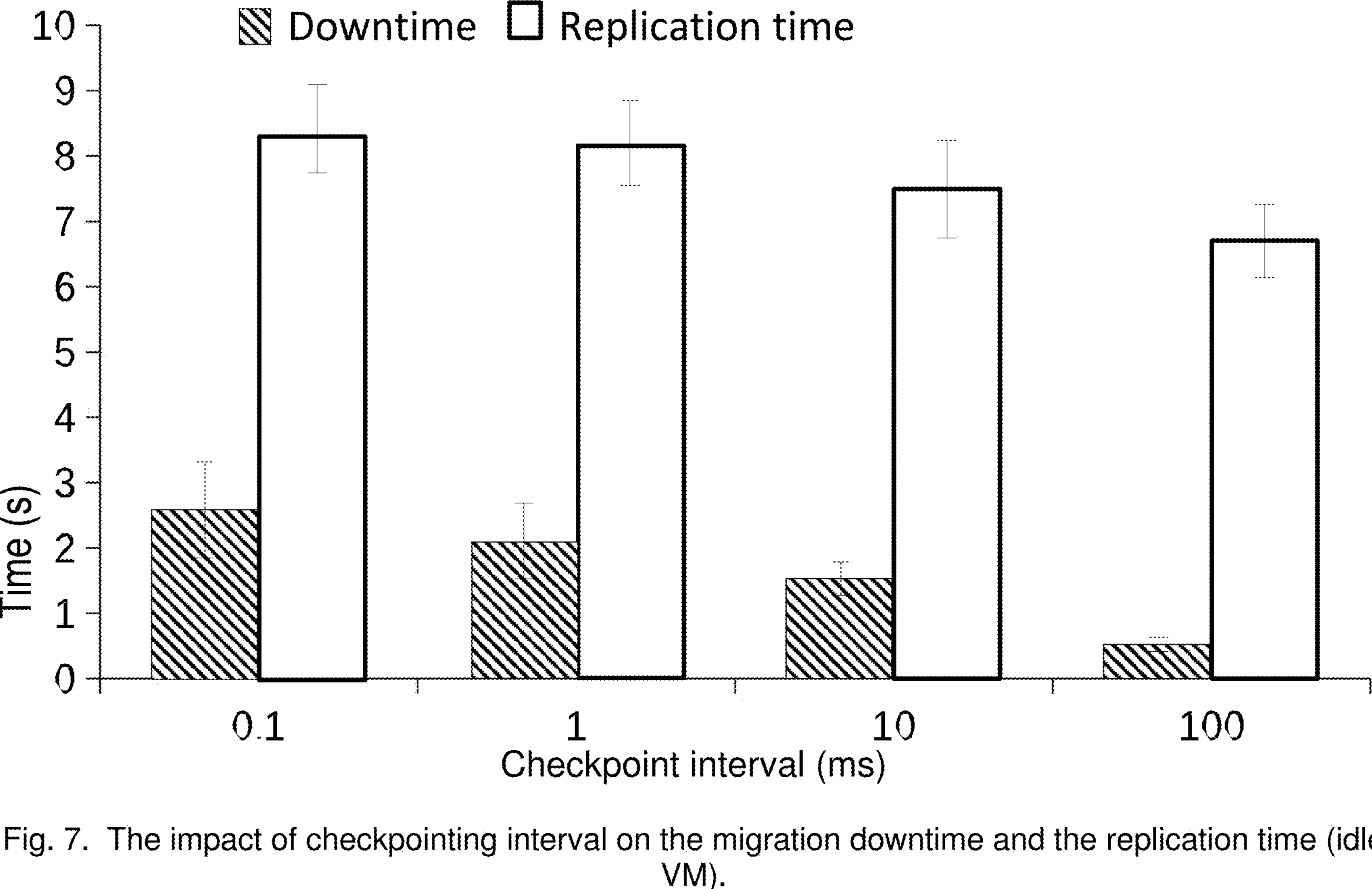
FIG. 7 shows the impact of checkpointing interval on the migration downtime and the replication time (idle VM).

FIG. 7 shows the downtime and the replication time of PostCopyFT by varying the checkpointing interval for idle VMs. FIG. 7 shows that when the checkpointing interval decreases, the downtime increases. This is because, when the checkpointing interval is low, the checkpointing is performed frequently with the overhead of bitmap synchronization, state transfer, network buffering, and the pause of the VM.

Figure 8:
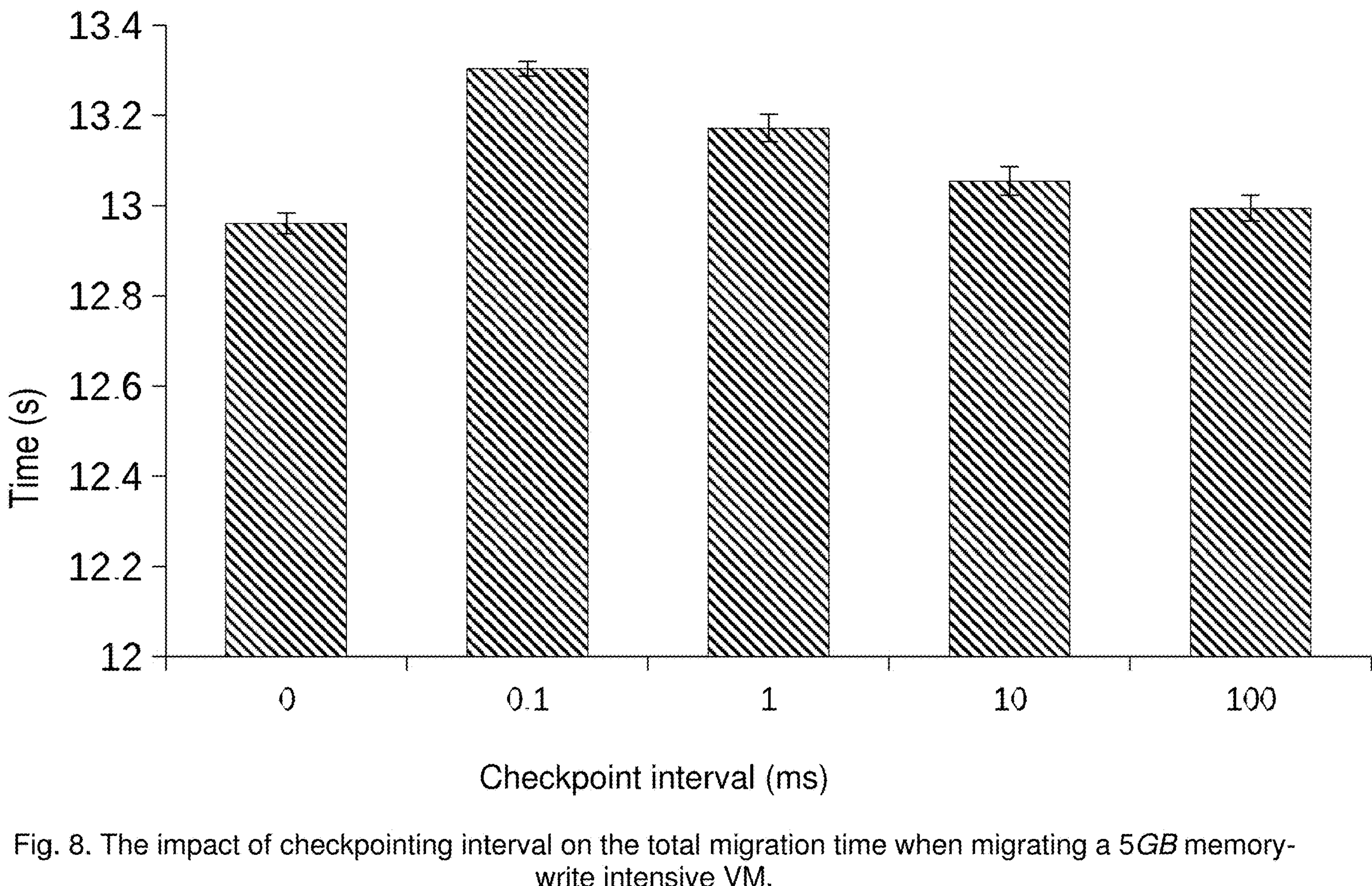
FIG. 8 shows the impact of checkpointing interval on the total migration time when migrating a 5 GB memory-write intensive VM.

FIG. 8 shows the total migration time of migrating a 5 GB memory-write intensive VM when the checkpointing interval varies between 0.1 ms and 100 ms. Checkpointing interval 0 refers to the post-copy migration. PostCopyFT imposes 0.1%-0.7% overhead compared to the post-copy migration and the overhead decreases linearly when the checkpointing interval increases.

Figure 9:
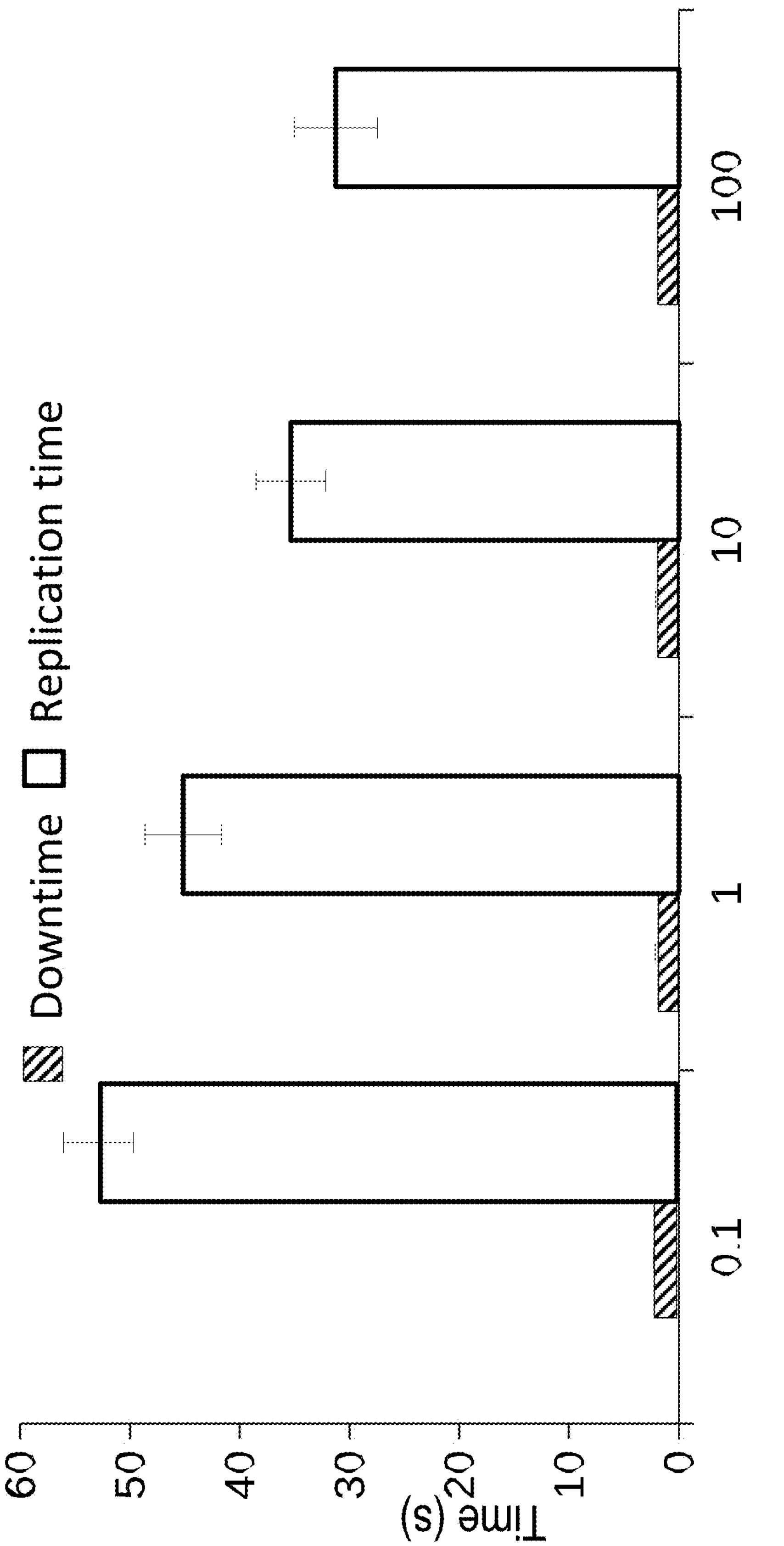
FIG. 9 shows the impact of checkpointing interval on downtime and replication time when migrating a 5 GB memory-write intensive VM.

FIG. 9 shows the downtime and the replication time of migrating the 5 GB memory-write intensive VM. The figure shows that the downtime and the replication time decrease when the checkpointing interval increases. This is because, when the checkpointing interval decreases, more memory pages get dirty, which results in higher bitmap synchronizations and larger checkpoint state.

C. Performance Impact on CPU-Intensive Workload

PostCopyFT and post-copy affect the performance of CPU-intensive workloads were measured using the QuickSort benchmark, which repeatedly allocated 400 Bytes of memory, wrote random integers to the allocated memory segment, and sorted the integers using the QuickSort algorithm. The number of sorts performed (i.e., the number of times the random integers are written to memory and are sorted) per second during the migration was measured.

Figure 10:
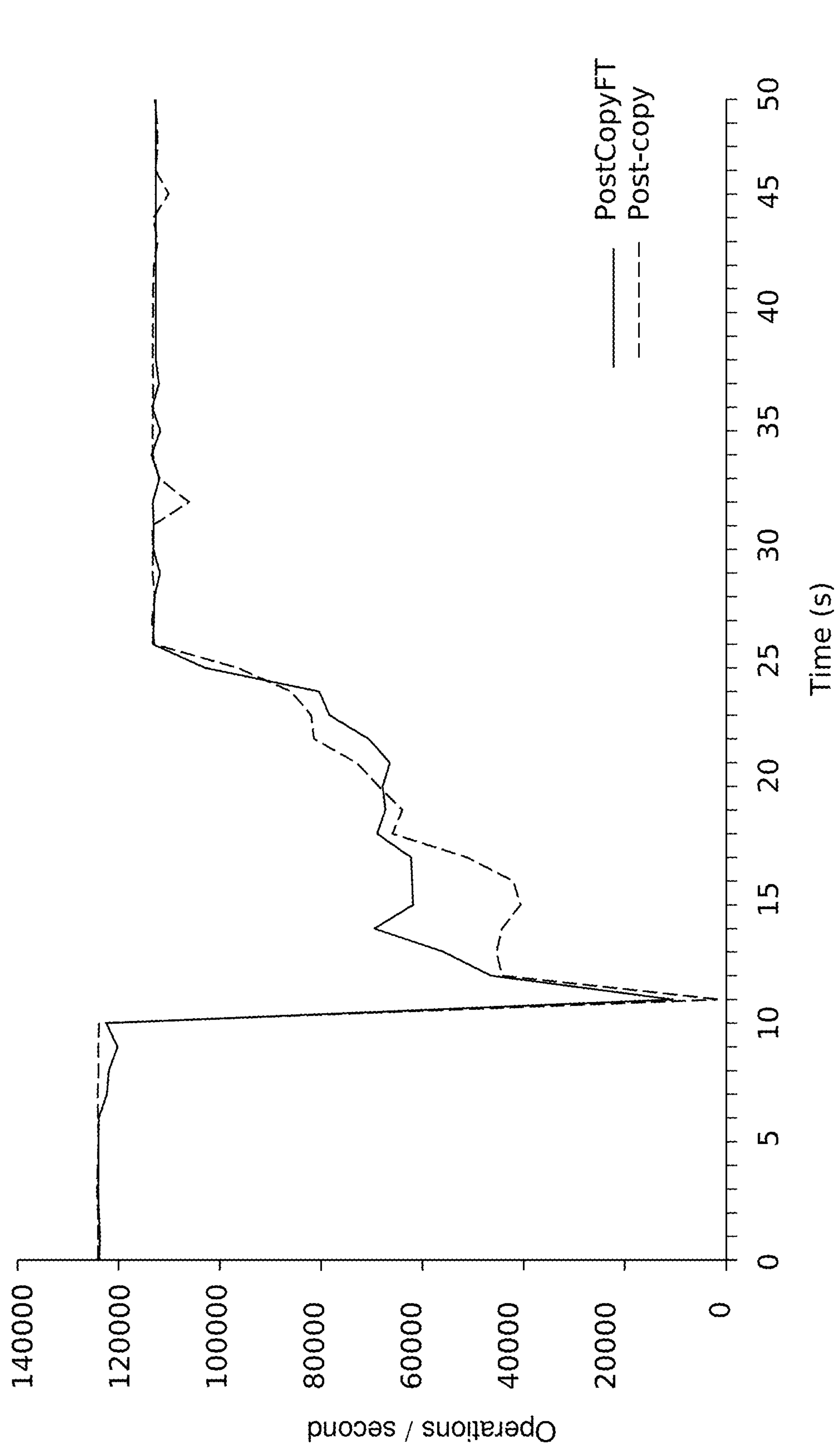
FIG. 10 shows the performance impact of post-copy and PostCopyFT on a CPU-intensive QuickSort benchmark.

FIG. 10 shows that PostCopyFT has similar performance as post-copy and there is no observable adverse impact of the reverse incremental checkpointing mechanism during migration.

D. Network Buffering Overhead

Figure 11:
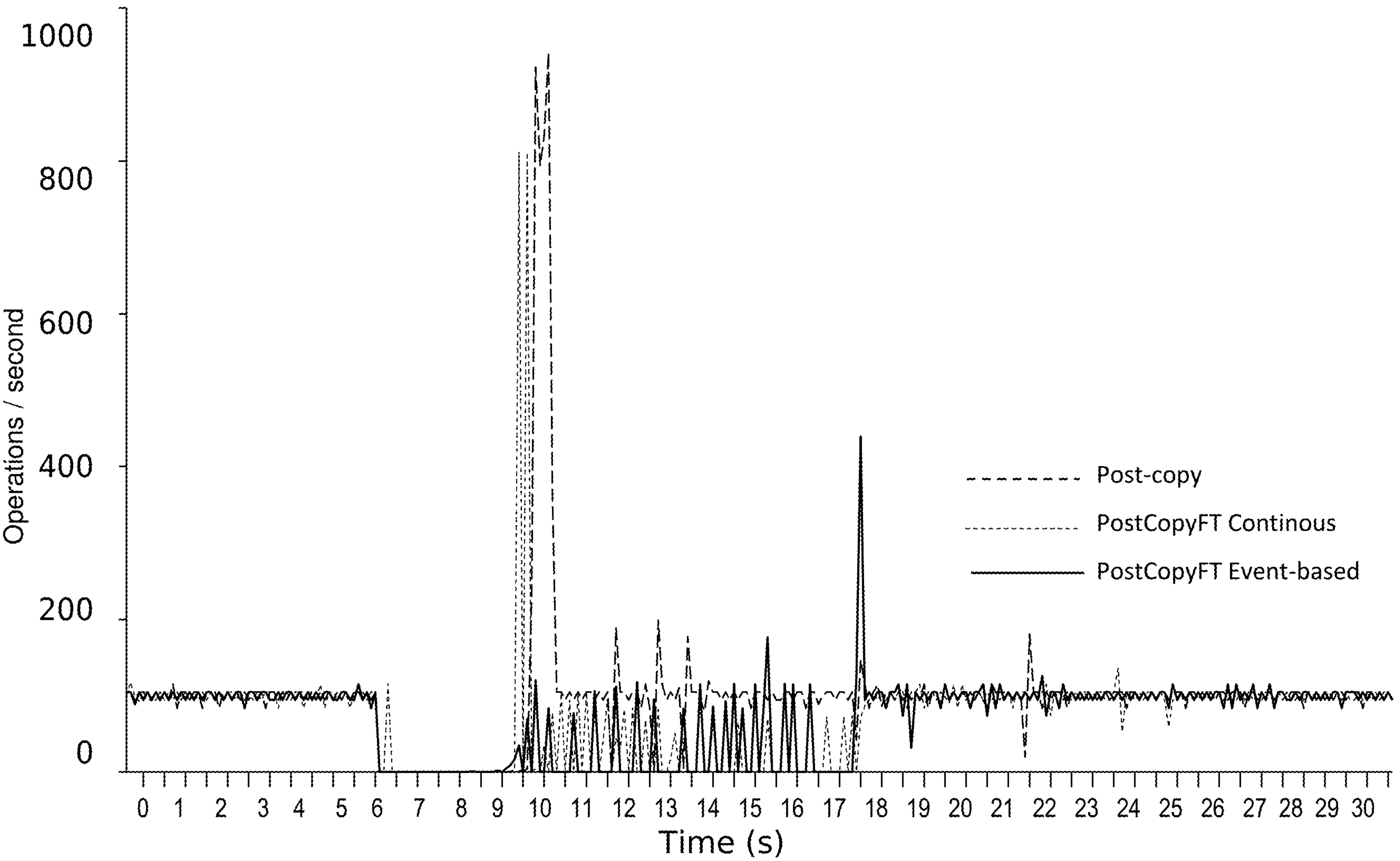
FIG. 11 shows outgoing network bandwidth of post-copy, PostCopyFT with periodic checkpointing, and PostCopyFT with event-based checkpointing, when the migrating VM generates outgoing TCP traffic.
Figure 12:
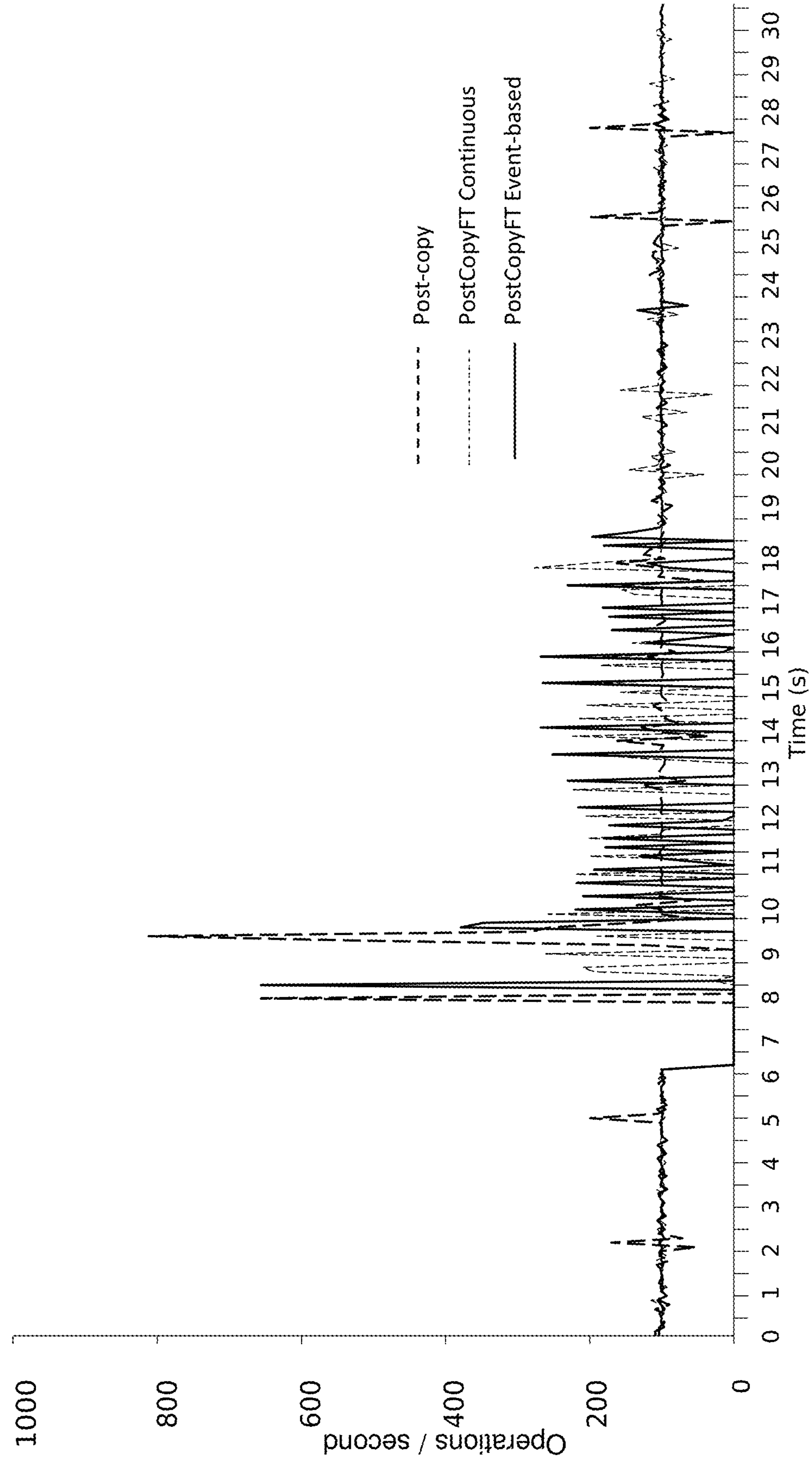
FIG. 12 shows outgoing network bandwidth of post-copy, PostCopyFT with periodic checkpointing, and PostCopyFT with event-based checkpointing, when the migrating VM generates outgoing UDP traffic.

VM migration itself is a network intensive process. To mitigate the contention of network resources between the migration process and the applications running inside the VM, PostCopyFT uses separate NIC interfaces for the migration traffic and the application traffic. The impact of PostCopyFT's periodic and event-based checkpointing mechanisms on network-intensive VMs is considered. As the event-based checkpointing mechanism captures the VM's memory states only when the VM transmits an outgoing network packet, compared to the periodic checkpointing, the event-based checkpointing reduces the network latency and the time taken to pause/restart the VM and synchronize the dirty page bitmap. The event based checkpointing mechanism shows 2-3 times lower downtime than the periodic checkpointing mechanism.

iPerf {18}, a network intensive application to measure the outgoing and incoming network bandwidth of PostCopyFT, was used, where the maximum network bandwidth is set to 100 Mbit/s. The iPerf server runs on an external machine (i.e., neither source nor destination host) in the same cluster and the iPerf client runs inside the migrating VM. During the migration, the client continuously sends data to the server through a TCP and UDP connection as shown in FIGS. 11 and 12. The network bandwidth is captured using iPerf every 0.1 second. Bandwidth fluctuations are seen for both TCP based and UDP based outgoing network traffic due to the impact of network buffering and releasing. Compared to the periodic checkpointing mechanism, the event-based checkpointing mechanism shows more frequent buffer releases and hence has higher bandwidth. Low bandwidth throughput is shown in the TCP based outgoing traffic due to TCP acknowledgments and timeouts.

Figure 13:
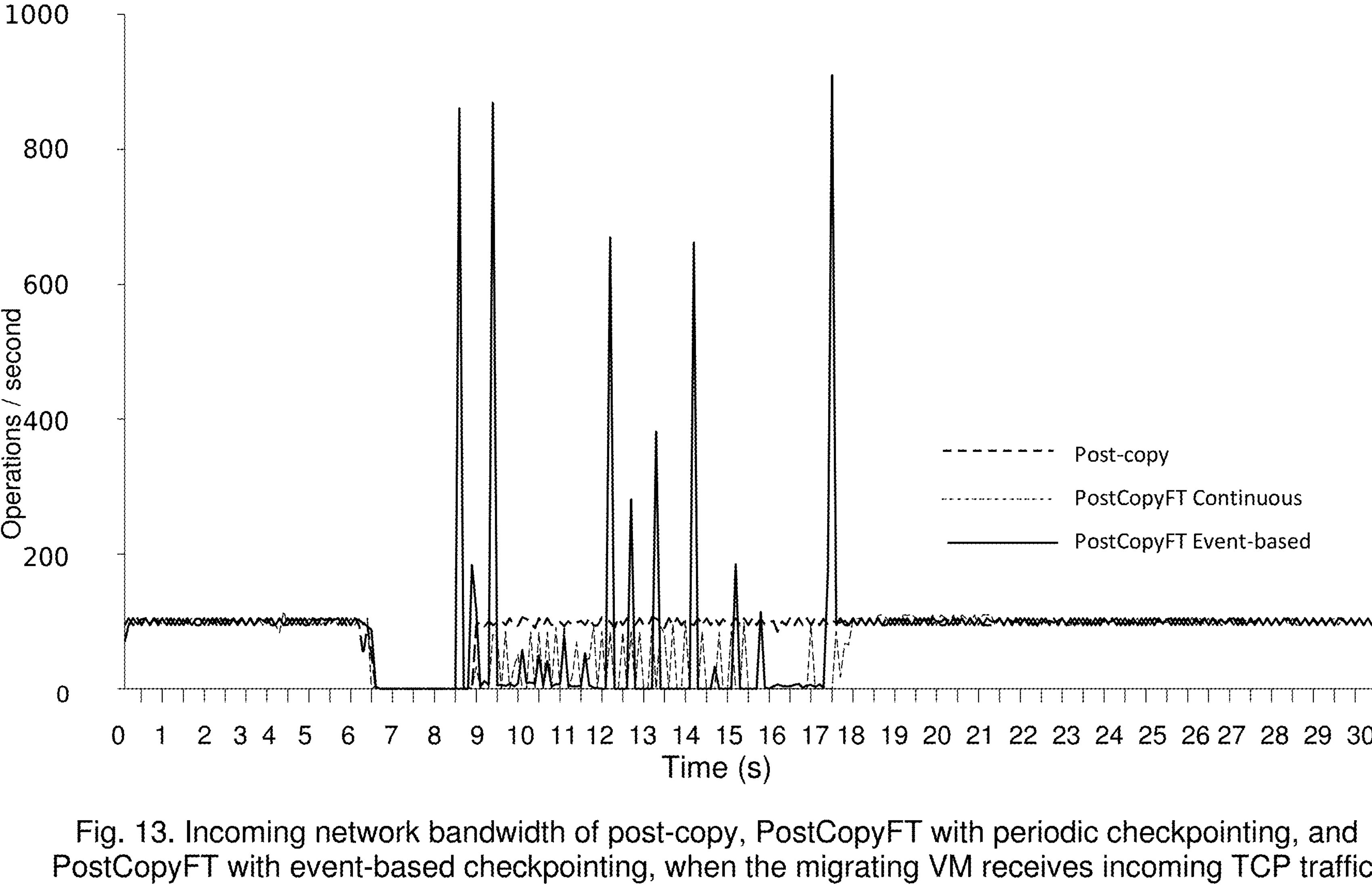
FIG. 13 shows incoming network bandwidth of post-copy, PostCopyFT with periodic checkpointing, and PostCopyFT with event-based checkpointing, when the migrating VM receives incoming TCP traffic.
Figure 14:
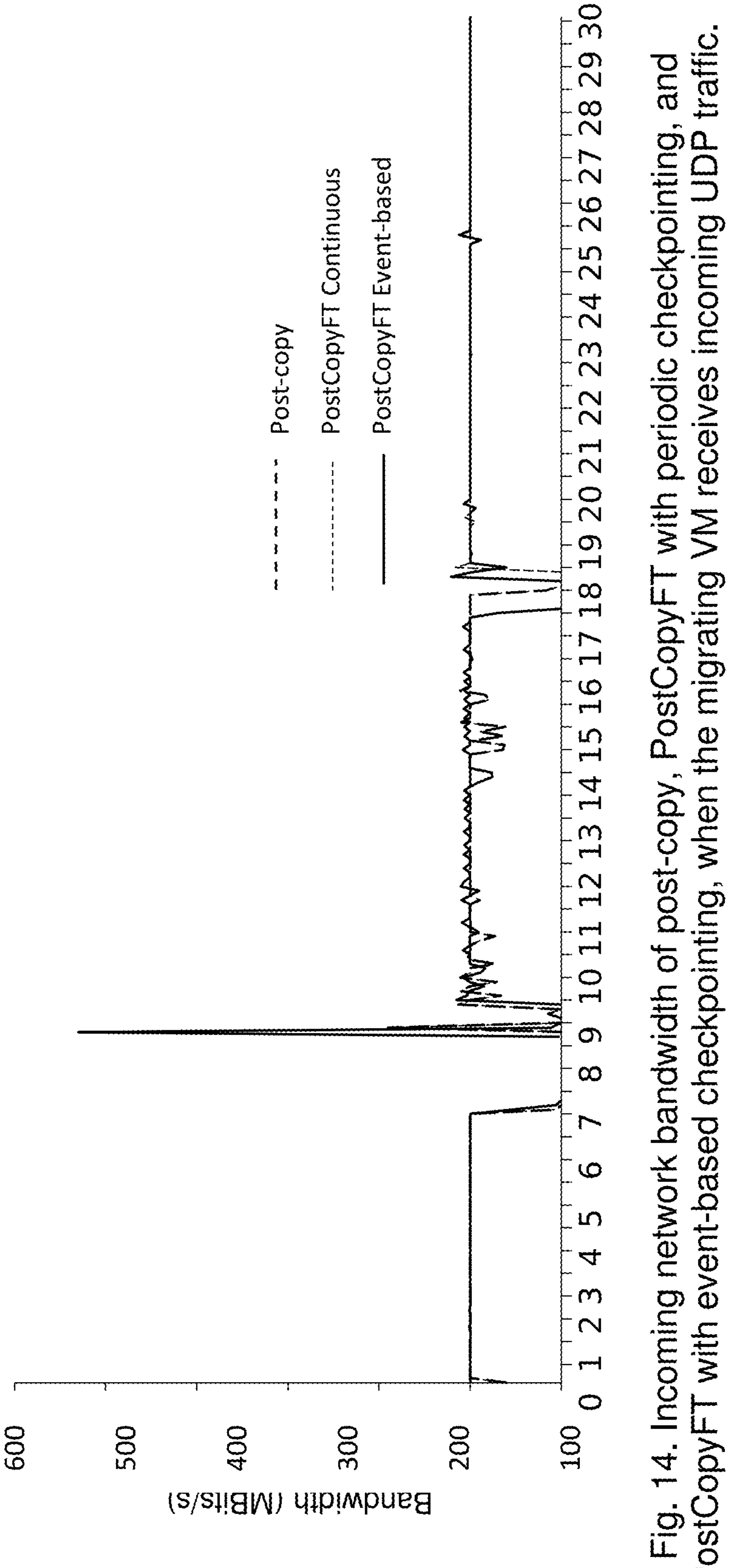
FIG. 14 shows incoming network bandwidth of post-copy, PostCopyFT with periodic checkpointing, and PostCopyFT with event-based checkpointing, when the migrating VM receives incoming UDP traffic.

When migrating an incoming network-intensive VM, the iPerf server runs inside the migrating VM and the iPerf client runs on an external machine in the same cluster. FIGS. 13 and 14 give the network bandwidth of incoming network intensive applications for TCP and UDP connections, respectively. For the TCP protocol, although PostCopyFT serves incoming network packets, the acknowledgment packets are being buffered as they are considered as outgoing network packet. Thus, bandwidth fluctuations are seen in the incoming TCP network traffic workloads due to the acknowledgment packets. Compared to the periodic checkpointing mechanism, the event-base checkpointing mechanism shows much higher bandwidth.

E. Failover Time

Figure 15:
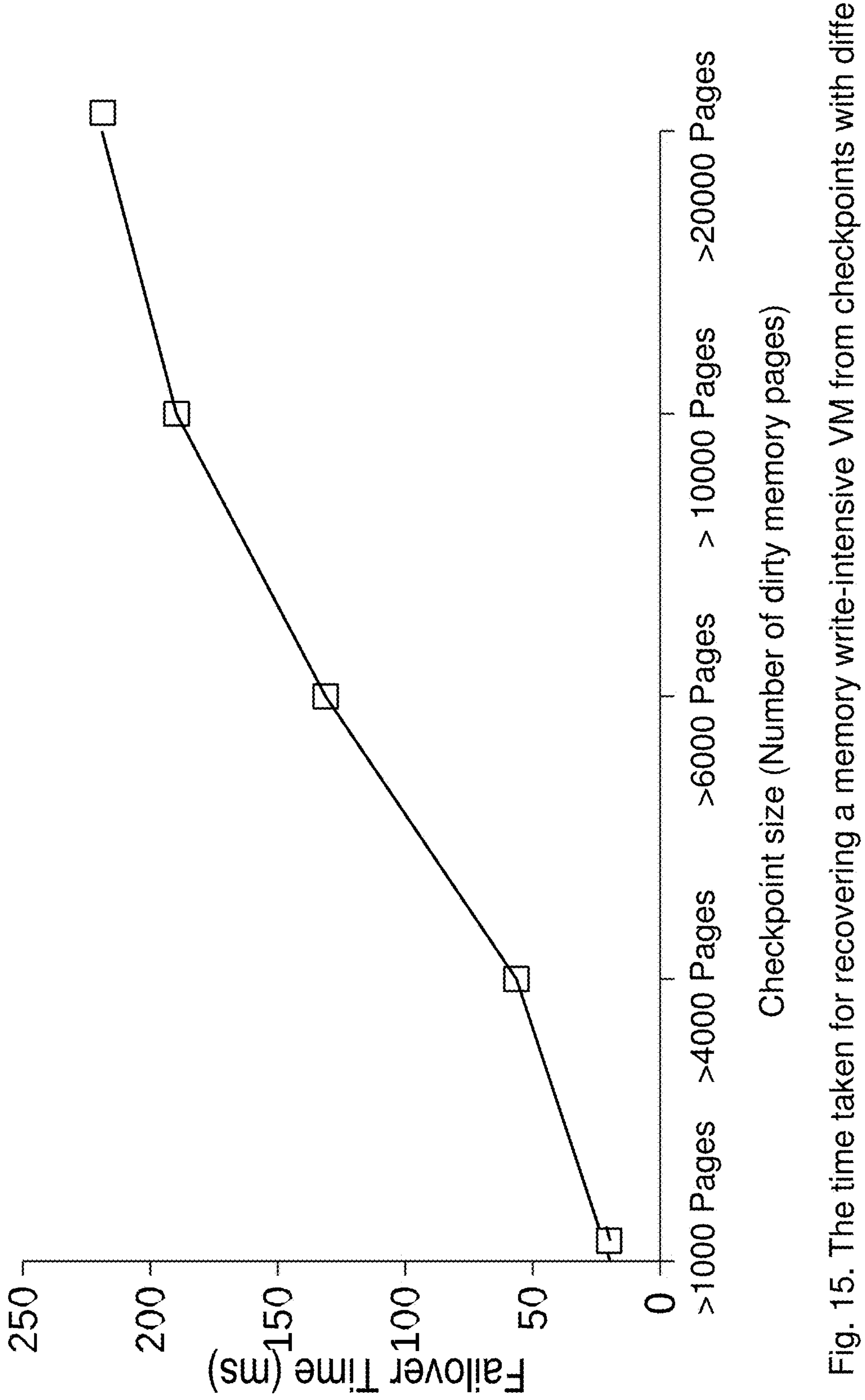
FIG. 15 shows the time taken for recovering a memory write-intensive VM from checkpoints with different sizes.

Upon detecting a failure during the migration of a VM, the time taken to recover the VM from the latest available committed state is called the failover time. FIG. 15 shows the failover time when migrating a 5 GB memory-write intensive VM using PostCopyFT. The number of checkpointed pages and captured the time taken to restore the VM on the source host was measured. FIG. 15 shows that, the failover time increases linearly when the size of the checkpoint increases.

F. System and Method Description

Figure 16:
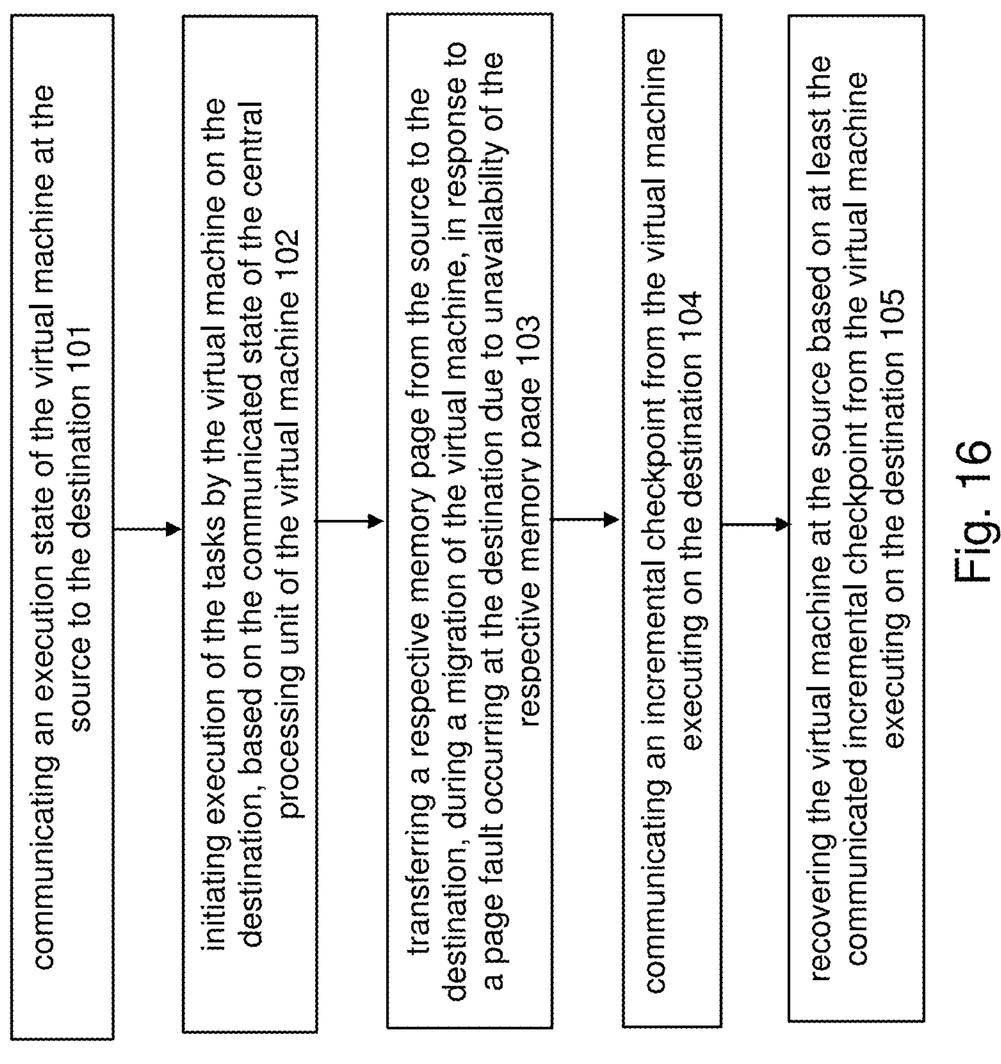
FIG. 16 shows a flowchart according to the present invention.

FIG. 16 shows a method for migration of a virtual machine from a source to a destination, comprising: communicating an execution state of the virtual machine at the source to the destination 101; initiating execution of the tasks by the virtual machine on the destination, based on the communicated state of the central processing unit of the virtual machine 102; transferring a respective memory page from the source to the destination in response to a page fault occurring at the destination due to unavailability of the respective memory page 103; communicating an incremental checkpoint from the virtual machine executing on the destination 104; and recovering the virtual machine at the source based on at least the communicated incremental checkpoint from the virtual machine executing on the destination 105.

Figure 17:
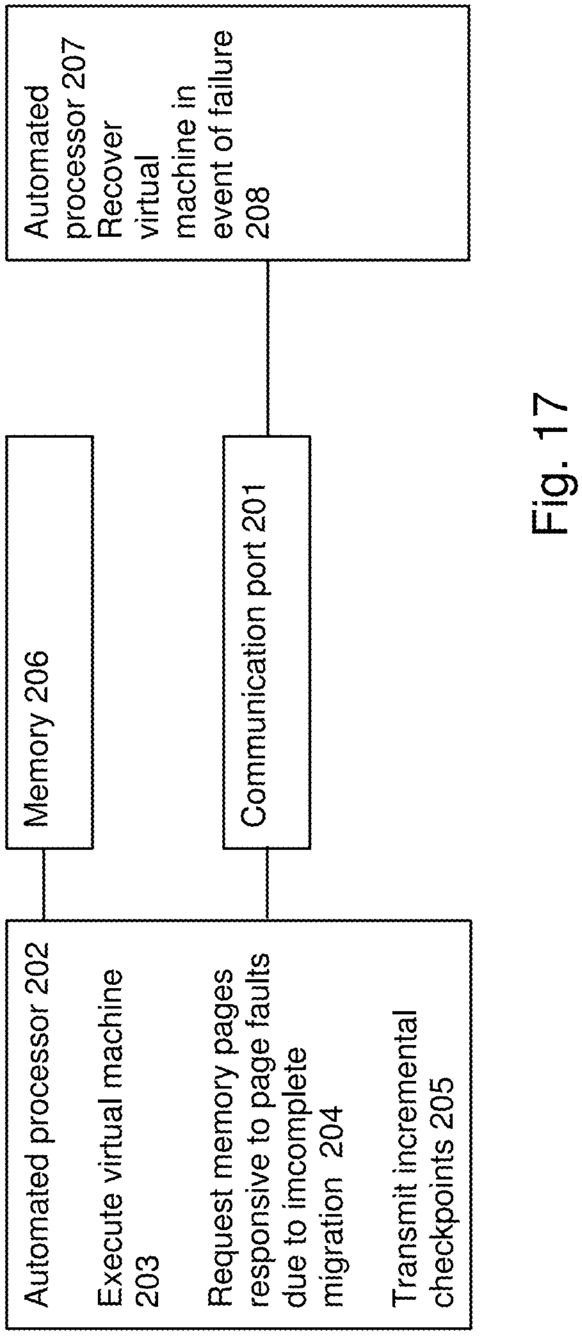
FIG. 17 shows a schematic drawing according to the present invention.

FIG. 17 shows a schematic drawing of a system according to the present invention. A communication port 201 and memory 206 are provided. An automated processor 202, which may be an AMD x64 architecture, Intel x32 architecture, ARM Cortex architecture, etc., is provided to execute virtual machine 203, request memory pages responsive to page faults 204, and transmit incremental checkpoints 205. Another automated processor 207 is provided, communicating with the automated processor 202 through the communication port 201, capable of recovering the virtual machine in event of failure 208.

With reference to the computer-readable media, including both memory device and secondary computer-readable medium, a computer-readable media and the processor are structurally and functionally interrelated with one another. The computer-readable media may be implemented using a hard disk drive (rotating magnetic media), a memory device, flash memory, solid state storage, random access memory, and/or a variety of other computer-readable media known in the art, and when including functional descriptive material, data structures are created that define structural and functional interrelationships between such data structures and the computer-readable media. Such interrelationships permit the data structures' functionality to be realized. For example, in one embodiment the processor reads (e.g., accesses or copies) such functional descriptive material from the network interface, the computer-readable media, and the information processing system (more particularly, at least one processor) performs its operations, as described elsewhere herein, in response to such material stored in the memory device of the information processing system. In addition to reading such functional descriptive material from the computer-readable medium, the processor is capable of reading such functional descriptive material from (or through) the network. The information processing system may include at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system, without limiting them to a specific location or implementation.

VII. CONCLUSION

A solution is presented for recovering a virtual machine when post-copy live migration fails due to destination or network failure. Reverse incremental checkpointing is provided, called PostCopyFT, which proceeds concurrently with traditional post-copy migration and transfers incremental changes to a VM's memory and execution state from the destination back to the source, either periodically or upon external I/O events. Upon network or destination failure, PostCopyFT recovers the VM on the source node from the latest consistent checkpoint. The presented implementation of PostCopyFT in the KVM/QEMU platform yields similar total migration time compared to the traditional post-copy live migration with low impact on application performance.

Although the invention(s) have been described with reference to specific embodiments, it will be understood by those skilled in the art that various changes may be made, and equivalents may be substituted, for elements thereof without departing from the true spirit and scope of the invention. In addition, modifications may be made without departing from the essential teachings of the invention. The invention is described by way of various embodiments and features. This disclosure is intended to encompass all consistent combinations, subcombinations, and permutations of the different options and features, as if expressly set forth herein individually.

Each reference cited herein is expressly incorporated herein in its entirety. Such references provide examples representing aspects of the invention, uses of the invention, disclosure of the context of the invention and its use and application. The various aspects disclosed herein, including subject matter incorporated herein by reference, may be employed, in combination or subcombination and in various permutations, consistent with the claims.

The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes that fall within the meaning and range of equivalency of the claims are to be embraced within their scope.

REFERENCES

Each reference cited herein is expressly incorporated by reference in its entirety.

{1} A. Barak and R. Wheeler. Mosix: An integrated multiprocessor UNIX. In Mobility, pages 41-53. ACM Press/Addison-Wesley Publishing Co., New York, NY, USA, 1999.

{2}P. Barham, B. Dragovic, K. Fraser, S. Hand, T. Harris, A. Ho, R. Neugebauer, I. Pratt, and A. Warfield. Xen and the art of virtualization. SIGOPS Oper. Syst. Rev., 37(5):164-177, October 2003.

{3}F. Bellard. Qemu, a fast and portable dynamic translator. In Proc. of USENIX Annual Technical Conference, April 2005.

{4}J. Bonwick and J. Adams. Magazines and vmem: Extending the slab allocator to many cpus and arbitrary resources. In USENIX Annual Technical Conference, pages 15-33, 2001.

{5}T. C. Bressoud and F. B. Schneider. Hypervisor-based fault tolerance. In Proceedings of the Fifteenth ACM Symposium on Operating Systems Principles, SOSP '95, pages 1-11, New York, NY, USA, 1995. ACM.

{6}C. Clark, K. Fraser, S. Hand, J. Hansen, E. Jul, C. Limpach, I. Pratt, and A. Warfield. Live Migration of Virtual Machines. In USENIX Symposium on Networked Systems Design and Implementation (NSDI), pages 273-286, 2005.

{7}B. Cully, G. Lefebvre, D. Meyer, M. Feeley, N. Hutchinson, and A. Warfield. Remus: High availability via asynchronous virtual machine replication. In USENIX Symposium on Networked Systems Design and Implementation (NSDI), pages 161-174, 2008.

{8}U. Deshpande, D. Chan, S. Chan, K. Gopalan, and N. Bila. Scattergather live migration of virtual machines. IEEE Transactions on Cloud Computing, PP(99):1-1, 2015.

{9}U. Deshpande, Y. You, D. Chan, N. Bila, and K. Gopalan. Fast server deprovisioning through scatter-gather live migration of virtual machines. In 2014 IEEE 7th International Conference on Cloud Computing, pages 376-383, June 2014.

{10} Y. Dong, W. Ye, Y. Jiang, I. Pratt, S. Ma, J. Li, and H. Guan. Colo: Coarse-grained lock-stepping virtual machines for non-stop service. In the 4th Annual Symposium on Cloud Computing, pages 1-16, 2013.

{11}G. W. Dunlap, S. T. King, S. Cinar, M. A. Basrai, and P. M. Chen. Revirt: Enabling intrusion analysis through virtual-machine logging and replay. SIGOPS Oper. Syst. Rev., 36:211-224, December 2002.

{12} G. W. Dunlap, III. Execution Replay for Intrusion Analysis. PhD thesis, Ann Arbor, MI, USA, 2006.

{13} C. Engelmann, G. R. Vallee, T. Naughton, and S. L. Scott. Proactive fault tolerance using preemptive migration. In 17th Euromicro International Conference on Parallel, Distributed and Network-based Processing, pages 252-257, 2009.

{14} D. Fernando, Hardik Bagdi, Yaohui Hu, Ping Yang, Kartik Gopalan, Charles Kamhoua, and Kevin Kwiat. "Quick eviction of virtual machines through proactive live snapshots." In 2016 IEEE/ACM 9th International Conference on Utility and Cloud Computing (UCC), pp. 99-107. IEEE, 2016.

{15} D. Fernando, H. Bagdi, Y. Hu, P. Yang, K. Gopalan, C. Kamhoua, and K. Kwiat. Quick eviction of virtual machines through proactive snapshots. In 2016 IEEE International Conference on Cluster Computing (CLUSTER), pages 156-157, September 2016.

{16} M. Hines, U. Deshpande, and K. Gopalan. Post-copy live migration of virtual machines. In ACM SIGOPS Operating Systems Review, 43, no. 3: 14-26 Jul. 2009.

{17} M. R. Hines and Kartik Gopalan. "Post-copy based live virtual machine migration using adaptive pre-paging and dynamic self-ballooning." In Proceedings of the 2009 ACM SIGPLAN/SIGOPS international conference on Virtual execution environments (VEE), pp. 51-60. 2009.

{18} Iperf. The TCP/UDP Bandwidth Measurement Tool, dast.nlanr.net/Projects/Iperf/.

{19} R. Jhawar, V. Piuri, and M. Santambrogio. Fault tolerance management in cloud computing: A system-level perspective. IEEE Systems Journal, 7(2):288-297, June 2013.

{20}A. Kangarlou, P. Eugster, and D. Xu. Vnsnap: Taking snapshots of virtual networked infrastructures in the cloud. IEEE Transactions on Services Computing, 5(4): 484-496, 2012.

{21}S. T. King, G. W. Dunlap, and P. M. Chen. Debugging operating systems with time-traveling virtual machines. In Annual Conference on USENIX Annual Technical Conference, pages 1-1, 2005.

{22}A. Kivity, Y. Kamay, D. Laor, U. Lublin, and A. Liguori. Kvm: The linux virtual machine monitor. In Proc. of Linux Symposium, June 2007.
{23}Y. Kwon, M. Balazinska, and A. Greenberg. Fault-tolerant stream processing using a distributed, replicated file system. Proc. VLDB Endow., 1(1), August 2008.
{24}M. Lu and T. c. Chiueh. Fast memory state synchronization for virtualization-based fault tolerance. In 2009 IEEE/IFIP International Conference on Dependable Systems Networks, 2009.
{25}D. Marques, G. Bronevetsky, R. Fernandes, K. Pingali, and P. Stodghil. Optimizing checkpoint sizes in the c3 system. In the 19th IEEE International Parallel and Distributed Processing Symposium, 2005.
{26}R. McDougall and J. Maura. Solaris internals. In Rachael Borden, 2001.
{27} Micro Checkpointing. wiki.qemu.org/features/micro-checkpointing.
{28} S. J. Mullender, G. van Rossum, A. S. Tananbaum, R. van Renesse, and H. van Staveren. Amoeba: a distributed operating system for the 1990s. Computer, 23(5):44-53, May 1990.
{29}A. B. Nagarajan, F. Mueller, C. Engelmann, and S. L. Scott. Proactive fault tolerance for hpc with xen virtualization. In the 21st Annual International Conference on Supercomputing, pages 23-32, 2007.
{30}M. Nelson, B. H. Lim, and G. Hutchins. Fast transparent migration for virtual machines. In Proc. of USENIX Annual Technical Conference, April 2005.
{31}J. K. Ousterhout, A. R. Cherenson, F. Douglis, M. N. Nelson, and B. B. Welch. The sprite network operating system. Computer, 21(2):23-36, February 1988.
{32}E. Park, B. Egger, and J. Lee. Fast and space-efficient virtual machine checkpointing. In the 7th ACM SIGPLAN/SIGOPS International Conference on Virtual Execution Environments, pages 75-86, 2011.
{33} R. F. Rashid and G. G. Robertson. Accent: A communication oriented network operating system kernel. In the Eighth ACM Symposium on Operating Systems Principles, pages 64-75, 1981.
{34} Redis. In-memory data structure store, redis.io/.
{35} A. Ruprecht, D. Jones, D. Shiraev, G. Harmon, M. Spivak, M. Krebs, M. Baker-Harvey, and T. Sanderson. Vm live migration at scale. In the 14th ACM SIGPLAN/SIGOPS International Conference on Virtual Execution Environments, pages 45-56.
{36} Y. Tamura, K. Sato, S. Kihara, and S. Moriai. Kemari: Virtual machine synchronization for fault tolerance using domt," ntt cyber space labs. Technical report, Proc. USENIX Annual Technical Conference, 2008.
{37} VMWare Inc. VMWare IncArchitecture of VMware ESXi, www.vmware.com/files/pdf/esxiarchitecture.pdf.
{38} VMWare Inc. VMWare vMotion www.vmware.com/pdf/vmotion datasheet.pdf.
{39} VMWare Inc. VMWare vSphere 6 Fault Tolerance www.vmware.com/files/pdf/techpaper/vmware-vsphere6-ft-arch-perf.pdf.
{40} C. Wang, X. Chen, Z. Wang, Y. Zhu, and H. Cui. A fast, general storage replication protocol for active-active virtual machine fault tolerance. In 2017 IEEE 23rd International Conference on Parallel and Distributed Systems (ICPADS), pages 151-160, December 2017.
{41} C. Wang, F. Mueller, C. Engelmann, and S. L. Scott. Proactive process-level live migration in hpc environments. In International Conference for High Performance Computing, Networking, Storage and Analysis, 2008.
{42} Min Xu, Rastislav Bodik, and Mark D. Hill. A, "flight data recorder" for enabling full-system multiprocessor deterministic replay. In the 30th International Symposium on Computer Architecture, pages 122-135, 2003.
{43} Abe, Yoshihisa, Roxana Geambasu, Kaustubh Joshi, and Mahadev Satyanarayanan. "Urgent virtual machine eviction with enlightened post-copy." ACM SIGPLAN Notices 51, no. 7 (2016): 51-64.
{44} Asai, Hirochika. "P2V Migration with Post-Copy Hot Cloning for Service Downtime Reduction." In 2013 International Conference on Cloud and Green Computing, pp. 1-8. IEEE, 2013.
{45} Ben-Yehuda, Muli, Rom Frieman, Abel Gordon, Benoit Hudzia, and Maor Vanmak. "Resilient post-copy live migration using eviction to shared storage in a global memory architecture." U.S. patent application Ser. No. 14/588,424, filed Apr. 7, 2016.
{46} Chen, Xiao, Jian-Hui Jiang, and Qu Jiang. "A Method of Self-Adaptive Pre-Copy Container Checkpoint." In 2015 IEEE 21st Pacific Rim International Symposium on Dependable Computing (PRDC), pp. 290-300. IEEE, 2015.
{47} Chou, Chih, Yuan Chen, Dejan Milojicic, Narasimha Reddy, and Paul Gratz. "Optimizing Post-Copy Live Migration with System-Level Checkpoint Using Fabric-Attached Memory." In 2019 IEEE/ACM Workshop on Memory Centric High Performance Computing (MCHPC), pp. 16-24. IEEE, 2019.
{48} Dadrwal, Ashu, Suryaprakash Nehra, Ali Ahmad Khan, and Mohit Dua. "Checkpoint Based Live Migration of Virtual Machine." In 2018 International Conference on Communication and Signal Processing (ICCSP), pp. 1083-1086. IEEE, 2018.
{49} Deshpande, Umesh, Danny Chan, Steven Chan, Kartik Gopalan, and Nilton Bila. "Scatter-gather live migration of virtual machines." IEEE Transactions on Cloud Computing 6, no. 1 (2015): 196-208.
{50} Dhuria, Ritika, and Kiranbir Kaur. "A Hybrid Approach For Reducing Downtime, Migration Time And Energy Consumption of Live VM Migration." International Journal of Advanced Research in Computer Science 8, no. 8 (2017).
{51} Fernando, Dinuni, Jonathan Terner, Kartik Gopalan, and Ping Yang. "Live Migration Ate My VM: Recovering a Virtual Machine after Failure of Post-Copy Live Migration." In IEEE INFOCOM 2019-IEEE Conference on Computer Communications, pp. 343-351. IEEE, 2019.
{52} Gad, Ramy, Simon Pickartz, Tim SUB, Lars Nagel, Stefan Lankes, Antonello Monti, and André Brinkmann. "Zeroing memory deallocator to reduce checkpoint sizes in virtualized HPC environments." The Journal of Supercomputing 74, no. 11 (2018): 6236-6257.
{53} Gao, Xing, Jidong Xiao, Haining Wang, and Angelos Stavrou. "Understanding the Security Implication of Aborting Live Migration." IEEE Transactions on Cloud Computing (2020).
{54} Hines, Michael R., G. Kartik, and D. Umesh. "Post-Copy Live Migration Of VM." In Proc. of ACM International Conference on Virtual Execution Environments. 2009.
{55} Hirofuchi, Takahiro, Hidemoto Nakada, Satoshi Itoh, and Satoshi Sekiguchi. "Reactive consolidation of virtual machines enabled by postcopy live migration." In Proceedings of the 5th international workshop on Virtualization technologies in distributed computing, pp. 11-18. 2011.

{56} Hirofuchi, Takahiro, Hidemoto Nakada, Satoshi Itoh, and Satoshi Sekiguchi. "Making vm consolidation more energy-efficient by postcopy live migration." In Cloud Computing 2011, The Second International Conference on Cloud Computing, GRIDs, and Virtualization, pp. 195-204. 2011.
{57} Hirofuchi, Takahiro, Hidemoto Nakada, Satoshi Itoh, and Satoshi Sekiguchi. "Reactive cloud: Consolidating virtual machines with postcopy live migration." Information and Media Technologies 7, no. 2 (2012): 614-626.
{58} Hirofuchi, Takahiro, Hidemoto Nakada, Satoshi Itoh, and Satoshi Sekiguchi. "Reactive cloud: Consolidating virtual machines with postcopy live migration." Information and Media Technologies 7, no. 2 (2012): 614-626.
{59} Hirofuchi, Takahiro, Isaku Yamahata, and Satoshi Itoh. "Postcopy live migration with guest-cooperative page faults." IEICE TRANSACTIONS on Information and Systems 98, no. 12 (2015): 2159-2167.
{60} Hursey, Joshua. "A Transparent Process Migration Framework for Open MPI." (2012).
{61} Lu, Peng, Antonio Barbalace, and Binoy Ravindran. "HSG-LM: hybrid-copy speculative guest OS live migration without hypervisor." In Proceedings of the 6th International Systems and Storage Conference, pp. 1-11. 2013.
{62} Mabe, Dusty. "The State of Virtual Machine Checkpointing, Live Migration and Replication." (2013)
{63} Mosko, Marc. "Process Migration over CCNx." arXiv preprint arXiv:1707.04835 (2017).
{64} Olivier, Pierre, A K M Fazla Mehrab, Stefan Lankes, Mohamed Lamine Karaoui, Robert Lyerly, and Binoy Ravindran. "HEXO: Offloading HPC Compute-Intensive Workloads on Low-Cost, Low-Power Embedded Systems." In Proceedings of the 28th International Symposium on High-Performance Parallel and Distributed Computing, pp. 85-96. 2019.
{65} Rapoport, Mike, and Joel Nider. "User space memory management for post-copy migration." In Proceedings of the 10th ACM International Systems and Storage Conference, pp. 1-1. 2017.
{66} Rathi, Rakesh. "VM Migration Techniques in Cloud: A Review." International Journal of Computer Applications 975: 8887. 2019.
{67} Sahni, Shashank, and Vasudeva Varma. "A hybrid approach to live migration of virtual machines." In 2012 IEEE International Conference on Cloud Computing in Emerging Markets (CCEM), pp. 1-5. IEEE, 2012.
{68} Shah, Syed Asif Raza, Amol Hindurao Jaikar, and Seo-Young Noh. "A performance analysis of precopy, postcopy and hybrid live VM migration algorithms in scientific cloud computing environment." In 2015 International Conference on High Performance Computing & Simulation (HPCS), pp. 229-236. IEEE, 2015.
{69} Shamsinezhad, Elham, Asadollah Shahbahrami, Alireza Hedayati, Ahmad Khadem Zadeh, and Hamid Banirostam. "Presentation methods for task migration in cloud computing by combination of yu router and post-copy." International Journal of Computer Science Issues (IJCSI) 10, no. 4 (2013): 98.
{70} Shan, Zhongyuan, Jianzhong Qiao, and Shukuan Lin. "Fix page fault in post-copy live migration with RemotePF page table assistant." In 2018 17th International Symposium on Distributed Computing and Applications for Business Engineering and Science (DCABES), pp. 40-43. IEEE, 2018.
{71} Shribman, Aidan, and Benoit Hudzia. "Pre-copy and post-copy vm live migration for memory intensive applications." In European Conference on Parallel Processing, pp. 539-547. Springer, Berlin, Heidelberg, 2012.
{72} Sivagami, V. M. "Efficient Data Transmission during Virtual Machine Failures Using Hybrid Copy Live Migration." Proceedings of National Conference on Communication and Informatics-2016, Organized by Department of Information Technology, Sri Venkateswara College of Engineering, Sriperumbudur
{73} Soni, Sushil Kumar, and Ravi Kant Kapoor. "Enhanced live migration of virtual machine using comparison of modified and unmodified pages." IJCSMC 3, no. 2 (2014): 779-787.
{74} Stoyanov, Radostin, and Martin J. Kollingbaum. "Efficient live migration of Linux containers." In International Conference on High Performance Computing, pp. 184-193. Springer, Cham, 2018.
{75} Su, Kui, Wenzhi Chen, Guoxi Li, and Zonghui Wang. "Rpff: A remote page-fault filter for post-copy live migration." In 2015 IEEE International Conference on Smart City/SocialCom/SustainCom (SmartCity), pp. 938-943. IEEE, 2015.
{76} Sun, Michael H., and Douglas M. Blough. Fast, lightweight virtual machine checkpointing. Georgia Institute of Technology, 2010.
{77} Svard, Petter, B. Hudzia, S. Walsh, Johan Tordsson, and Erik Elmroth. "The Noble Art of Live VM Migration-Principles and performance of pre copy, post copy and hybrid migration of demanding workloads." Technical Report, UMINF-12.11 (2014).
{78} Takano, Ryousei, Hidemoto Nakada, Takahiro Hirofuchi, Yoshio Tanaka, and Tomohiro Kudoh. "Cooperative VM migration for a virtualized HPC cluster with VMM-bypass I/O devices." In 2012 IEEE 8th International Conference on E-Science, pp. 1-8. IEEE, 2012.
{79} Fernando, Denuni, "Fast And Robust Live Virtual Machine Migration", Ph.D. Dissertation, Binghamton University (2019).
{80} M. Nelson, B. Lim, and G. Hutchins. Fast transparent migration for virtual machines. In Proceedings of the annual conference on USENIX Annual Technical Conference, pages 25-25, 2005.
{81} M. Nelson, B. H Lim, and G. Hutchins. Fast Transparent Migration for Virtual Machines. In USENIX Annual Technical Conference, 2005.
{82} John K. Ousterhout, Andrew R. Cherenson, Frederick Douglis, Michael N. Nelson, and Brent B. Welch. The sprite network operating system. Computer, 21(2):23-36, February 1988.
{83} Eunbyung Park, Bernhard Egger, and Jaejin Lee. Fast and space-efficient virtual machine checkpointing. In the 7th ACM SIGPLAN/SIGOPS International Conference on Virtual Execution Environments, pages 75-86, 2011.
{84} Richard F. Rashid and George G. Robertson. Accent: A communication oriented network operating system kernel. In the Eighth ACM Symposium on Operating Systems Principles, pages 64-75, 1981.
{85} Redis. Key-value Cache and Store, redis.io.
{86} Michael Richmond and Michael Hitchens. A new process migration algorithm. SIGOPS Oper. Syst. Rev., 31(1):31-42, 1997.
{87} P. Riteau, C. Morin, and T. Priol. Shrinker: Improving live migration of virtual clusters over wans with distributed data deduplication and content-based addressing. In Proc. of EURO-PAR, September 2011.
{88} Adam Ruprecht, Danny Jones, Dmitry Shiraev, Greg Harmon, Maya Spivak, Michael Krebs, Miche Baker-Harvey, and Tyler Sanderson. Vm live migration at scale.

In the 14th ACM SIGPLAN/SIGOPS International Conference on Virtual Execution Environments, pages 45-56.

{89} Jonathan M. Smith. A survey of process migration mechanisms. SIGOPS Oper. Syst. Rev., 22(3):28-40, July 1988.

{90} Gang Sun, Dan Liao, Vishal Anand, Dongcheng Zhao, and Hongfang Yu. A new technique for efficient live migration of multiple virtual machines. Future Gener. Comput. Syst., 55:74-86, February 2016.

{91} P. Svard, B. Hudzia, J. Tordsson, and E. Elmroth. Evaluation of delta compression techniques for efficient live migration of large virtual machines. In VEE, 2011.

{92} T. Hirofuchi and I. Yamahata. Postcopy live migration for gemu/kvm. grivon.apgrid.org/quick-kvm-migration.

{93} Yoshiaki Tamura, Koji Sato, Seiji Kihara, and Satoshi Moriai. Kemari: Virtual machine synchronization for fault tolerance using domt, ntt cyber space labs. Technical report, Proc. USENIX Annual Technical Conference, 2008.

{94} VMWare Inc. VMware DRS: Dynamic Scheduling of System Resources, www.vmware.com/files/pdf/drs datasheet.pdf.

{95} VMWare Inc. VMWare Inc. Architecture of VMware ESXi, www.vmware.com/files/pdf/esxi-architecture.pdf.

{96} VMWare Inc. VMWare vMotion www.vmware.com/pdf/vmotion datasheet.pdf.

{97} VMWare Inc. VMWare vSphere 6 Fault Tolerance www.vmware.com/files/pdf/techpaper/vmware-vsphere6-ft-arch-perf.pdf.

{98} VMWare Inc. VMware vSphere vMotion Architecture, Performance and Best Practices in VMware vSphere 5, www.vmware.com/files/pdf/vmotion-perf-vsphere5.pdf.

{99} VMWare Inc. Protecting Mission-Critical Workloads with VMware Fault Tolerance. White Paper, Revision: 20090507 Item: WP-084-PRD-01-02, 2009.

{100} VMWare Knowledge Base. Virtual machine performance degrades while a vMotion is being performed, kb.vmware.com/kb/2007595.

{101} C. A. Waldspurger. Memory resource management in VMware ESX server. In Operating Systems Design and Implementation, December 2002.

{102} C. Wang, F. Mueller, C. Engelmann, and S. L. Scott. Proactive process-level live migration in hpc environments. In International Conference for High Performance Computing, Networking, Storage and Analysis, 2008.

{103} H. Wang, Y. Li, Y. Zhang, and D. Jin. Virtual machine migration planning in software-defined networks. IEEE Transactions on Cloud Computing, pages 1-1, 2017.

{104} Jian Wang, Kwame-Lante Wright, and Kartik Gopalan. Xenloop: A transparent high performance inter-vm network loopback. In Proceedings of the 17th International Symposium on High Performance Distributed Computing, HPDC '08, pages 109-118, 2008.

{105} D. Williams, H. Jamjoom, Y.-H. Liu, and H. Weatherspoon. Overdriver: Handling memory overload in an oversubscribed cloud. In ACM SIGPLAN/SIGOPS International Conference on Virtual Execution Environments (VEE), 2011.

{106} T. Wood, K. K. Ramakrishnan, P. Shenoy, and J. van der Merwe. Cloudnet: Dynamic pooling of cloud resources by live WAN migration of virtual machines. In ACM SIG-PLAN/SIGOPS International Conference on Virtual Execution Environments (VEE), 2011.

{107} T. Wood, P. Shenoy, A. Venkataramani, and M. Yousif. Sandpiper: Black-box and gray-box resource management for virtual machines. Intl. Journal of Computer and Telecommunications Networking, 53(17), 2009.

{108} Timothy Wood, Prashant Shenoy, Arun Venkataramani, and Mazin Yousif. Blackbox and gray-box strategies for virtual machine migration. In Proceedings of the 4th USENIX Conference on Networked Systems Design & #38; Implementation, NSDI'07, pages 17-17, 2007.

{109} N. Bila, E. de Lara, K. Joshi, H. A. Lagar-Cavilla, M. Hiltunen, and M. Satyanarayanan. Jettison: Efficient Idle Desktop Consolidation with Partial VM Migration. In Eurosys, April 2012.

{110} I. Zhang, A. Garthwaite, Y. Baskakov, and K. C. Barr. Fast restore of checkpointed memory using working set estimation. In ACM SIGPLAN/SIGOPS International Conference on Virtual Execution Environments (VEE), 2011.

{111} M. F. Zhani, Q. Zhang, G. Simona, and R. Boutaba. Vdc planner: Dynamic migration-aware virtual data center embedding for clouds. In 2013 IFIP/IEEE International Symposium on Integrated Network Management (IM 2013), pages 18-25, 2013.

{112} M. Zhao and R. J. Figueiredo. Experimental study of virtual machine migration in support of reservation of cluster resources. In Virtualization Technology in Distributed Computing (VTDC), 2007 Second International Workshop on, pages 1-8, 2007.

{113} Jeff Bonwick and Jonathan Adams. Magazines and vmem: Extending the slab allocator to many cpus and arbitrary resources. In USENIX Annual Technical Conference, pages 15-33, 2001.

{114} T. C. Bressoud and F. B. Schneider. Hypervisor-based fault tolerance. In Proceedings of the Fifteenth ACM Symposium on Operating Systems Principles, SOSP '95, pages 1-11, New York, NY, USA, 1995. ACM.

{115} Martin Casado, Michael J. Freedman, Justin Pettit, Jianying Luo, Nick McKeown, and Scott Shenker. Ethane: Taking control of the enterprise. In Proceedings of the 2007 Conference on Applications, Technologies, Architectures, and Protocols for Computer Communications, SIGCOMM '07, pages 1-12, New York, NY, USA, 2007. ACM.

{116} J. Chiang, H. Li, and T. Chiueh. Working Set-based Physical Memory Ballooning. In The International Conference on Autonomic Computing (ICAC), June 2013.

{117} C. Clark, K. Fraser, S. Hand, J. Hansen, E. Jul, C. Limpach, I. Pratt, and A. Warfield. Live migration of virtual machines. In Symposium on Networked Systems Design & Implementation, pages 273-286, 2005.

{118} C. Clark, K. Fraser, S. Hand, J. G. Hansen, E. Jul, C. Limpach, I. Pratt, and A. Warfield. Live Migration of Virtual Machines. In USENIX Symposium on Networked Systems Design and Implementation (NSDI), pages 273-286, 2005.

{119} C. Clark, K. Fraser, S. Hand, J. G. Hansen, E. Jul, C. Limpach, I. Pratt, and A. Warfield. Live Migration of Virtual Machines. In USENIX Symposium on Networked Systems Design and Implementation (NSDI), 2005.

{120} C. Clark, K. Fraser, S. Hand, J. G. Hansen, E. Jul, C. Limpach, I. Pratt, and A. Warfield. Live migration of virtual machines. In Network System Design and Implementation, 2005.

{121} Brian F. Cooper, Adam Silberstein, Erwin Tam, Raghu Ramakrishnan, and Russell Sears. Benchmarking cloud serving systems with ycsb. In Proceedings of the 1st ACM Symposium on Cloud Computing, SoCC '10, pages 143-154. ACM, 2010.

{122} Brendan Cully, Geoffrey Lefebvre, Dutch Meyer, Mike Feeley, Norm Hutchinson, and Andrew Warfield. Remus: High availability via asynchronous virtual machine replication. In Proceedings of the 5th USENIX Symposium on Networked Systems Design and Implementation, NSDI'08, pages 161-174, 2008.

{123} Tathagata Das, Pradeep Padala, Venkata N. Padmanabhan, Ramachandran Ramjee, and Kang G. Shin. Litegreen: Saving energy in networked desktops using virtualization. In Proceedings of the 2010 USENIX Conference on USENIX Annual Technical Conference, USENIXATC'10, pages 3-3, 2010.

{124} U. Deshpande, D. Chan, T. Y. Guh, J. Edouard, K. Gopalan, and N. Bila. Agile live migration of virtual machines. In 2016 IEEE International Parallel and Distributed Processing Symposium (IPDPS), 2016.

{125} U. Deshpande, B. Schlinker, E. Adler, and K. Gopalan. Gang migration of virtual machines using cluster-wide deduplication. In IEEE/ACM International Symposium on Cluster, Cloud and Grid Computing, May 2013.

{126} U. Deshpande, B. Wang, S. Haque, M. Hines, and K. Gopalan. Memx: Virtualization of cluster-wide memory. In Proc. of International Conference on Parallel Processing, September 2010.

{127} U. Deshpande, X. Wang, and K. Gopalan. Live gang migration of virtual machines. In Proc. of High Performance Distributed Computing, June 2010.

{128} U. Deshpande, X. Wang, and K. Gopalan. Live gang migration of virtual machines. In ACM Symposium on High-Performance Parallel and Distributed Computing (HPDC), 2011.

{129} U. Deshpande, Y. You, D. Chan, N. Bila, and K. Gopalan. Fast server deprovisioning through scatter-gather live migration of virtual machines. In 2014 IEEE 7th International Conference on Cloud Computing, pages 376-383, June 2014.

{130} Umesh Deshpande, Danny Chan, Steven Chan, Kartik Gopalan, and Nilton Bila. Scatter-gather live migration of virtual machines. IEEE Transactions on Cloud Computing, PP(99):1-1, 2015.

{131} Umesh Deshpande, Danny Chan, Steven Chan, Kartik Gopalan, and Nilton Bila. Scatter-gather live migration of virtual machines. IEEE Transactions on Cloud Computing, 2015.

{132} Umesh Deshpande, Danny Chan, Ten-Young Guh, James Edouard, Kartik Gopalan, and Nilton Bila. Agile live migration of virtual machines. In IEEE International Parallel and Distributed Processing Symposium, Chicago, IL, USA, May 2016.

{133} YaoZu Dong, Wei Ye, YunHong Jiang, Ian Pratt, ShiQing Ma, Jian Li, and HaiBing Guan. Colo: Coarse-grained lock-stepping virtual machines for non-stop service. In the 4th Annual Symposium on Cloud Computing, pages 1-16, 2013.

{134} George W. Dunlap, Samuel T. King, Sukru Cinar, Murtaza A. Basrai, and Peter M. Chen. Revirt: Enabling intrusion analysis through virtual-machine logging and replay. SIGOPS Oper. Syst. Rev., 36:211-224, December 2002.

{135} George Washington Dunlap, III. Execution Replay for Intrusion Analysis. PhD thesis, Ann Arbor, MI, USA, 2006.

{136} C. Engelmann, G. R. Vallee, T. Naughton, and S. L. Scott. Proactive fault tolerance using preemptive migration. In 17th Euromicro International Conference on Parallel, Distributed and Network-based Processing, pages 252-257, 2009.

{137} D. Fernando, H. Bagdi, Y. Hu, P. Yang, K. Gopalan, C. Kamhoua, and K. Kwiat. Quick eviction of virtual machines through proactive snapshots. In 2016 IEEE International Conference on Cluster Computing (CLUSTER), pages 156-157, September 2016.

{138} Dinuni Fernando, Hardik Bagdi, Yaohui Hu, Ping Yang, Kartik Gopalan, Charles Kamhoua, and Kevin Kwiat. Quick eviction of virtual machines through proactive live snapshots. In Proceedings of the 9th International Conference on Utility and Cloud Computing, UCC '16, pages 99-107, 2016.

{139} Dinuni Fernando, Jonathan Terner, Ping Yang, and Kartik Gopalan. Live migration ate my vm: Recovering a virtual machine after failure of live migration. In Proceedings of IEEE International Conference on Computer Communications, INFOCOM, 2019.

{140} Google Cloud Platform for Data Center Professionals. cloud.google.com/docs/compare/data-centers/, 2017.

{141} Soudeh Ghorbani and Matthew Caesar. Walk the line: Consistent network updates with bandwidth guarantees. In Proceedings of the First Workshop on Hot Topics in Software Defined Networks, HotSDN '12, pages 67-72, New York, NY, USA, 2012. ACM.

{142} Edward L. Haletky. VMware ESX Server in the Enterprise: Planning and Securing Virtualization Servers. 1 edition.

{143} F. Hermenier, J. Lawall, and G. Muller. Btrplace: A flexible consolidation manager for highly available applications. IEEE Transactions on Dependable and Secure Computing, 10(5):273-286, 2013.

{144} Fabien Hermenier, Xavier Lorca, Jean-Marc Menaud, Gilles Muller, and *Julia* Lawall. Entropy: A consolidation manager for clusters. In Proceedings of the 2009 ACM SIGPLAN/SIGOPS International Conference on Virtual Execution Environments, VEE '09, pages 41-50, 2009.

{145} Fabien Hermenier, Xavier Lorca, Jean-Marc Menaud, Gilles Muller, and *Julia* Lawall. Entropy: A consolidation manager for clusters. In Proceedings of the 2009 ACM SIGPLAN/SIGOPS International Conference on Virtual Execution Environments, VEE '09, pages 41-50, 2009.

{146} M. R. Hines, U. Deshpande, and K. Gopalan. Post-copy live migration of virtual machines. SIGOPS Operating System Review, 43(3):14-26, 2009.

{147} Michael R. Hines, Umesh Deshpande, and Kartik Gopalan. Post-copy live migration of virtual machines. SIGOPS Operating System Review, 43(3):14-26, 2009.

{148} Michael R. Hines and Kartik Gopalan. Post-copy based live virtual machine migration using adaptive pre-paging and dynamic self-ballooning. In VEE, pages 51-60, 2009.

{149} T. Hirofuchi, H. Nakada, S. Itoh, and S. Sekiguchi. Reactive cloud: Consolidating virtual machines with post-copy live migration. IPSJ Transactions on Advanced Computing Systems, pages 86-98, March 2012.

{150} R. Jhawar, V. Piuri, and M. Santambrogio. Fault tolerance management in cloud computing: A system-level perspective. IEEE Systems Journal, 7(2):288-297, June 2013.

{151} H. Jin, L. Deng, S. Wu, X. Shi, and X. Pan. Live virtual machine migration with adaptive, memory compression. In Proc. of Cluster Computing and Workshops, August 2009.

{152} C. Jo, E. Gustafsson, J. Son, and B. Egger. Efficient live migration of virtual machines using shared storage. In ACM SIGPLAN/SIGOPS International Conference on Virtual Execution Environments (VEE), 2013.

{153} A. Kangarlou, P. Eugster, and D. Xu. Vnsnap: Taking snapshots of virtual networked infrastructures in the cloud. IEEE Transactions on Services Computing, 5(4): 484-496, 2012.

{154} S. M. Kerner. Why facebook does sdn. www.enterprisenetworkingplanet.com/datacenter/why-facebook-does-sdn.html, 2014.

{155} Samuel T. King, George W. Dunlap, and Peter M. Chen. Debugging operating systems with time-traveling virtual machines. In Annual Conference on USENIX Annual Technical Conference, pages 1-1, 2005.

{156} Avi Kivity, Yaniv Kamay, Dor Laor, Uri Lublin, and Anthony Liguori. Kvm: The linux virtual machine monitor. In Linux Symposium, June 2007.

{157} Thomas Knauth and Christof Fetzer. Vecycle: Recycling VM checkpoints for faster migrations. In Proceedings of the 16th Annual Middleware Conference, pages 210-221, 2015.

{158} C. Kolivas. Kernbench. ck.kolivas.org/apps/kernbench/kernbench-0.50/.

{159} YongChul Kwon, Magdalena Balazinska, and Albert Greenberg. Fault-tolerant stream processing using a distributed, replicated file system. Proc. VLDB Endow., 1(1), August 2008.

{160} Linux Foundation. openvswitch.org/.

{161} H. Liu and B. He. Vmbuddies: Coordinating live migration of multi-tier applications in cloud environments. IEEE Transactions on Parallel and Distributed Systems, 26(4):1192-1205, 2015.

{162} H. Lu, C. Xu, C. Cheng, R. Kompella, and D. Xu. vhaul: Towards optimal scheduling of live multi-vm migration for multi-tier applications. In 2015 IEEE 8th International Conference on Cloud Computing, pages 453-460, June 2015.

{163} M. Lu and T. c. Chiueh. Fast memory state synchronization for virtualization-based fault tolerance. In 2009 IEEE/IFIP International Conference on Dependable Systems Networks, 2009.

{164} V. Mann, A. Vishnoi, A. Iyer, and P. Bhattacharya. Vmpatrol: Dynamic and automated qos for virtual machine migrations. In 2012 8th international conference on network and service management (cnsm) and 2012 workshop on systems virtualization management (svm), pages 174-178, October 2012.

{165} Vijay Mann, Akanksha Gupta, Partha Dutta, Anilkumar Vishnoi, Parantapa Bhattacharya, Rishabh Poddar, and Aakash Iyer. Remedy: Network-aware steady state vm management for data centers. In Proceedings of the 11th International IFIP TC 6 Conference on Networking, Volume Part I, IFIP'12, pages 190-204. Springer Verlag, 2012.

{166} Daniel Marques, Greg Bronevetsky, Rohit Fernandes, Keshav Pingali, and Paul Stodghil. Optimizing checkpoint sizes in the c3 system. In the 19th IEEE International Parallel and Distributed Processing Symposium, 2005.

{167} Ali Mashtizadeh, Emre´ Celebi, Tal Garfinkel, and Min Cai. The design and evolution of live storage migration in vmware esx. In Proceedings of the 2011 USENIX Conference on USENIX Annual Technical Conference, USENIXATC'11, pages 14-14, 2011.

{168} John D. McCalpin. Memory bandwidth and machine balance in current high performance computers. IEEE Computer Society Technical Committee on Computer Architecture (TCCA) Newsletter, pages 19-25, December 1995.

{169} Richard McDougall and Jim Maura. Solaris internals. In Rachael Borden, 2001.

{170} Nick McKeown, Tom Anderson, Hari Balakrishnan, Guru Parulkar, Larry Peterson, Jennifer Rexford, Scott Shenker, and Jonathan Turner. Openflow: Enabling innovation in campus networks. SIGCOMM Comput. Commun. Rev., 38(2):69-74, March 2008.

{171} Micro Checkpointing. wiki.qemu.org/features/micro-checkpointing.

{172} Microsoft Corp. Hyper-v server 2008 r2. www.microsoft.com/hyper-v-server/en/us/overview.aspx.

{173} R. Miller. Failure rates in google data centers www-.datacenterknowledge.com/archives/2008/05/30/failure-rates-in-google-data-centers, 2008.

{174} Dejan S. Milo´ icˇ ic´, Fred Douglis, Yves Paindaveine, Richard Wheeler, and Songnian Zhou. Process migration. ACM Comput. Surv., 32(3):241-299, September 2000.

{175} David Mosberger and Tai Jin. Httperf— a tool for measuring web server performance. SIGMETRICS Perform. Eval. Rev., 26(3):31-37, December 1998.

{176} MOSIX. www.mosix.org.

{177} S. J. Mullender, G. van Rossum, A. S. Tananbaum, R. van Renesse, and H. van Staveren. Amoeba: a distributed operating system for the 1990s. Computer, 23(5):44-53, May 1990.

{178} Arun Babu Nagarajan, Frank Mueller, Christian Engelmann, and Stephen L. Scott. Proactive Fault Tolerance for HPC with Xen Virtualization. In Proceedings of the 21st Annual International Conference on Supercomputing, pages 23-32, 2007.

{179} Arun Babu Nagarajan, Frank Mueller, Christian Engelmann, and Stephen L. Scott. Proactive fault tolerance for hpc with xen virtualization. In the 21st Annual International Conference on Supercomputing, pages 23-32, 2007.

{180} Iperf—the TCP/UDP bandwidth measurement tool. dast.nlanr.net/Projects/Iperf/.

{181} S. Al-Haj and E. Al-Shaer. A formal approach for virtual machine migration planning. In Proceedings of the 9th International Conference on Network and Service Management (CNSM 2013), pages 51-58, 2013.

{182} Samer Al-Kiswany, Dinesh Subhraveti, Prasenjit Sarkar, and Matei Ripeanu. Vm-flock: Virtual machine co-migration for the cloud. In Proceedings of the 20th International Symposium on High Performance Distributed Computing, HPDC '11, pages 159-170, 2011.

{183} Amazon Corporation. Amazon Elastic Compute Cloud (EC2), aws.amazon.com/ec2.

{184} Amazon Inc. AWS Server Migration Service. docs.aws.amazon.com/server-migration-service/latest/userguide/server-migration-ug.pdf.

{185} I. Banerjee, P. Moltmann, K. Tati, and R. Venkatasubramanian. VMware ESX Memory Resource Management: Swap. In VMWare Technical Journal, 2014.

{186} P. Barham, B. Dragovic, K. Fraser, S. Hand, T. Harris, A. Ho, R. Neugebauer, I. Pratt, and A. Warfield. Xen and the art of virtualization. SIGOPS Operating Systems Review, 37(5):164-177, 2003.

{187} Paul Barham, Boris Dragovic, Keir Fraser, Steven Hand, Tim Harris, Alex Ho, Rolf Neugebauer, Ian Pratt, and Andrew Warfield. Xen and the art of virtualization. In Proceedings of the Nineteenth ACM Symposium on Operating Systems Principles, SOSP '03, 2003.

{188} M. F. Bari, M. F. Zhani, Q. Zhang, R. Ahmed, and R. Boutaba. Cqncr: Optimal vm migration planning in cloud data centers. In 2014 IFIP Networking Conference, pages 1-9, June 2014.

{189} F. Bellard. Qemu, a fast and portable dynamic translator. In In ATEC 05: Proceedings of the annual conference on USENIX Annual Technical Conference, 2005.

{190} SPEC CPU 2017 benchmark suite. www.spec.org/cpu2017/.

{191} U.S. Patent and Patent Applications: U.S. Pat. Nos. 6,671,707; 7,484,208; 7,673,113; 7,680,919; 7,849,286; 7,900,005; 8,004,998; 8,010,495; 8,078,824; 8,196,138; 8,219,653; 8,260,904; 8,302,094; 8,312,453; 8,332,848; 8,364,638; 8,386,428; 8,386,731; 8,407,518; 8,418,176; 8,429,630; 8,453,144; 8,458,284; 8,473,557; 8,489,699; 8,490,088; 8,504,686; 8,505,003; 8,521,912; 8,533,305; 8,533,713; 8,554,900; 8,560,791; 8,583,709; 8,627,310; 8,627,456; 8,646,028; 8,650,565; 8,661,436; 8,671,238; 8,689,213; 8,694,644; 8,694,828; 8,700,867; 8,761,187; 8,775,590; 8,806,480; 8,832,688; 8,856,255; 8,856,339; 8,862,744; 8,869,144; 8,903,705; 8,904,384; 8,924,571; 8,935,506; 8,943,296; 8,973,098; 8,977,736; 8,984,507; 8,990,531; 8,990,800; 8,990,808; 9,015,709; 9,027,024; 9,032,398; 9,043,493; 9,043,790; 9,047,110; 9,052,949; 9,053,068; 9,055,119; 9,058,199; 9,063,866; 9,071,550; 9,081,599; 9,086,904; 9,086,981; 9,087,076; 9,092,318; 9,110,700; 9,110,704; 9,141,578; 9,152,448; 9,164,795; 9,172,587; 9,172,588; 9,183,060; 9,183,157; 9,197,489; 9,201,676; 9,201,704; 9,229,516; 9,244,710; 9,244,731; 9,250,959; 9,262,199; 9,262,211; 9,262,227; 9,268,586; 9,280,378; 9,286,100; 9,292,275; 9,304,878; 9,317,326; 9,323,921; 9,342,346; 9,342,360; 9,348,526; 9,348,655; 9,354,905; 9,354,921; 9,361,145; 9,361,218; 9,372,726; 9,372,727; 9,384,024; 9,384,062; 9,389,933; 9,396,004; 9,405,642; 9,411,620; 9,413,538; 9,417,754; 9,425,965; 9,436,386; 9,436,751; 9,442,753; 9,448,831; 9,454,400; 9,454,489; 9,459,900; 9,459,902; 9,473,598; 9,495,183; 9,501,305; 9,507,615; 9,507,672; 9,509,868; 9,519,512; 9,519,548; 9,529,616; 9,529,618; 9,529,620; 9,531,799; 9,542,108; 9,552,215; 9,552,217; 9,558,005; 9,558,028; 9,575,789; 9,578,088; 9,588,796; 9,588,803; 9,588,836; 9,588,844; 9,594,583; 9,594,598; 9,619,297; 9,626,212; 9,639,388; 9,648,134; 9,652,296; 9,671,966; 9,672,120; 9,703,655; 9,720,722; 9,720,728; 9,740,627; 9,760,443; 9,766,930; 9,767,039; 9,778,997; 9,792,138; 9,798,560; 9,798,567; 9,804,866; 9,811,376; 9,823,842; 9,830,090; 9,830,176; 9,836,327; 9,842,032; 9,852,137; 9,852,198; 9,854,036; 9,870,246; 9,880,868; 9,880,870; 9,880,872; 9,898,320; 9,898,430; 9,904,570; 9,928,091; 9,928,107; 9,928,260; 9,934,056; 9,934,157; 9,934,407; 9,936,019; 9,965,311; 9,971,616; 9,996,396; 10013,276; 10,031,607; 10,033,595; 10,037,334; 10,044,558; 10,049,064; 10,061,622; 10,073,713; 10,078,529; 10,083,053; 10,089,011; 10,114,662; 10,120,480; 10,120,594; 10,127,049; 10,129,331; 10,135,948; 10,140,112; 10,146,353; 10,156,921; 10,156,986; 10,157,077; 10,162,448; 10,169,068; 10,178,073; 10,187,466; 10,191,756; 10,198,299; 10,198,377; 10,203,794; 10,209,806; 10,209,807; 10,209,808; 10,209,809; 10,210,567; 10,222,891; 10,222,892; 10,222,893; 10,222,894; 10,222,895; 10,223,276; 10,235,235; 10,241,814; 10,268,595; 10,275,086; 10,275,087; 10,289,435; 10,289,436; 10,289,684; 10,310,977; 10,318,329; 10,324,851; 10,338,736; 10,345,961; 10,365,758; 10,386,960; 10,394,656; 10,394,668; 10,423,437; 10,430,221; 10,430,249; 10,430,991; 10,437,627; 10,452,559; 10,466,999; 10,467,106; 10,474,369; 10,474,489; 10,481,940; 10,481,942; 10,503,551; 10,503,659; 10,509,662; 10,509,687; 10,514,938; 10,521,047; 10,530,822; 10,534,474; 10,540,039; 10,541,928; 10,545,777; 10,551,966; 10,552,080; 10,552,230; 10,552,267; 10,572,271; 10,579,409; 10,579,412; 10,592,039; 10,592,273; 10,592,428; 10,606,396; 10,628,200; 10,635,474; 10,635,477; 10,642,413; 10,642,539; 10,649,571; 10,649,578; 10,649,579; 10,649,580; 10,649,581; 10,656,752; 10,656,753; 10,656,754; 10,656,755; 10,656,756; 10,656,757; 10,656,758; 10,656,759; 10,664,097; 10,666,516; 10,671,212; 10,671,213; 10,684,874; 10,698,711; 10,713,123; 10,725,581; 10,725,823; 10,740,016; 10,782,819; 10,788,931; 10,796,035; 10,810,037; 10,824,716; 10,826,930; 10,838,542; 10,853,119; 10,936,114; 10,936,330; 10,956,197; 10,963,367; 20020078057; 20070294676; 20080163239; 20080172492; 20080222375; 20080263258; 20090007106; 20090113109; 20090125904; 20090157882; 20090271786; 20090276771; 20090290501; 20100125845; 20100169253; 20100169537; 20100180274; 20100235825; 20100318608; 20110066819; 20110113136; 20110119670; 20110134931; 20110141124; 20110145418; 20110145458; 20110145819; 20110145820; 20110145821; 20110145886; 20110145916; 20110153697; 20110231455; 20110238820; 20110271062; 20110271270; 20110296411; 20120011504; 20120011508; 20120017031; 20120042034; 20120054367; 20120066375; 20120066677; 20120102084; 20120137098; 20120198440; 20120233282; 20120233331; 20120233611; 20120254862; 20120278525; 20120278807; 20120284234; 20120304176; 20120310888; 20120324442; 20130024598; 20130041977; 20130060947; 20130061225; 20130086272; 20130124675; 20130139154; 20130139155; 20130179655; 20130205106; 20130205113; 20130246355; 20130268643; 20130268799; 20130275375; 20130290468; 20130298126; 20130304903; 20130305242; 20130305246; 20130318515; 20130326173; 20130326174; 20130326175; 20130346613; 20140019974; 20140032767; 20140040343; 20140068703; 20140081984; 20140101657; 20140101754; 20140108854; 20140109180; 20140115162; 20140115164; 20140139869; 20140149635; 20140149984; 20140173600; 20140173628; 20140189041; 20140189690; 20140196037; 20140201357; 20140215172; 20140245294; 20140297780; 20140298338; 20140325515; 20140359607; 20140372717; 20150052282; 20150063166; 20150066859; 20150149999; 20150160962; 20150160963; 20150160964; 20150163270; 20150186220; 20150193248; 20150205673; 20150234684; 20150235308; 20150242228; 20150277789; 20150277962; 20150301931; 20150309839; 20150324236; 20150324297; 20150331715; 20150339148; 20150370596; 20150372862; 20150373096; 20150378623; 20150378766; 20150378767; 20150378771; 20150378783; 20150378785; 20150378831; 20150378847; 20150378931; 20150381589; 20160026489; 20160028761; 20160034702; 20160098302; 20160103728; 20160117122; 20160132443; 20160139962; 20160147556; 20160196449; 20160203015; 20160224371; 20160232023; 20160239328; 20160239428; 20160246639; 20160266940; 20160274896;

20160274934; 20160283421; 20160306862; 20160381125; 20170005813; 20170024246; 20170075706; 20170090964; 20170090968; 20170132062; 20170132430; 20170139755; 20170147501; 20170199755; 20170201574; 20170220374; 20170270012; 20170272515; 20170288971; 20170322815; 20170322828; 20170357527; 20170371696; 20180004679; 20180018135; 20180024854; 20180041477; 20180052701; 20180060107; 20180074842; 20180074908; 20180074909; 20180088975; 20180101452; 20180113610; 20180121247; 20180129523; 20180136838; 20180136963; 20180173547; 20180183869; 20180203721; 20180225221; 20180232254; 20180276025; 20180329737; 20180349421; 20180357098; 20180373557; 20190005576; 20190020732; 20190034112; 20190050235; 20190087220; 20190087244; 20190095232; 20190114197; 20190129740; 20190129814; 20190146853; 20190158588; 20190179659; 20190205220; 20190207764; 20190220364; 20190222522; 20190228557; 20190258503; 20190265904; 20190278624; 20190278632; 20190319896; 20190334909; 20190354378; 20190370049; 20190384495; 20190384673; 20190391835; 20190391843; 20200019429; 20200019512; 20200026547; 20200034176; 20200034182; 20200034211; 20200073674; 20200110629; 20200150997; 20200174817; 20200183729; 20200293697; 20200319897; 20200319904; 20200334067; 20200387392; 20200389469; 20200403940; 20210049079; 20210055946; and 20210058425.

What is claimed is:

1. A method for migration of a virtual machine from a source to a destination, comprising:

commencing migration of the virtual machine;

executing the virtual machine at the destination, based on a partial migration of the virtual machine from the source;

requesting memory pages in response to page faults during the execution of the virtual machine at the destination, due to incomplete migration from the source, and communicating an incremental checkpoint, while the migration of the virtual machine from the source to the destination is in progress, wherein the incremental checkpoint is committed before external environment changes are made by execution of the virtual machine.

2. The method according to claim 1, further comprising storing an execution state of the virtual machine executing at a source in a memory; and communicating the stored execution state stored in the memory to a destination.

3. The method according to claim 1, further comprising recovering the virtual machine in event of execution failure based on at least the incremental checkpoint.

4. The method according to claim 1, wherein the incremental checkpoint comprises memory pages modified by the virtual machine since a prior incremental checkpoint.

5. The method according to claim 1, wherein the incremental checkpoint comprises a central processing unit state of the virtual machine.

6. The method according to claim 1, wherein the incremental checkpoint comprises an input/output state of the virtual machine.

7. The method according to claim 1, further comprising proactively transferring memory pages from the source to the destination independent of occurrence of a page fault.

8. The method according to claim 1, further comprising providing a checkpoint manager, configured to:

store a checkpoint of the source comprising the execution state of the virtual machine at the source; and store the incremental checkpoint from the virtual machine executing on the destination.

9. The method according to claim 1, further comprising communicating the incremental checkpoint from the virtual machine executing on the destination to a checkpoint manager.

10. The method according to claim 1, wherein the communicated incremental checkpoint comprises a virtual CPU state, an input/output state, and a memory state of the virtual machine prior to persistently changing a state outside of the virtual machine since a prior communicated incremental checkpoint.

11. The method according to claim 1, further comprising remapping input/output in a communication device between the source and the destination.

12. The method according to claim 1, wherein the incremental checkpoint consists essentially of memory pages modified since a prior incremental checkpoint, a CPU state of the virtual machine, and an input/output state of the virtual machine.

13. The method according to claim 1, further comprising buffering communications from the virtual machine before committing changes to an external environment until an incremental checkpoint is communicated reflecting the prospective changes to the external environment.

14. The method according to claim 1, wherein the virtual machine executes under a hypervisor, further comprising communicating messages from the destination to the source, and dependent on the communicated messages, triggering recovery of the virtual machine by the hypervisor at the source.

15. The method according to claim 1, wherein the virtual machine executes under a hypervisor, and wherein the incremental checkpoint is generated by the hypervisor.

16. The method according to claim 1, further comprising recovering the virtual machine at the source from a last consistent copy of each memory page from a series of incremental checkpoints from the destination.

17. The method according to claim 1, further comprising:

determining memory pages modified by the virtual machine at the destination, generating a first partial checkpoint of the modified memory pages without pausing execution of the virtual machine, pausing execution of the virtual machine, generating a second partial checkpoint of an execution state of a CPU of the virtual machine, an input/output state of the virtual machine, and modified memory pages, combining the first and second partial checkpoints to generate the incremental checkpoint with subsequent modified memory pages preempting preceding modified memory pages, and resuming execution of the virtual machine.

18. A virtual machine, comprising:

a partial set of memory pages migrated from a source;

a memory manager configured to request memory pages from the source in response to page faults during the execution of the virtual machine, the page faults being generated by the memory manager due to incomplete migration of the set of memory pages from the source, and a checkpoint process, configured to communicate an incremental checkpoint, wherein the incremental checkpoint is committed before external environment changes are made by execution of the virtual machine.

* * * * *